(12) United States Patent
Sekiya et al.

(10) Patent No.: US 8,335,408 B2
(45) Date of Patent: Dec. 18, 2012

(54) SIGNAL PROCESSING APPARATUS

(75) Inventors: Toshiyuki Sekiya, Tokyo (JP); Ken Hayakawa, Tokyo (JP); Kazuo Haraoka, Tokyo (JP); Masaaki Hattori, Tokyo (JP); Naoki Kaneko, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 12/681,782

(22) PCT Filed: Oct. 7, 2008

(86) PCT No.: PCT/JP2008/068245
§ 371 (c)(1),
(2), (4) Date: Apr. 6, 2010

(87) PCT Pub. No.: WO2009/066517
PCT Pub. Date: May 28, 2009

(65) Prior Publication Data
US 2010/0220954 A1    Sep. 2, 2010

(30) Foreign Application Priority Data
Nov. 20, 2007   (JP) .................................. 2007-300951

(51) Int. Cl.
*G02B 6/28* (2006.01)
(52) U.S. Cl. ................. 385/24; 385/39; 385/46
(58) Field of Classification Search .......... None
See application file for complete search history.

(56) References Cited

U.S. PATENT DOCUMENTS
5,822,475 A   10/1998   Hirota et al.

FOREIGN PATENT DOCUMENTS

| JP | 9 270753 | 10/1997 |
|----|----------|---------|
| JP | 10 70553 | 3/1998 |
| JP | 10 123350 | 5/1998 |
| JP | 11 31035 | 2/1999 |
| JP | 2001 86063 | 3/2001 |
| JP | 2001 166177 | 6/2001 |
| JP | 2002 101044 | 4/2002 |
| JP | 2004 233991 | 8/2004 |
| JP | 2005 195873 | 7/2005 |
| JP | 2006 5532 | 1/2006 |

OTHER PUBLICATIONS

English translation of Written Opinion for PCT/JP2008/068245, filing date Oct. 7, 2008.*

* cited by examiner

*Primary Examiner* — Mike Stahl
(74) *Attorney, Agent, or Firm* — Oblon, Spivak, McClelland, Maier & Neustadt, L.L.P.

(57) ABSTRACT

In the sending and receiving of a signal through an optical waveguide, an unknown substrate connected to the optical waveguide can be recognized. A signal processing apparatus 1A is provided with an optical waveguide 2A in which the light input from an arbitrary position on an outer circumference is output in an entire circumference direction at a level in accordance with a positional relation with the input location, a master substrate 3M arranged on the outer circumference of the optical waveguide 2A, a single or a plurality of slave substrates 3S arranged at any of a plurality of mount locations at different positions along the outer circumference of the optical waveguide 2A, in which as the light is output from A laser diodes 30S of all the slave substrates 3S connected to the optical waveguide 2A, from a level of a light transmitted through the optical waveguide 2A and input to the photo detector 31M of the master substrate 3M in accordance with the arrangement of the slave substrate 3S, the master substrate 3M recognizes the mount positions and number of the slave substrates 3S.

16 Claims, 44 Drawing Sheets

FIG. 31
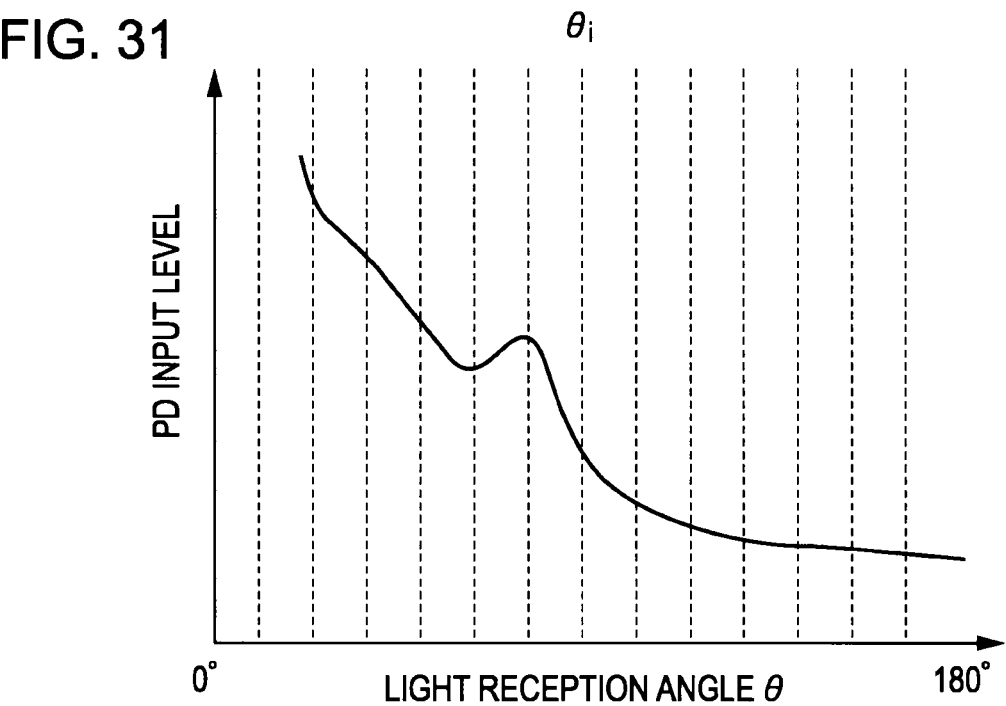
FIG. 32
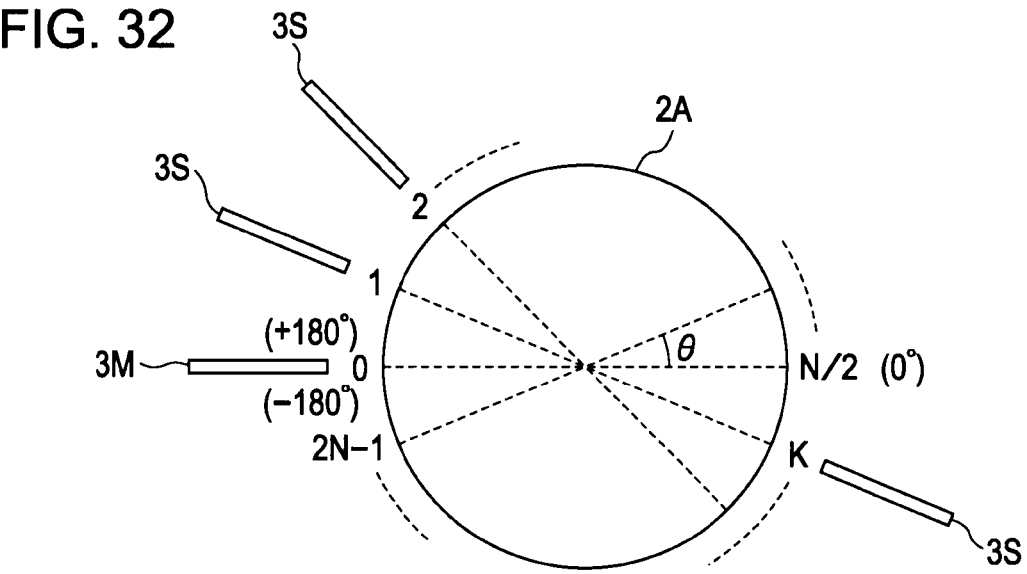
FIG. 33
| W | $W_0$ | $W_1$ | ... | ... | $W_{2^{2N-1}-1}$ |
|---|---|---|---|---|---|
| $tPD_1$ | $tPD_{1,0}$ | $tPD_{1,1}$ | ... | ... | $tPD_{1,2^{2N-1}-1}$ |

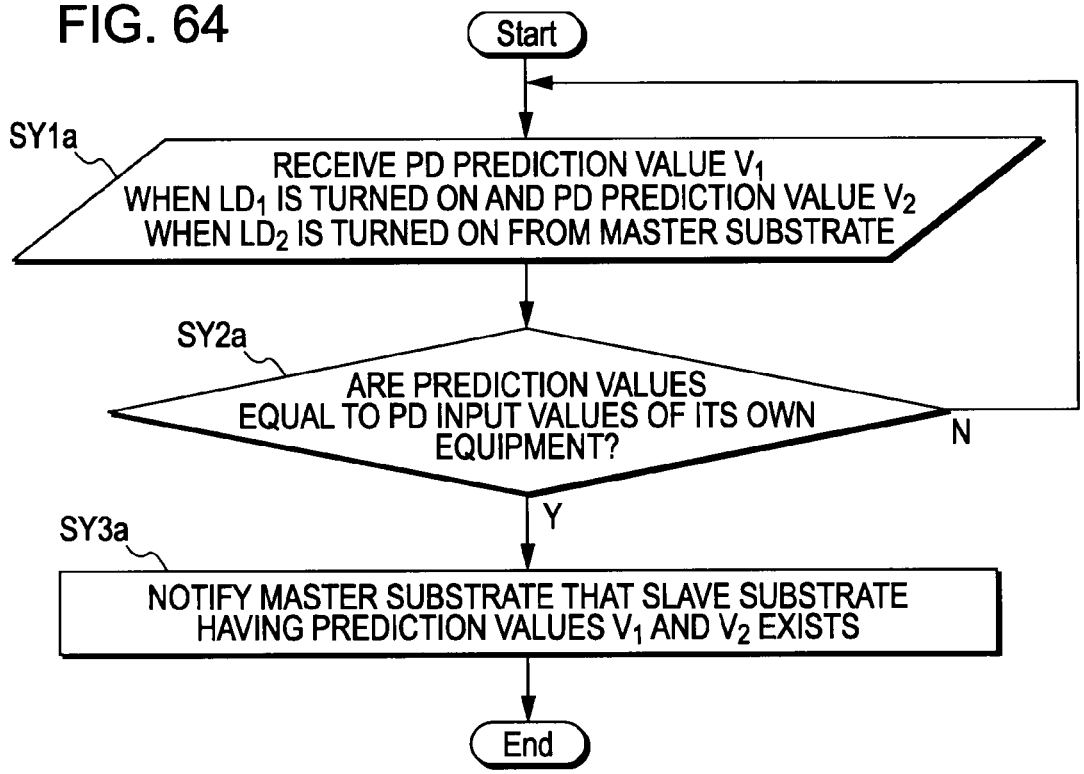
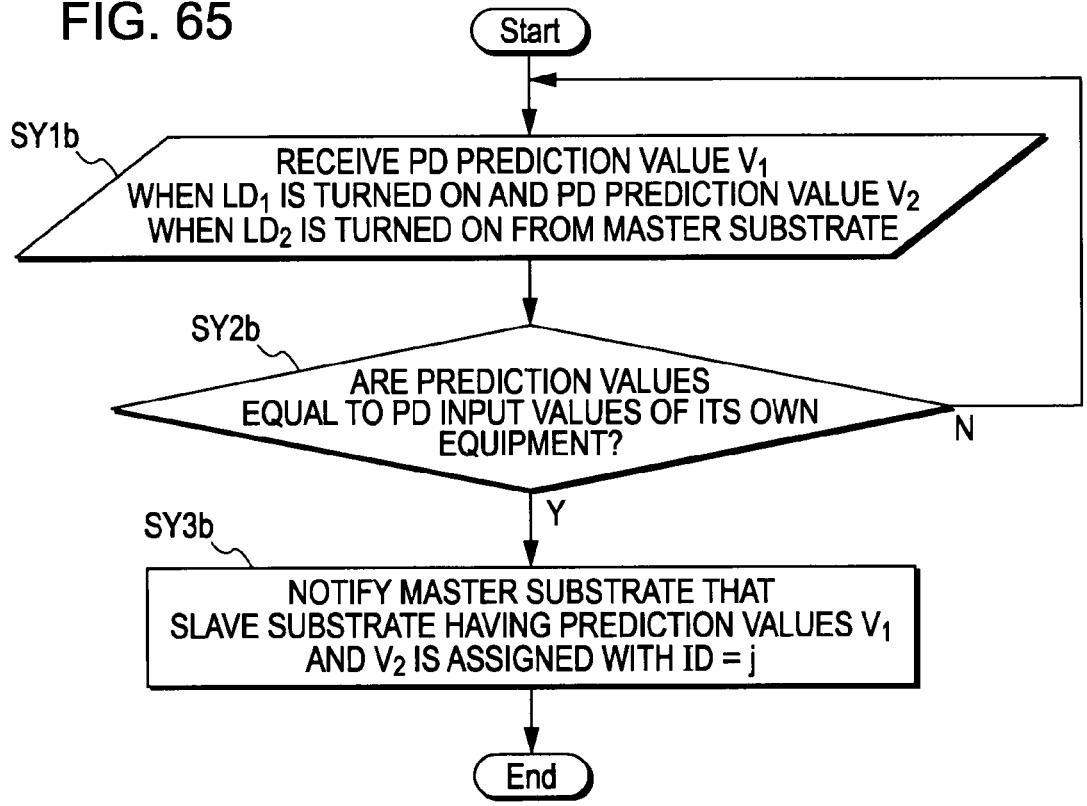

SIGNAL PROCESSING APPARATUS

TECHNICAL FIELD

The present invention relates to a signal processing apparatus having a master substrate and a single or a plurality of slave substrates connected via an optical waveguide which has a light input output surface formed on an outer circumference of an optical guide unit through which light is transmitted where the light input from an arbitrary position of the input output surface is output in an entire circumference direction at a level in accordance with a positional relation with the input location. To be more specific, by sending and receiving the light by the optical waveguide between the master substrate and the slave substrate connected to the optical waveguide, from a light input level on the master substrate when the light is output from all the slave substrates connected to the optical waveguide, the unknown positions and number of the slave substrates are recognized by the master substrate, and identification information inherent to the slave substrates can be assigned.

BACKGROUND ART

Up to now, a signal processing apparatus has been proposed in which a plurality of circuit substrates are connected via an optical waveguide, and a signal can be sent and received by way of light between respective substrates (for example, see Japanese Unexamined Patent Application Publication No. 10-123350).

In the traditional signal processing apparatus, a plurality of substrate connectors are provided to a support substrate to which the optical waveguide is mounted, and as the circuit substrate is mounted to the substrate connector, the plurality of circuit substrates are connected to the optical waveguide.

Also, in the support substrate, an electric wiring for electric signal transmission is provided, and the sending and receiving of the electric signal are also carried out between the circuit substrates.

DISCLOSURE OF INVENTION

However, in the conventional signal processing apparatus, a technology for recognizing unknown circuit substrates when the circuit substrates are connected to the optical waveguide is not provided, and addition, deletion, and the like of the circuit substrate are not easily carried out. Also, between circuit substrates, an electric wiring for allowing one-to-one communication needs to be prepared separately in addition to the optical waveguide.

The present invention has been made to solve the above-mentioned problems, and it is an object to provide a signal processing apparatus capable of recognizing unknown substrates connected to an optical waveguide on the basis of the sending and receiving of a signal by the optical waveguide.

In order to solve the above-mentioned problems, a signal processing apparatus according to the present invention includes an optical waveguide having a light input output surface formed on an outer circumference of an optical guide unit through which light is transmitted where the light input from an arbitrary position of the input output surface is output in an entire circumference direction at a level in accordance with a positional relation with the input location; a master substrate arranged on an outer circumference of the optical waveguide and provided with a light output unit for converting an electric signal into light to be output and a light input unit for converting the input light into the electric signal; and a single or a plurality of slave substrates arranged on any of a plurality of mounting locations at different positions along the outer circumference of the optical waveguide and provided with a light output unit for converting an electric signal into light to be output and a light input unit for converting the input light into the electric signal, in which the master substrate recognizes the mounted positions and the number of the slave substrates from a level of the light input to the light input unit of the master substrate and transmitted through the optical waveguide in accordance with the arrangement of the slave substrates while the light is output from the light output units of all the slave substrates arranged on the outer circumference of the optical waveguide.

According to the signal processing apparatus of the present invention, when the light output unit of the master substrate is turned ON, the light output from the master substrate is transmitted through the optical waveguide and input to the slave substrate connected to the optical waveguide at an arbitrary arrangement.

According to this, as the master substrate turns ON the light output unit of its own equipment, the instruction of turning ON the light output unit is issued with respect to all the slave substrates connected to the optical waveguide.

When the light is output from the light output units of all the slave substrates connected to the optical waveguide, the level of the light transmitted through the optical waveguide and input to the light input unit of the master substrate varies depending on the mounted position and the number of the slave substrates.

For this reason, the master substrate sends and receives the light through the optical waveguide with the slave substrates connected to the optical waveguide and recognizes the mounted positions and the number of the slave substrates from the level of the light input to the light input unit.

Also, a signal processing apparatus according to the present invention includes an optical waveguide having a light input output surface formed on an outer circumference of an optical guide unit through which light is transmitted where the light input from an arbitrary position of the input output surface is output in an entire circumference direction at a level in accordance with a positional relation with the input location; a master substrate arranged on an outer circumference of the optical waveguide and provided with a light output unit for converting an electric signal into light to be output and a light input unit for converting the input light into the electric signal; and a single or a plurality of slave substrates arranged on any of a plurality of mounting locations at different positions along the outer circumference of the optical waveguide and provided with a light output unit for converting an electric signal into light to be output and a light input unit for converting the input light into the electric signal, in which in a case where the position and the number of the slave substrates arranged on the outer circumference of the optical waveguide are different, the master substrate and the slave substrate include the light input unit and the light output unit at an arrangement where a difference occurs between levels of lights input to the master substrate and the slave substrate, and the master substrate holds an input level table in which the level of the light input to the light input unit of the master substrate in accordance with arrangement of the slave substrates is associated with arrangement information specifying the positions and the number of the slave substrates and searches for the input level table on the basis of an input value of the light input unit of the master substrate while the light is output from the light output units of all the slave substrates arranged on the outer circumference of the optical waveguide to obtain the arrangement information of the slave substrates.

According to the signal processing apparatus of the present invention, in a case where the position and the number of the slave substrates connected to the optical waveguide are different, by providing the light input unit and the light output unit in an arrangement where the levels of the lights input to the master substrate are set so as not to be identical to each other, the position and the number of the slave substrates can be recognized on the basis of the magnitude of the light level.

Then, the master substrate holds the input level table in which the light level varying depending on the position and the number of the slave substrates is associated with the arrangement information where the position and the number of the slave substrates are specified.

According to this, the master substrate searches for the input level table on the basis of the input value of the light input unit of its own equipment when the light output units of all the slave substrates connected to the optical waveguide are instructed to output the light and recognizes the mounted position and the number of the slave substrates.

Furthermore, a signal processing apparatus according to the present invention includes an optical waveguide having a light input output surface formed on an outer circumference of an optical guide unit through which light is transmitted where the light input from an arbitrary position of the input output surface is output in an entire circumference direction at a level in accordance with a positional relation with the input location; a master substrate arranged on an outer circumference of the optical waveguide and provided with a light output unit for converting an electric signal into light to be output and a light input unit for converting the input light into the electric signal; and a single or a plurality of slave substrates arranged on any of a plurality of mounting locations at different positions along the outer circumference of the optical waveguide and provided with a light output unit for converting an electric signal into light to be output and a light input unit for converting the input light into the electric signal, in which the master substrate holds an input level table in which the level of the light input to the light input unit of the master substrate in accordance with arrangement of the slave substrates is associated with arrangement information specifying the positions and the number of the slave substrates and searches for the input level table on the basis of an input value of the light input unit of the master substrate while the light is output from the light output units of all the slave substrates arranged on the outer circumference of the optical waveguide to obtain the arrangement information of the slave substrates, the slave substrate also holds an input value of the light input unit of its own equipment while the light is output from the light output unit of another slave substrate, the master substrate predicts an input value of the light input unit in the slave substrate whose position is specified by the respective arrangement information to be output from the light output unit together with identification information and sent to all the slave substrates arranged on the outer circumference of the optical waveguide, and when the input value corresponding to the prediction value received from the master substrate is held, the slave substrate sets the identification information received from the master substrate as the identification information assigned to its own equipment.

According to the signal processing apparatus of the present invention, when the position and the number of the slave substrates are recognized, the master substrate predicts the input value of the light input unit in the respective slave substrates whose position is specified and outputs the prediction value from the light output unit together with the identification information to be sent to all the slave substrates connected to the optical waveguide.

The slave substrate connected to the optical waveguide holds the input value of the light input unit of its own equipment when the light is output from the light output units of all the slave substrates in the processing of recognizing the position and the number of the slave substrates by the master substrate. Then, when the input value relevant to the prediction value received from the master substrate is held, the identification information received from the master substrate is set as the identification information assigned to its own equipment.

According to the signal processing apparatus of the present invention, by sending and receiving the light between the master substrate and the slave substrate connected to the optical waveguide through the optical waveguide, the master substrate finds out the slave substrates whose mounted positions and the number are unknown and can recognize the positions and the number of the respective slave substrates from the level of the light input to the light input unit of the master substrate.

According to this, the master substrate does not need to previously recognize the positions and the number of the slave substrates, and when addition or deletion of the slave substrate is carried out, information on the positions and the number of the slave substrate does not need to be set in the master substrate. Also, the number and the mounted positions of the slave substrates can arbitrarily set.

Therefore, it is possible to provide the system in which the change in the configuration such as addition and deletion of the slave substrate can be easily carried out.

Also, another control line does not need to be prepared separately in addition to the optical waveguide between the master substrate and the slave substrate, and the restrictions on the mounted positions and the number of the slave substrates are reduced, so that the configuration can be simplified.

Furthermore, according to the signal processing apparatus of the present invention, as the master substrate recognizes the positions and the number with respect to the unknown slave substrates connected to the optical waveguide, by utilizing the magnitude of the light level, it is possible to assign the identification information inherent to the respective slave substrates.

BRIEF DESCRIPTION OF DRAWINGS

FIG. 4 is a time chart showing a processing when a power source is turned ON.

FIG. 5 is a flow chart showing a processing of a master substrate 3M when the power source is ON.

FIG. 6 is a time chart showing level changes of a laser diode output and a photo detector input in the master substrate 3M when the power source is ON.

FIG. 7 is a flow chart showing a processing of a slave substrate 3S when the power source is ON.

FIG. 8 is a time chart showing level changes of the laser diode output and the photo detector input in the slave substrate 3S when the power source is ON.

FIG. 22 is a flow chart showing a detail of the processing of the master substrate 3M when the power source is ON.

FIG. 23 is a flow chart showing a detail of the processing of the slave substrate 3S when the power source is ON.

FIG. 31 is a graph showing a level of light input to a photo detector 31M.

FIG. 32 is an explanatory diagram showing an arrangement example of the master substrate 3M and the slave substrate 3S.

FIG. 33 is an explanatory diagram showing an example of a table in which an input level table $tPD_1$ in a photo detector $31M_1$ is associated with an arrangement vector $W_m$.

FIG. 64 is a flow chart showing a detail of another processing of the slave substrate 3S when the arrangement is decided for the slave substrate 3S whose arrangement is not uniquely decided.

FIG. 65 is a flow chart showing a detail of another processing of the slave substrate 3S when the ID is assigned to the slave substrate 3S whose arrangement is not uniquely decided.

BEST MODES FOR CARRYING OUT THE INVENTION

Hereinafter, with reference to the drawings, embodiments of a signal processing apparatus according to the present invention will be described.

<Configuration Example of a Signal Processing Apparatus According to a First Embodiment>

Figure 1A:
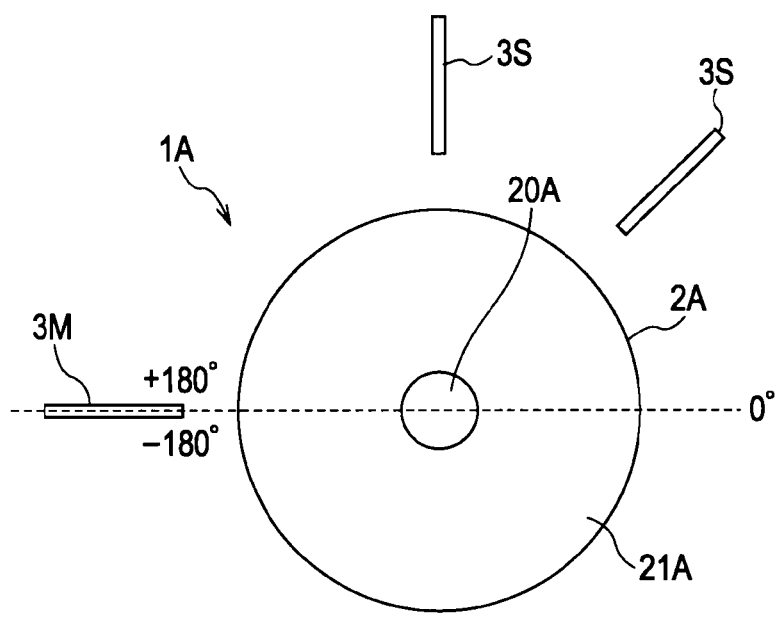
FIG. 1A is a schematic plan view showing an outline of a signal processing apparatus according to a first embodiment.
Figure 1B:
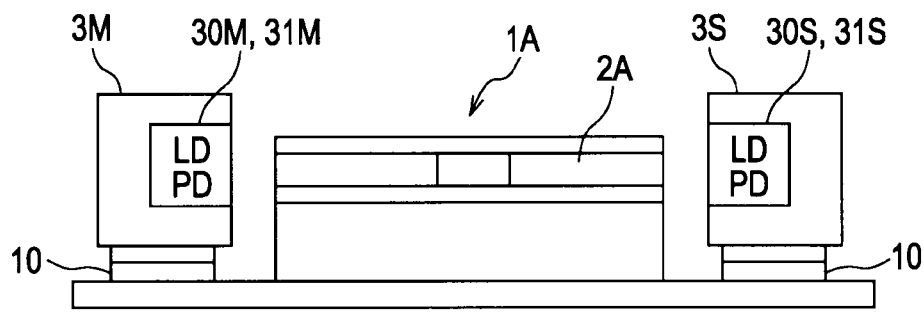
FIG. 1B is a schematic side view showing an outline of the signal processing apparatus according to the first embodiment.
Figure 1C:
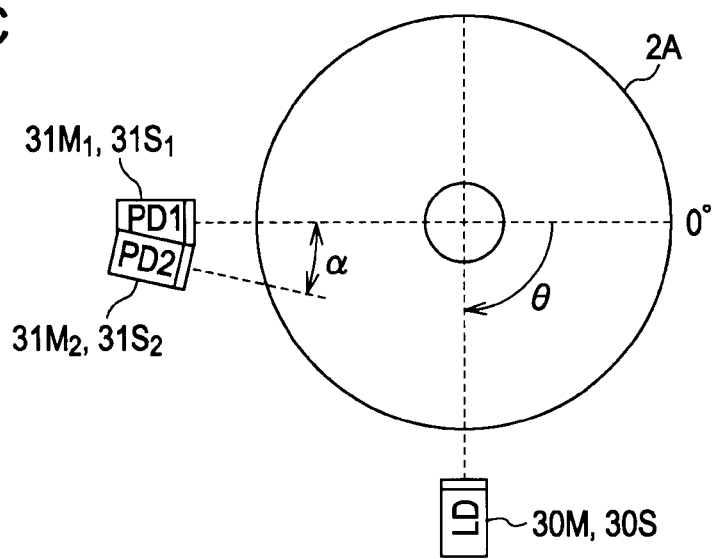
FIG. 1C is a schematic plan view showing an outline of an arrangement of a light input output unit in the signal processing apparatus according to the first embodiment.

FIGS. 1A, 1B, and 1C show an outline of a signal processing apparatus according to a first embodiment, in which FIG. 1A is a schematic plan view of a signal processing apparatus 1A according to the first embodiment, FIG. 1B is a schematic side view of the signal processing apparatus 1A according to the first embodiment, and FIG. 1C is a schematic plan view showing an outline of an arrangement of a light input output unit in the signal processing apparatus 1A according to the first embodiment.

The signal processing apparatus 1A according to the first embodiment is provided with an optical waveguide 2A through which the light is transmitted, and a master substrate 3M and a slave substrate 3S connected to the optical waveguide 2A.

The optical waveguide 2A is provided, for example, with a disc-shaped outer circumference as an input output surface for the light and has a function of outputting the light input from an arbitrary position of the input output surface in entire circumference direction.

The master substrate 3M is provided, for example, with a laser diode (LD) 30M as a light output unit for converting the input electric signal into the light to be output and also provided with a photo detector (PD) 31M as a light input unit for converting the input light into the electric signal to be output.

The slave substrate 3S is provided, for example, with a laser diode (LD) 30S as a light output unit for converting the input electric signal into the light to be output and also provided with a photo detector (PD) 31S as a light input unit for converting the input light into the electric signal to be output.

The signal processing apparatus 1A is provided with substrate connection units 10 at a plurality of locations opposite to the outer circumference of the optical waveguide 2A where the master substrate 3M and the slave substrate 3S are mounted.

The substrate connection unit 10 is constructed, for example, by providing a connector to which the master substrate 3M and the slave substrate 3S can be detachably attached on a power source substrate 11 for supplying the power source to the master substrate 3M and the slave substrate 3S.

According to this, in the signal processing apparatus 1A, one sheet of the master substrate 3M and an arbitrary number of sheets of the slave substrate 3S in accordance with a function desired to be realized are mounted to the substrate connection unit 10.

Then, the light output from the laser diode 30M of the master substrate 3M is transmitted through the optical waveguide 2A to be input to the photo detector 31S of the slave substrate 3S mounted at an arbitrary position of the substrate connection unit 10.

Also, the light output from the laser diode 30S of the slave substrate 3S mounted at an arbitrary position of the substrate connection unit 10 is transmitted through the optical waveguide 2A to be input to the photo detector 31M of the master substrate 3M.

At this time, when the light is output from the laser diode 30S of the slave substrate 3S connected to the optical waveguide 2A at a constant light amount, in the optical waveguide 2A, the light attenuates in accordance with the mount position of the slave substrate 3S with respect to the master substrate 3M, and also, as the light is added in accordance with the number of the slave substrates, in the master substrate 3M, the level (intensity) of the light input to the photo detector 31M is changed.

Similarly, when the light is output from the laser diode 30M of the master substrate 3M and the laser diode 30S of the slave substrate 3S at the constant light amount, in the optical waveguide 2A, the light attenuates in accordance with the mount positions of the master substrate 3M and the other slave substrate 3S with respect to a certain slave substrate 3S, and also, as the light is added in accordance with the number of the slave substrates, in the slave substrate 3S, the level of the light input to the photo detector 31S is changed.

In view of the above, in the signal processing apparatus 1A, by utilizing the levels of the lights input to the master substrate 3M and the slave substrate 3S, the master substrate 3M recognizes the slave substrate 3S whose arrangement is unknown.

That is, the master substrate 3M outputs the light from the laser diodes 30S of all the slave substrates 3S connected to the optical waveguide 2A at the constant light amount.

At this time, the master substrate 3M recognizes various characteristics related to the laser diode 30M of its own equipment and the laser diode 30S of the slave substrate 3S, for example, the wavelength, the light emission amount, and the attenuation characteristic. Also, the photo detector 31M of the master substrate 3M and the photo detector 31S of the respective slave substrates 3S are identical to each other.

For this reason, the level of the light input to the photo detector 31M of the master substrate 3M and the level of the light input to the photo detector 31S of the slave substrate 3S are uniquely decided in accordance with the number and the arrangement of the slave substrates 3S.

According to this, as the light is output from the respective slave substrates 3S at the constant light amount, the master substrate 3M decides the arrangement and the number of the slave substrates 3S on the basis of the level of the light transmitted through the optical waveguide 2A and input to the photo detector 31M of its own equipment.

Furthermore, the respective slave substrates 3S holds the input value in accordance with the level of the light input to the photo detector 31S of its own equipment, and also the master substrate 3M obtains the level of the light input to the photo detector 31S on the respective slave substrates 3S whose arrangement is recognized and assigns an ID which is inherent identification information to the slave substrate 3S having the relevant input value to identify the respective slave substrates 3S.

Incidentally, in the optical waveguide 2A, when a consideration is given while a front face position of the substrate where the optical waveguide 2A is put in-between is set as a center (0°), the light substantially symmetrically attenuates in a range of ±180°. According to this, at a position at 180° where the optical waveguide 2A is put in-between with respect to the master substrate 3M, that is, in a case where the front face of the master substrate 3M is set as 0°, the PD input level of the light from the slave substrate 3S at a position at +θt° is substantially equal to the PD input level of the light from the slave substrate 3S at a position at −θt°.

Also, between a range of 0° to +180° and a range of 0° to −180° too, the positions where the PD input levels are equal to each other exist.

In view of the above, while the symmetric property of the light attenuation in the optical waveguide 2A is broken, in a case where the arrangements of the slave substrates 3S are varied, so as not to have the same level of the light input to the master substrate 3M, according to the present example, the master substrate 3M is provided with two pieces of a photo detector $31M_1$ and a photo detector $31M_2$.

As to the photo detector $31M_1$ and the photo detector $31M_2$, in order that a difference occurs in the levels when the lights are input from the same direction, with respect to the one photo detector $31M_1$ facing the center of the optical waveguide 2A, the other photo detector $31M_2$ is arranged to be inclined at a predetermined angle α in the surface direction.

Also, in the slave substrates 3S where the arrangements are varied, so as not to have the same level of the input light, according to the present example, the slave substrate 3S is provided with two pieces including a photo detector $31S_1$ and a photo detector $31S_2$.

As to the photo detector $31S_1$ and the photo detector $31S_2$, in order that a difference occurs in the levels when the lights are input from the same direction, with respect to the one photo detector $31S_1$ facing the center of the optical waveguide 2A, the other photo detector $31S_2$ is arranged to be inclined at the predetermined angle α in the surface direction.

<Configuration Example of the Optical Waveguide>

Figure 2A:
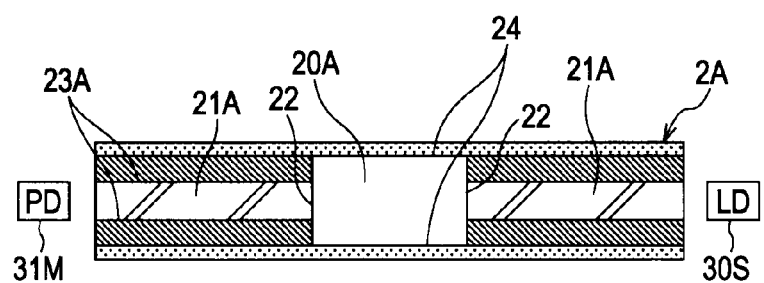
FIG. 2A is a schematic cross sectional view showing an example of an optical waveguide constituting the signal processing apparatus according to the present embodiment.
Figure 2B:
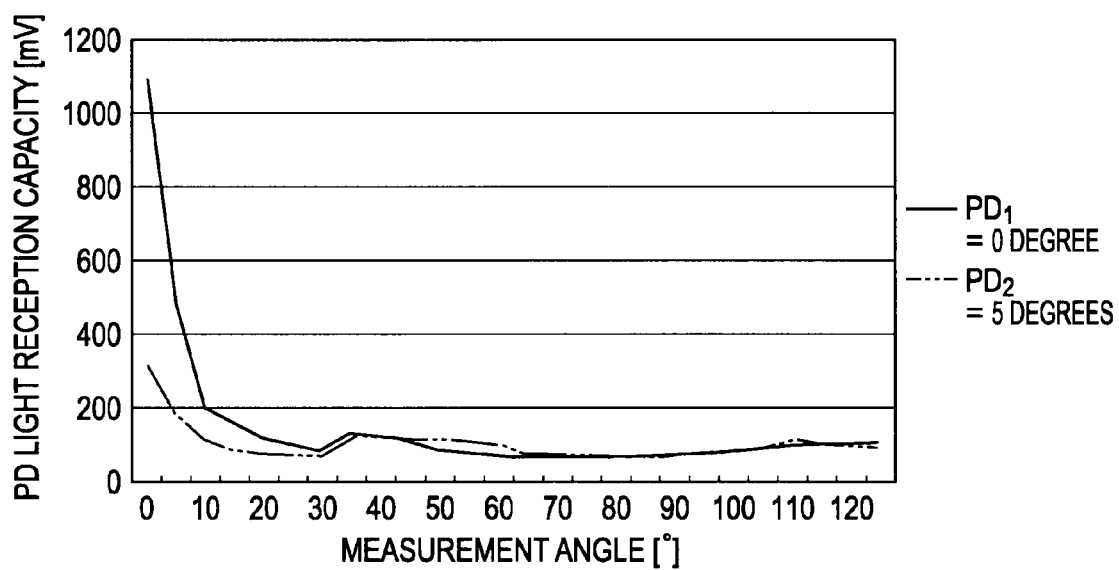
FIG. 2B is a graph showing an attenuation characteristic of the optical waveguide constituting the signal processing apparatus according to the present embodiment.

FIGS. 2A and 2B show an example and an attenuation characteristic of the optical waveguide constituting the signal processing apparatus according to the present embodiment, in which FIG. 2A is a schematic cross sectional view showing an example of the optical waveguide constituting the signal processing apparatus according to the present embodiment, and FIG. 2B is a graph showing a relation between an angle with respect to the laser diode and an input level of the photo detector, which represents the attenuation characteristic of the optical waveguide constituting the signal processing apparatus according to the present embodiment.

The optical waveguide 2A is a planar type optical waveguide for outputting the light input from an arbitrary direction through irregular reflection or scattering in an entire circumference direction. Herein, the reflection is a phenomenon in which traveling waves, or particles or the like collide against a medium different from the medium in travel or a boundary surface having a discontinuous change to change the direction and progress in a new direction in the original medium, and reflection waves progress in various directions if the concavity and convexity of the boundary surface are nearly equal to or larger than the wavelength. Such reflection is referred to as irregular reflection or diffuse reflection.

On the other hand, the scattering is a phenomenon in which when waves collide against an obstacle which is not so larger than the wavelength, waves spreading about it towards the surrounding are generated.

The optical waveguide 2A is provided with a first optical guide unit 20A formed of an optical guiding material having a first light transmittance in a predetermined wavelength domain and a second optical guide unit 21A formed of an optical guiding material having a second light transmittance different from the first light transmittance. According to the present example, the first optical guide unit 20A and the second optical guide unit 21A have both a disc shape, and the second optical guide unit 21A is provided on a lateral entire circumference of the first optical guide unit 20A.

The first optical guide unit 20A is formed of a transparent resin material or an air layer or the like having the first light transmittance in the predetermined wavelength domain. Also, the second optical guide unit 21A is formed of a transparent resin material or the like having the second light transmittance in the predetermined wavelength domain.

For example, according to the configuration in which the first optical guide unit 20A and the second optical guide unit 21A are both formed of the resin material, an outer circumference of the first optical guide unit 20A is configured to be in contact with an inner circumference of the second optical guide unit 21A at a boundary surface 22 between the first optical guide unit 20A and the second optical guide unit 21A.

Also, according to the configuration in which the first optical guide unit 20A is formed of the air layer, the second optical guide unit 21A is formed of the resin material, the inner circumference of the second optical guide unit 21A is configured to be in contact with the air layer at the boundary surface 22 between the first optical guide unit 20A and the second optical guide unit 21A.

Herein, in any of the above-mentioned configurations, while the center of the disc-shaped first optical guide unit 20A is matched with the center of the second optical guide unit 21A, the first optical guide unit 20A is arranged substantially at the center of the second optical guide unit 21A.

The optical waveguide 2A is provided with reflection members 23A on upper and lower surfaces of the second optical guide unit 21A. The reflection members 23A sandwich the second optical guide unit 21A from both sides while an outer circumferential surface of the second optical guide unit 21A is exposed across the entire circumference and also a reflection surface for reflecting the light is opposite to a plane surface of the second optical guide unit 21A.

Furthermore, the optical waveguide 2A is provided with irregular reflection members 24 on upper and lower surfaces of the first optical guide unit 20A. The irregular reflection members 24 sandwich the first optical guide unit 20A from both sides while an irregular reflection surface for irregularly reflecting the light is opposite, for example, to the first optical guide unit 20A which is the air layer.

Herein, according to the configuration in FIG. 2A, the irregular reflection members 24 are configured to further sandwich the reflection members 23A sandwiching the second optical guide unit 21A, and the irregular reflection surface opposite to the first optical guide unit 20A of the irregular reflection member 24 and the reflection surface opposite to the second optical guide unit 21A of the reflection members 23A have a distance in accordance with a thickness of the reflection members 23A.

It should be noted that the distance between the irregular reflection surface of the irregular reflection member 24 and the reflection surface of the reflection members 23A is not limited to this example and may be set closer to each other or may be on the same surface. Also, the irregular reflection surface of the irregular reflection member 24 may be located on an inner side than the reflection surface of the reflection members 23A.

That is, the distance between the irregular reflection surface of the irregular reflection member 24 and the reflection surface of the reflection members 23A may take any value as long as this is a predetermined distance satisfying a condition that the irregular reflection light measured in the outer circumference of the optical waveguide 2A has a sufficient intensity when the light is output from an arbitrary position of the outer circumference of the optical waveguide 2A towards a first optical guide unit 20B.

According to this, in the optical waveguide 2A, an arbitrary position of the outer circumferential surface of the second optical guide unit 21A becomes a light input output surface where the light is input and output from the outer circumferential surface of the second optical guide unit 21A, and also the light input to the second optical guide unit 21A is reflected by the reflection member 23A to be transmitted through the second optical guide unit 21A.

Also, the light transmitted through the second optical guide unit 21A is output from the first optical guide unit 20A in the entire circumference direction through the irregular reflection by the irregular reflection member 24 and refraction, reflection, and the like by the boundary surface 22 between the first optical guide unit 20A and the second optical guide unit 21A having the different light transmittance.

Furthermore, the light output from the first optical guide unit 20A in the entire circumference direction is transmitted through the second optical guide unit 21A and output from the outer circumferential surface of the second optical guide unit 21A.

Therefore, in the optical waveguide 2A, when the light is input from an arbitrary position on the outer circumference towards the first optical guide unit 20A, the light is output in the entire circumference direction by the first optical guide unit 20A, and light reception can be carried out at an arbitrary position on the outer circumference.

According to this, the master substrate 3M and the slave substrate 3S shown in FIG. 1A are arranged on the outer circumference of the optical waveguide 2A while light emission units which are not shown of the laser diodes 30M and 30S and light reception units which are not shown of the photo detectors 31M and 31S are opposite to the outer circumferential surface of the second optical guide unit 21A.

Figure 10:
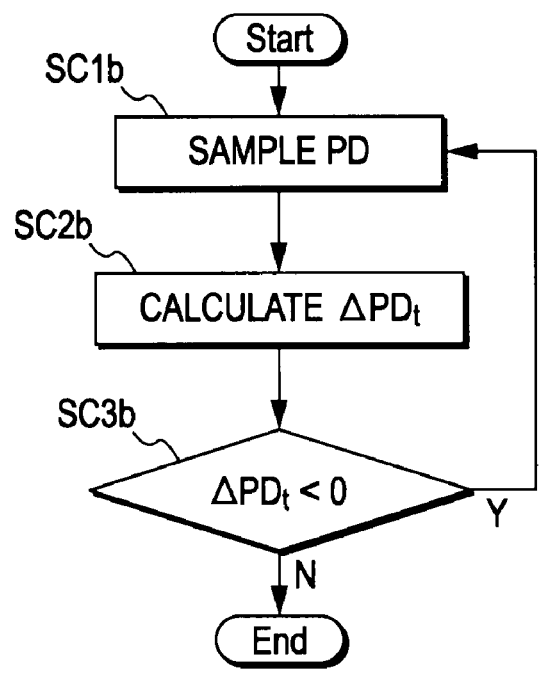
FIG. 10 is a flow chart showing an example of a method of checking that the processing is completed in the master substrate 3M and the slave substrate 3S.

In FIG. 2B, as shown in FIG. 10, a change in PD input value when an angle $\theta$ with respect to the laser diode 30S is moved while an angle $\alpha$ of the other photo detector $31M_2$ with respect to the one photo detector $31M_1$ is set as 5°.

As shown in FIG. 2B, it is understood that two pieces of the photo detectors 31M are configured to have an inclination to generate a different in the PD input levels, and the symmetric property is broken. At this time, the inclination angle of the other photo detector $31M_2$ with respect to the one photo detector $31M_1$ is desirably set in a range where the direction of the other photo detector $31M_2$ is in the inner side of the first optical guide unit 20A in the optical waveguide 2A.

It should be noted that the optical waveguide 2A is not limited to the configuration shown in FIG. 2A but may take any configuration as long as the condition is satisfied that the irregular reflection light measured in the outer circumference of the optical waveguide 2A has a sufficient intensity when the light is output from an arbitrary position of the outer circumference of the optical waveguide 2A.

Also, the optical waveguide 2A may be a polygonal shape instead of a circular shape. According to a configuration in which the optical waveguide has the polygonal shape, a side part except for an angle (apex) of the polygon may be set as the light input output surface.

<Control Function Example of the Master Substrate>

Figure 3:
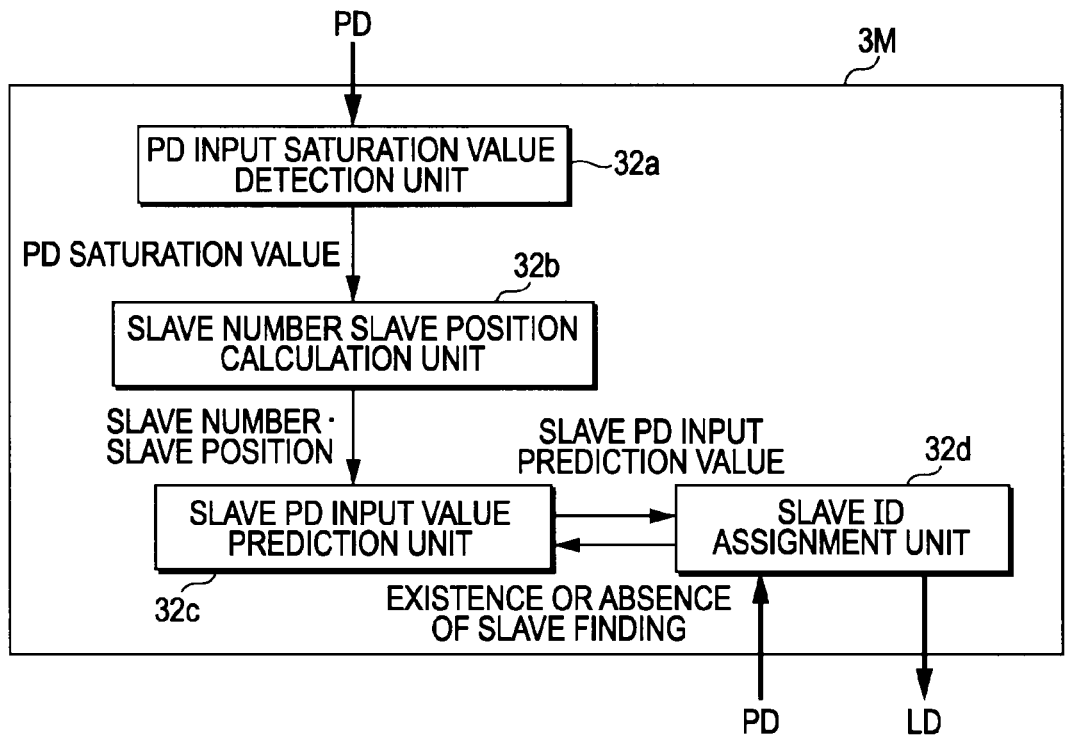
FIG. 3 is a function block diagram showing an example of a control system of the master substrate.

FIG. 3 is a function block diagram showing an example of a control system of the master substrate. The master substrate 3M is provided with a PD input saturation value detection unit 32a for detecting the input values of the photo detectors $31M_1$ and $31M_2$ and a slave position and number calculation unit for calculating the position and the number of the slave substrates 3S from the PD input values. Also, the master substrate is provided with a PD input value prediction unit 32c for predicting the PD input value of the slave substrate 3S whose position is decided and a slave ID assignment unit 32d for distinguishing the slave substrate 3S by utilizing the prediction value of the PD input value to assign an ID.

<Operation Example of the Signal Processing Apparatus According to the First Embodiment>

1. Processing for the Master Substrate to Recognize the Existence of the Slave Substrate Next, an outline of a processing executed by the master substrate 3M and the slave substrate 3S in order for the master substrate 3M to recognize the existence of the slave substrate 3S when the power source is ON will be described.

Figure 4:
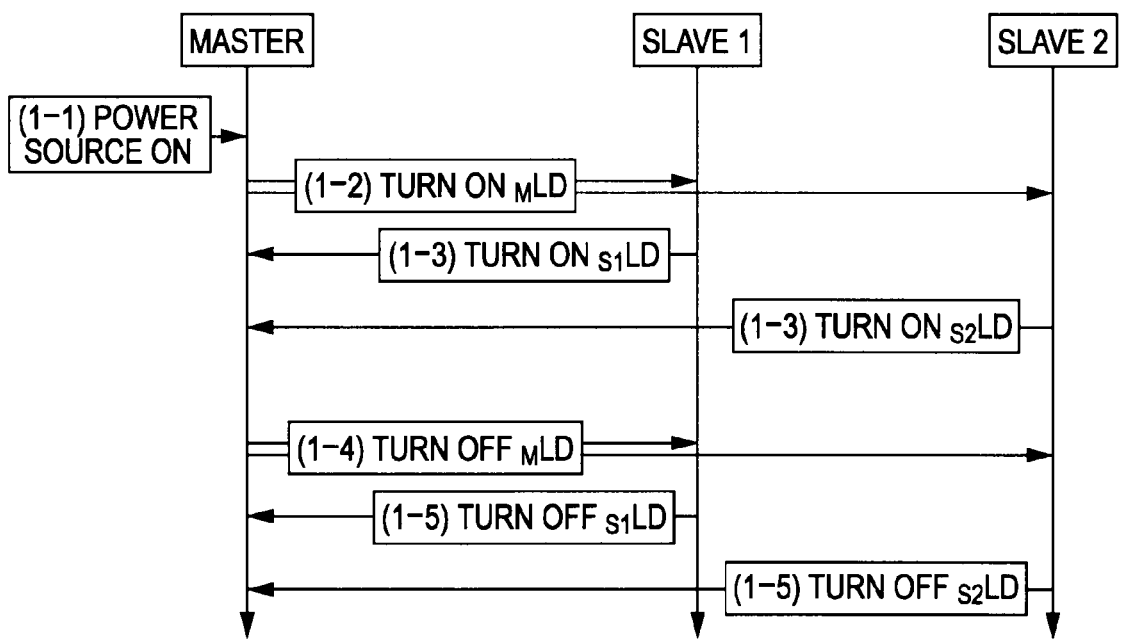
Figure 5:
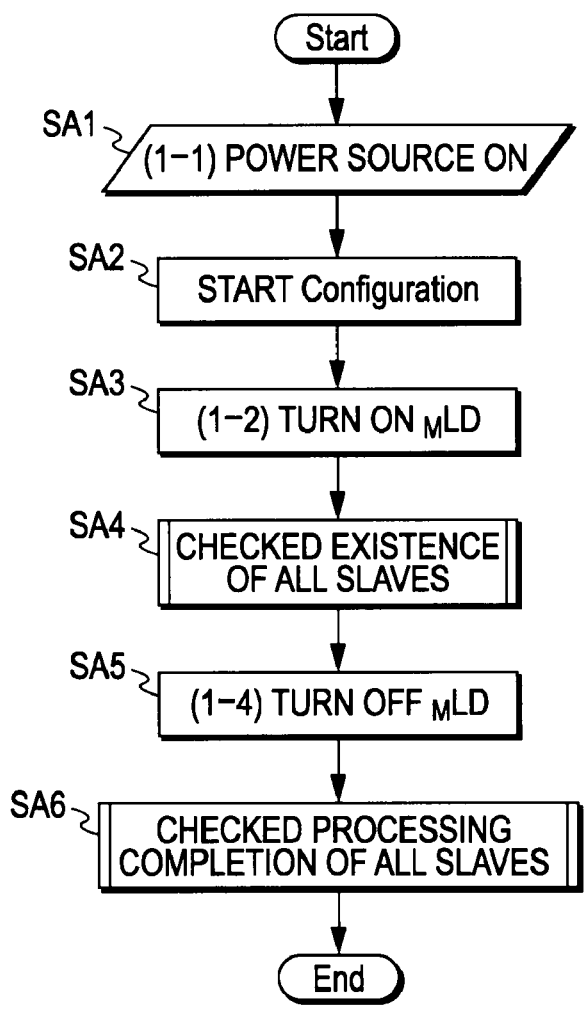
Figure 6:
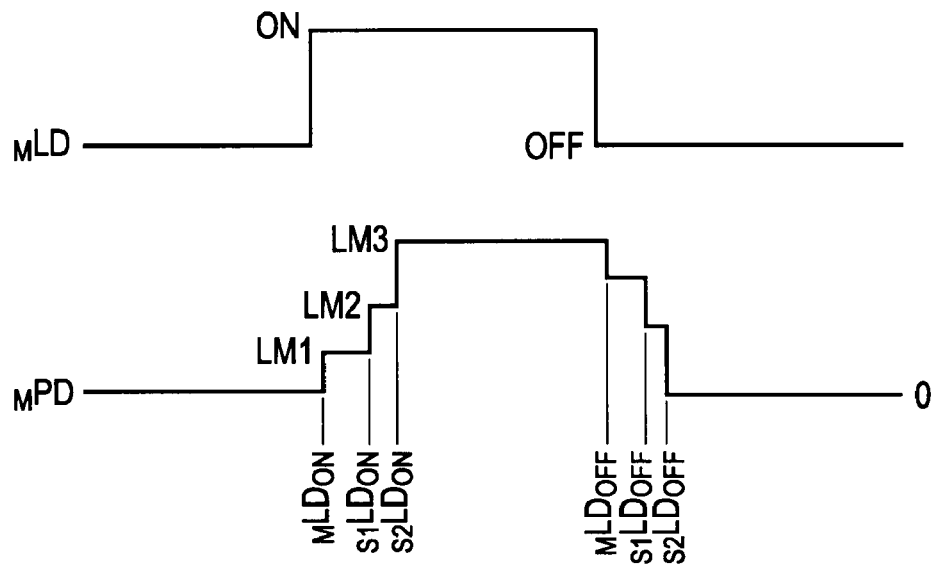
Figure 7:
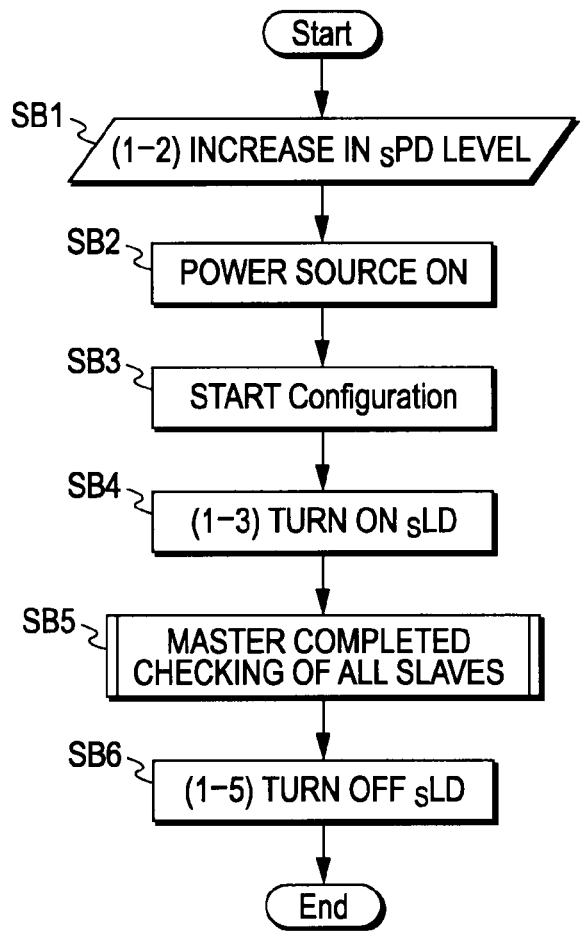
Figure 8:
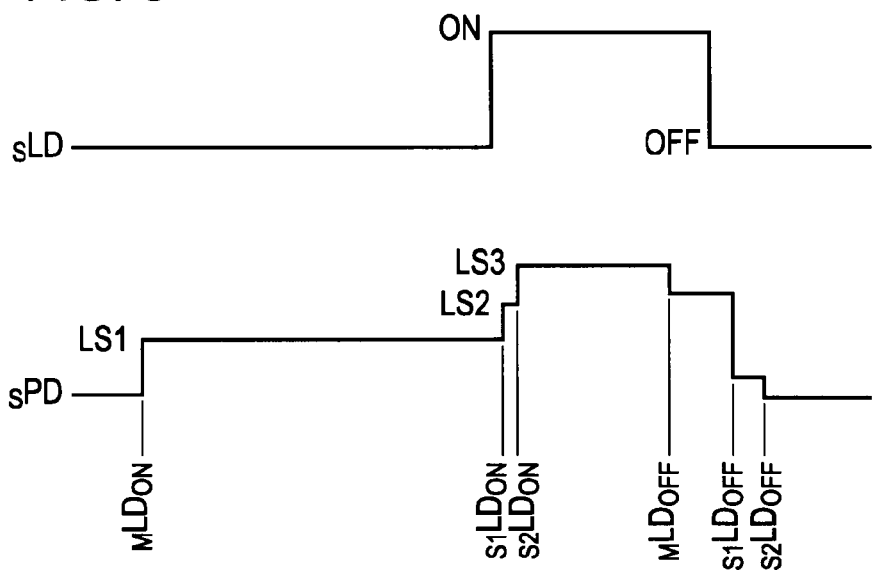

FIG. 4 is a time chart showing a processing when the power source is ON, FIG. 5 is a flow chart showing a processing of the master substrate 3M when the power source is ON, and FIG. 6 is a time chart showing level changes of the laser diode output and the photo detector input in the master substrate 3M when the power source is ON. Also, FIG. 7 is a flow chart showing a processing of the slave substrate 3S when the power source is ON, and FIG. 8 is a time chart showing level changes of the laser diode output and the photo detector input in the slave substrate 3S when the power source is ON.

(1-1) In step SA1 in FIG. 5, the power source of the master substrate 3M is turned ON. In the master substrate 3M, when the power source is ON, in step SA2, the configuration is started.

(1-2) In step SA3 in FIG. 5, when the power source is ON, the master substrate 3M turns ON the laser diode 30M of its own equipment ($_M$LD).

The optical waveguide 2A has a function with which the light input from an arbitrary position on the outer circumference is output in the entire circumference direction, and thus in the master substrate 3M, the light output from the laser diode 30M is input to the photo detector 31M of its own equipment ($_M$PD). According to this, the input level of the photo detector 31M increases to a level LM1 of FIG. 6.

Also, as the laser diode 30M of the master substrate 3M is turned ON, the light output from the master substrate 3M is transmitted through the optical waveguide 2A and input to the photo detector 31S ($_S$PD) of the slave substrate 3S. According to this, in step SB1 in FIG. 7, in the respective slave substrates 3S connected to the optical waveguide 2A, the input level of the photo detector 31S increases to a level LS1 of FIG. 8.

When the input level of the photo detector 31S increases, the slave substrate 3S turns ON the power source in step SB2, and in step SB3, the configuration is started.

(1-3) In step SB4 in FIG. 7, as the light output from the master substrate 3M is transmitted through the optical waveguide 2A and input to the photo detector 31S and the power source is turned ON, the respective slave substrates 3S turn ON the laser diodes 30S of its own equipment.

In response to the turning ON of the laser diode 30M of the master substrate 3M, when the laser diodes 30S of the respective slave substrates 3S are turned ON, the lights output from the respective slave substrates 3S are transmitted though the optical waveguide 2A and input to the photo detector 31M of the master substrate 3M.

As the lights output from the respective slave substrates are input to the photo detector 31M of the master substrate 3M, in the master substrate 3M, the input level of the photo detector 31M increases.

In FIG. 6, an example of a case where two sheets of the slave substrates 3S are connected is illustrated, and when the laser diode 30S ($_{S1}$LD) of the first slave substrate 3S is turned ON, in the master substrate 3M, the input level of the photo detector 31M increases to a level LM2. Furthermore, when the laser diode 30S ($_{S2}$LD) of the second slave substrate 3S is turned ON, the input level of the photo detector 31M increases to a level LM3.

In this manner, in the master substrate 3M, when the laser diode 30S is turned ON in the slave substrate 3S in response to the turning ON of the laser diode 30M of its own equipment, the input level of the photo detector 31M of the master substrate 3M increases until the laser diodes 30S of all the slave substrates 3S are turned ON and becomes a constant value when the laser diodes 30S of all the slave substrates 3S are turned ON.

In view of the above, when the input value of the photo detector 31M becomes the constant value, the master substrate 3M checks about the existence of all the slave substrates 3S connected to the optical waveguide 2A in step SA4 in FIG. 5. It should be noted that a detail of the processing for the master substrate 3M to check about the existence of the slave substrates 3S will be described below.

Also, in response to the turning ON of the laser diode 30M of the master substrate 3M, when the lights are output from the respective slave substrates 3S in the respective slave substrates 3S, the input level of the photo detector 31S increases.

For example, in the first slave substrate 3S, the light output when the laser diode 30S of its own equipment ($_{S1}$LD) is turned ON is input to the photo detector 31S of its own equipment. According to this, the input level of the photo detector 31S increases to a level LS2 of FIG. 8.

Also, in response to the turning ON of the laser diode 30M of the master substrate 3M, when the laser diode 30S of the second slave substrate 3S ($_{S2}$LD) is turned ON, in the first slave substrate 3S, the input level of the photo detector 31S increases to a level LS3. It should be noted that the second slave substrate side also has a similar operation.

(1-4) When the master substrate 3M checks about the existence of all the slave substrates 3S connected to the optical waveguide 2A, in step SA5 in FIG. 5, the laser diode 30M of its own equipment is turned OFF.

As the laser diode 30M of the master substrate 3M is turned OFF, in the slave substrate 3S, the input level of the photo detector 31S decreases from the level LS3 of FIG. 8.

In this manner, in the slave substrate 3S, in response to the turning ON of the laser diode 30M of the master substrate 3M, when the laser diode 30S is turned ON, the input level of the photo detector 31S increases until the laser diodes 30S of all the slave substrates 3S are turned ON and becomes a constant value when the laser diodes 30S of all the slave substrates 3S are turned ON.

Then, when the master substrate 3M checks about the existence of all the slave substrates 3S and the laser diode 30M is turned OFF, the input level of the photo detector 31S of the respective slave substrates 3S decreases from the constant value.

In view of the above, when the input value of the photo detector 31S decreases from the constant value, in step SB5 in FIG. 7, the slave substrate 3S determines that the master substrate 3M checked about the existence of all the slave substrates 3S. It should be noted that a detail of the processing for the slave substrate 3S to check that the master substrate 3M checked about the existence of the slave substrates 3S will be described below.

(1-5) When the respective slave substrates 3S determine that the master substrate 3M completed the checking about the existence of all the slave substrates 3S, in step SB6 in FIG. 7, the laser diode 30S of its own equipment is turned OFF.

As the laser diodes 30S of the respective slave substrates 3S are turned OFF, in the master substrate 3M, the input level of the photo detector decreases.

In this manner, in the master substrate 3M, when the laser diode 30S is turned OFF in the slave substrate 3S in response to the turning OFF of the laser diode 30M of its own equipment, the input level of the photo detector 31M of the master substrate 3M decreases until the laser diodes 30S of all the slave substrates 3S are turned OFF and becomes "0" when the laser diodes 30S of all the slave substrates 3S are turned OFF.

In view of the above, when the input value of the photo detector 31M becomes 0, in step SA6 in FIG. 5, the master substrate 3M determines that the processing is completed in all the slave substrates 3S, and the processing when the power source is ON is ended. It should be noted that a detail of the processing for the master substrate 3M to check that the slave substrates 3S completed the processing will be described below.

Next, in the flow chart when the power source is ON, a description will be given of the details of the processing for the master substrate 3M to check about the existence of the slave substrates 3S, the processing for the slave substrate 3S to check that the master substrate 3M checked about the existence of the slave substrates 3S, and the processing for the master substrate 3M to check that the slave substrates 3S completed the processing.

FIGS. 9 to 15 are flow charts showing an example of a method of checking that the processing is completed in the master substrate 3M and the slave substrate 3S.

Where, T=0, 1, . . . t, . . . is set as a sampling interval of X. Also, a differential coefficient of X is defined as the following (1) expression, and an integral value of X is defined as the following (2) expression. It should be noted that ϵ is a sufficiently small positive number.

[Expression 1]

$$\Delta X_t = X_t - X_{t-1} \quad (1)$$

$$SumX_t = \sum_{i=t_0}^{t} X_i \quad (2)$$

Figure 9:
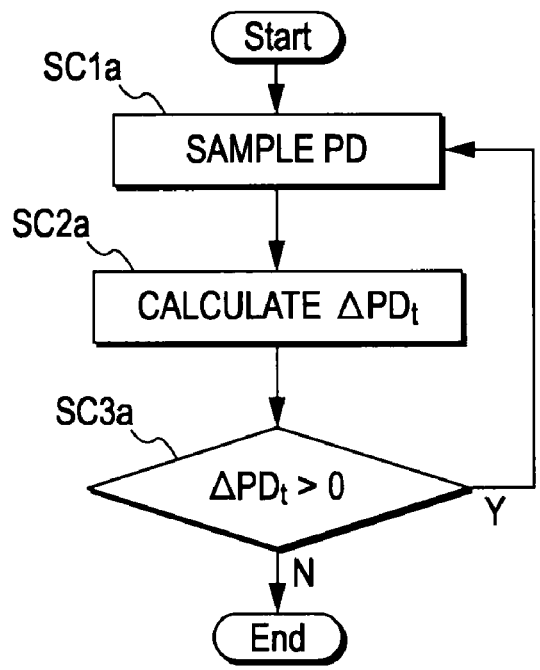
FIG. 9 is a flow chart showing an example of a method of checking that the processing is completed in the master substrate 3M and the slave substrate 3S.

In the flow chart of FIG. 9, in step SC1a, the PD input value of the photo detector 31M (the photo detector 31S) is sampled, and in step SC2a, $\Delta PD_t$ is calculated.

Then, in step SC3a, while it is determined that $\Delta PD_6 > 0$ is established, by utilizing the change in which the differential coefficient of the PD input values becomes 0 from a positive value, in the flow chart when the power source is ON, it is checked that the processing is completed in the master substrate 3M and the slave substrate 3S.

In the flow chart of FIG. 10, in step SC1b, the PD input value of the photo detector 31M (the photo detector 31S) is sampled, and in step SC2b, $\Delta PD_t$ is calculated.

Then, in step SC3b, while it is determined that $\Delta PD_t < 0$ is established, by utilizing the change in which the differential coefficient of the PD input values becomes 0 from a negative value, in the flow chart when the power source is ON, it is checked that the processing is completed in the master substrate 3M and the slave substrate 3S.

Figure 11:
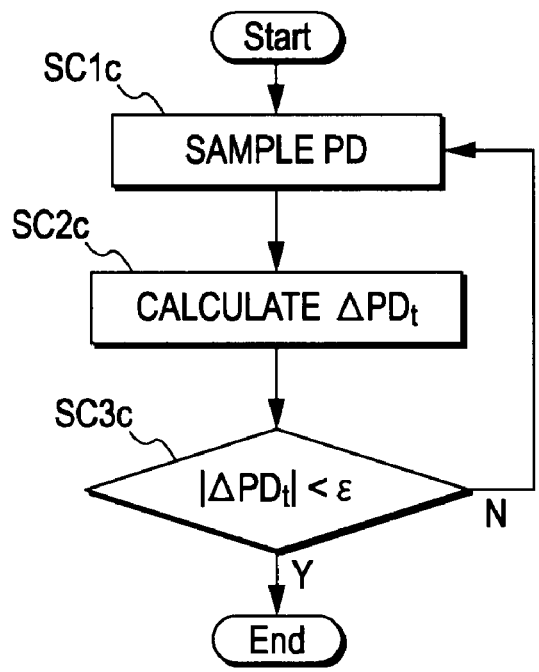
FIG. 11 is a flow chart showing an example of a method of checking that the processing is completed in the master substrate 3M and the slave substrate 3S.

In the flow chart of FIG. 11, in step SC1c, the PD input value of the photo detector 31M (the photo detector 31S) is sampled, and in step SC2c, $\Delta PD_t$ is calculated.

Then, in step SC3c, while it is determined that $|\Delta PD_t| < \epsilon$ is established, by utilizing the change in which the value of the PD input value becomes constant (the differential coefficient of the PD input value becomes 0), in the flow chart when the power source is ON, it is checked that the processing is completed in the master substrate 3M and the slave substrate 3S.

Figure 12:
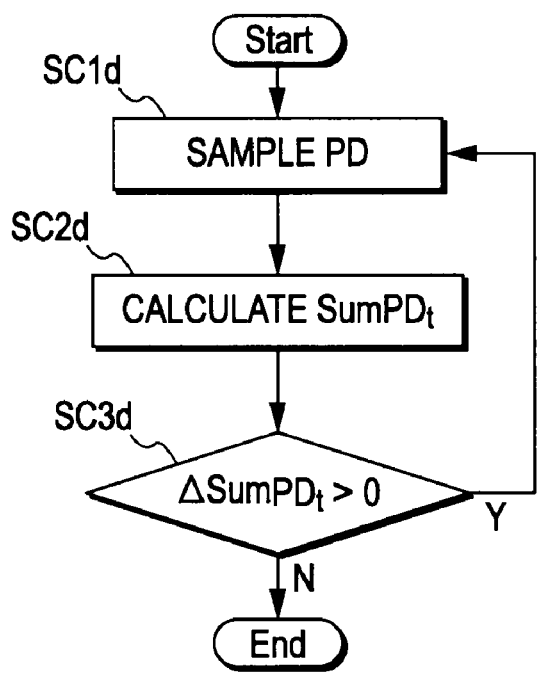
FIG. 12 is a flow chart showing an example of a method of checking that the processing is completed in the master substrate 3M and the slave substrate 3S.

In the flow chart of FIG. 12, in step SC1d, the PD input value of the photo detector 31M (the photo detector 31S) is sampled, and in step SC2d, $SumPD_t$ is calculated.

Then, in step SC3d, while it is determined that $SumPD_t > 0$ is established, by utilizing the change in which the differential coefficient of the integral value (mean value) of the PD input values becomes 0 from a positive value, in the flow chart when the power source is ON, it is checked that the processing is completed in the master substrate 3M and the slave substrate 3S.

Figure 13:
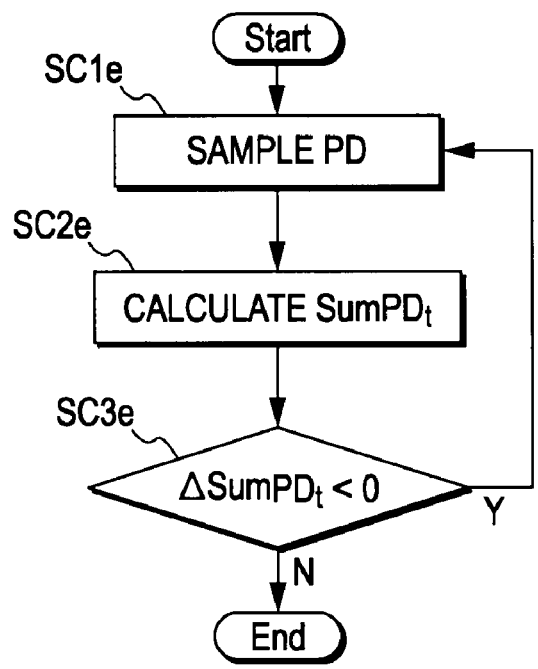
FIG. 13 is a flow chart showing an example of a method of checking that the processing is completed in the master substrate 3M and the slave substrate 3S.

In the flow chart of FIG. 13, in step SC1e, the PD input value of the photo detector 31M (the photo detector 31S) is sampled, and in step SC2e, $SumPD_t$ is calculated.

Then, in step SC3e, while it is determined that $SumPD_t < 0$ is established, by utilizing the change in which the differential coefficient of the integral value (mean value) of the PD input values becomes 0 from a negative value, in the flow chart when the power source is ON, it is checked that the processing is completed in the master substrate 3M and the slave substrate 3S.

Figure 14:
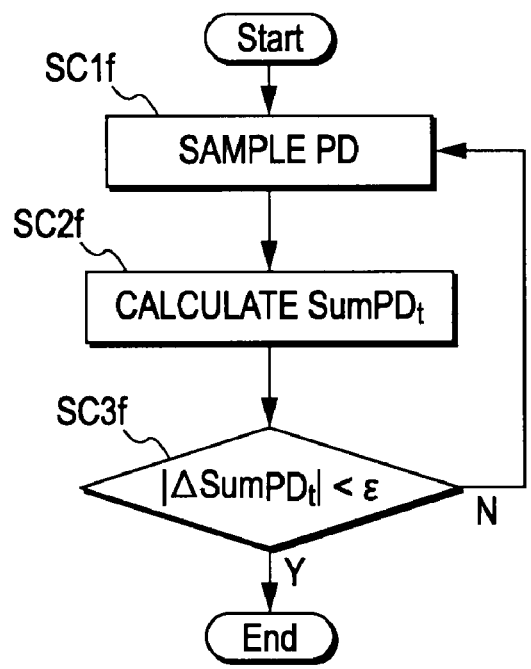
FIG. 14 is a flow chart showing an example of a method of checking that the processing is completed in the master substrate 3M and the slave substrate 3S.

In the flow chart of FIG. 14, in step SC1f, the PD input value of the photo detector 31M (the photo detector 31S) is sampled, and in step SC2f, $SumPD_t$ is calculated.

Then, in step SC3f, while it is determined that $|SumPD_t| < \epsilon$ is established, by utilizing the change in which the integral value (mean value) of the PD input values becomes constant, in the flow chart when the power source is ON, it is checked that the processing is completed in the master substrate 3M and the slave substrate 3S.

Figure 15:
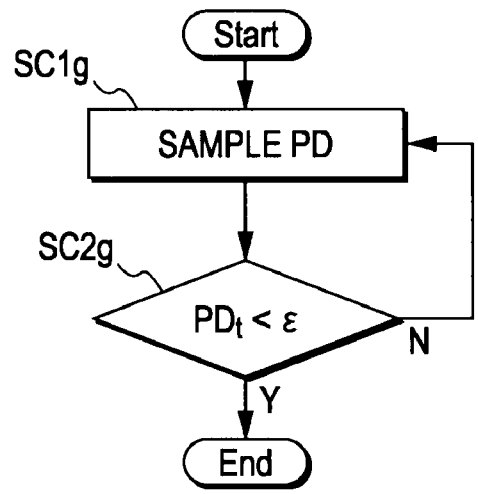
FIG. 15 is a flow chart showing an example of a method of checking that the processing is completed in the master substrate 3M and the slave substrate 3S.

In the flow chart of FIG. 15, in step SC1g, the PD input value of the photo detector 31M (the photo detector 31S) is sampled.

Then, in step SC2g, while it is determined that $PD_t < \epsilon$ is established, by utilizing the change in which the value of the PD input value becomes 0, in the flow chart when the power source is ON, it is checked that the processing is completed in the master substrate 3M and the slave substrate 3S.

It should be noted that in the flow chart when the power source is ON, as a method of checking that the processing is completed in the master substrate 3M and the slave substrate 3S, the processings in FIGS. 9 to 15 may be combined to be carried out.

Next, a circuit configuration for realizing the method of checking that the processing is completed in the master substrate 3M and the slave substrate 3S will be described.

Figure 16:
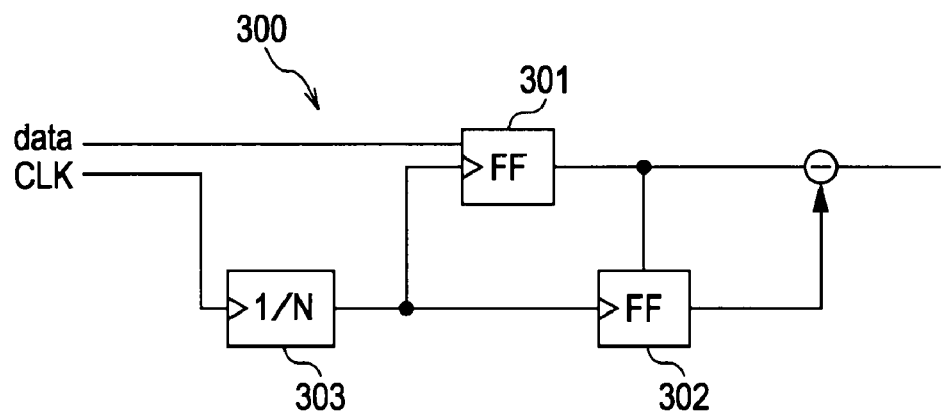
FIG. 16 is a block diagram showing an example of a differentiation circuit for calculating a differential value of an input value of the photo detector.
Figure 17:
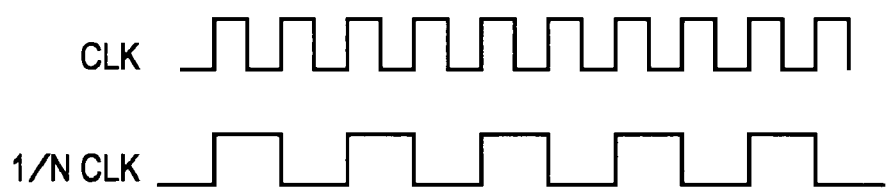
FIG. 17 is a waveform chart of a clock showing a sampling interval in the differentiation circuit.

FIG. 16 is a block diagram showing an example of a differentiation circuit for calculating a differential value of an input value of the photo detector, and FIG. 17 is a waveform chart of a clock showing a sampling interval in the differentiation circuit.

A differentiation circuit 300 is provided with flip-flops 301 and 302 and a frequency divider 303.

Incidentally, it is conceivable that the level change of the photo detector 31M (31S) monotonically increases and decreases, the level increase in the photo detector is based on the turning ON of the laser diode 30S(30M), and the level increase in the photo detector saturates in a sufficiently short period of time.

Also, an interval for the level increase in the photo detector based on the turning ON of the laser diodes on the respective substrates is pursuant to an interval when the configuration of the circuit on the respective substrate is ended. It is conceivable that this interval for the level increase in the photo detector is sufficiently longer as compared with the time from the turning ON of the laser diode to the saturation.

Therefore, in the differentiation circuit 300, a difference of the input values of the photo detector may be taken in a longer interval as compared with the sampling interval (CLK) of the input value of the photo detector.

Figure 18:
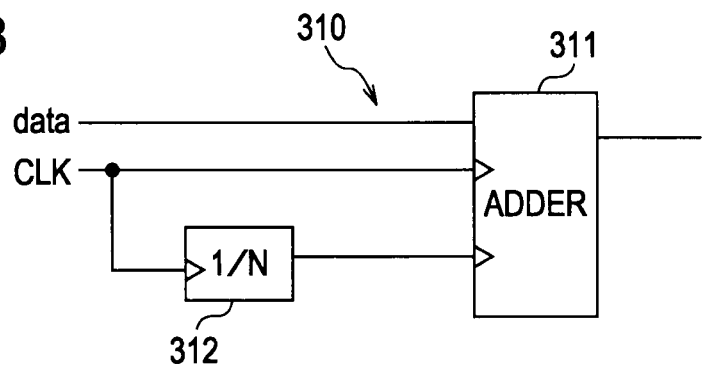
FIG. 18 is a block diagram showing an example of an integration circuit for calculating an integral value of an input value of the photo detector.
Figure 19:
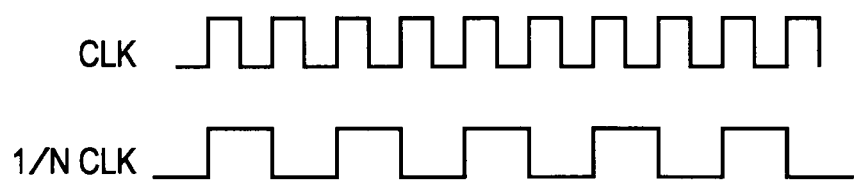
FIG. 19 is a waveform chart of a clock showing a sampling interval in the integration circuit.

FIG. 18 is a block diagram showing an example of an integration circuit for calculating an integral value of an input value of the photo detector, and FIG. 19 is a waveform chart of a clock showing a sampling interval in the integration circuit.

An integration circuit 310 is provided with an adder 311 and a frequency divider 312. The adder 311 has a register inside and holds a result obtained by adding an input value. Then, the integration circuit 310 outputs the addition result by way of a pulse output from a PLL circuit which is not shown and clears the value.

Figure 20:
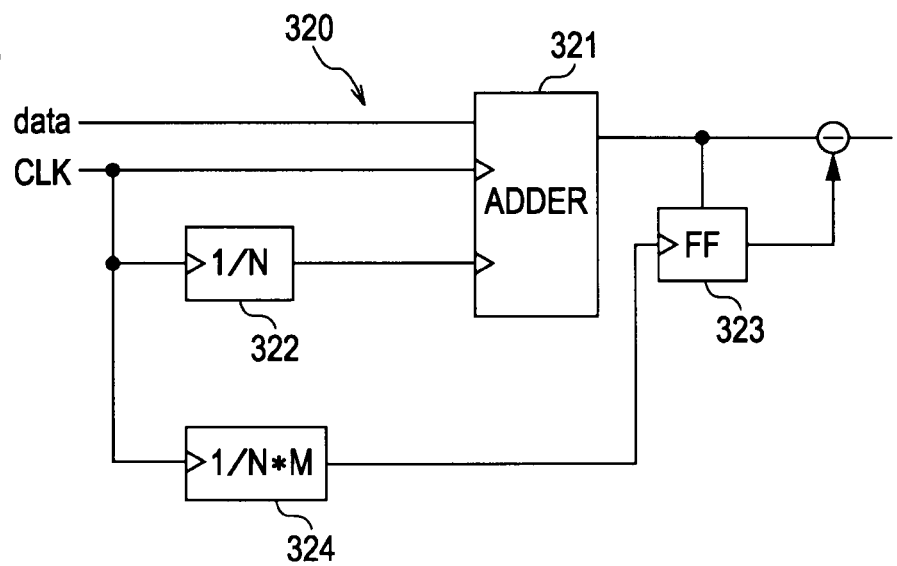
FIG. 20 is a block diagram showing an example of a differentiation integration circuit for calculating an integral value of an input value of the photo detector and calculating a differential integral value of this integral value.
Figure 21:
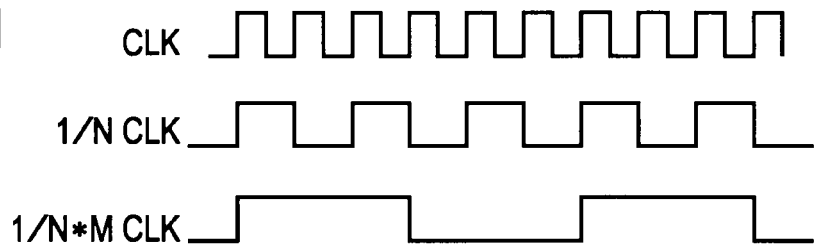
FIG. 21 is a waveform chart of a clock showing a sampling interval in the differentiation integration circuit.

FIG. 20 is a block diagram showing an example of a differentiation integration circuit for calculating an integral value of an input value of the photo detector and calculating a differential integral value of this integral value, and FIG. 21 is a waveform chart of a clock showing a sampling interval in the differentiation integration circuit.

A differentiation integration circuit 320 is provided with an adder 321 and a frequency divider 322 which constitute an integration circuit and a flip-flop 323 and a frequency divider 324 which constitute a differentiation circuit for differentiating the output of the adder 321.

Figure 22:
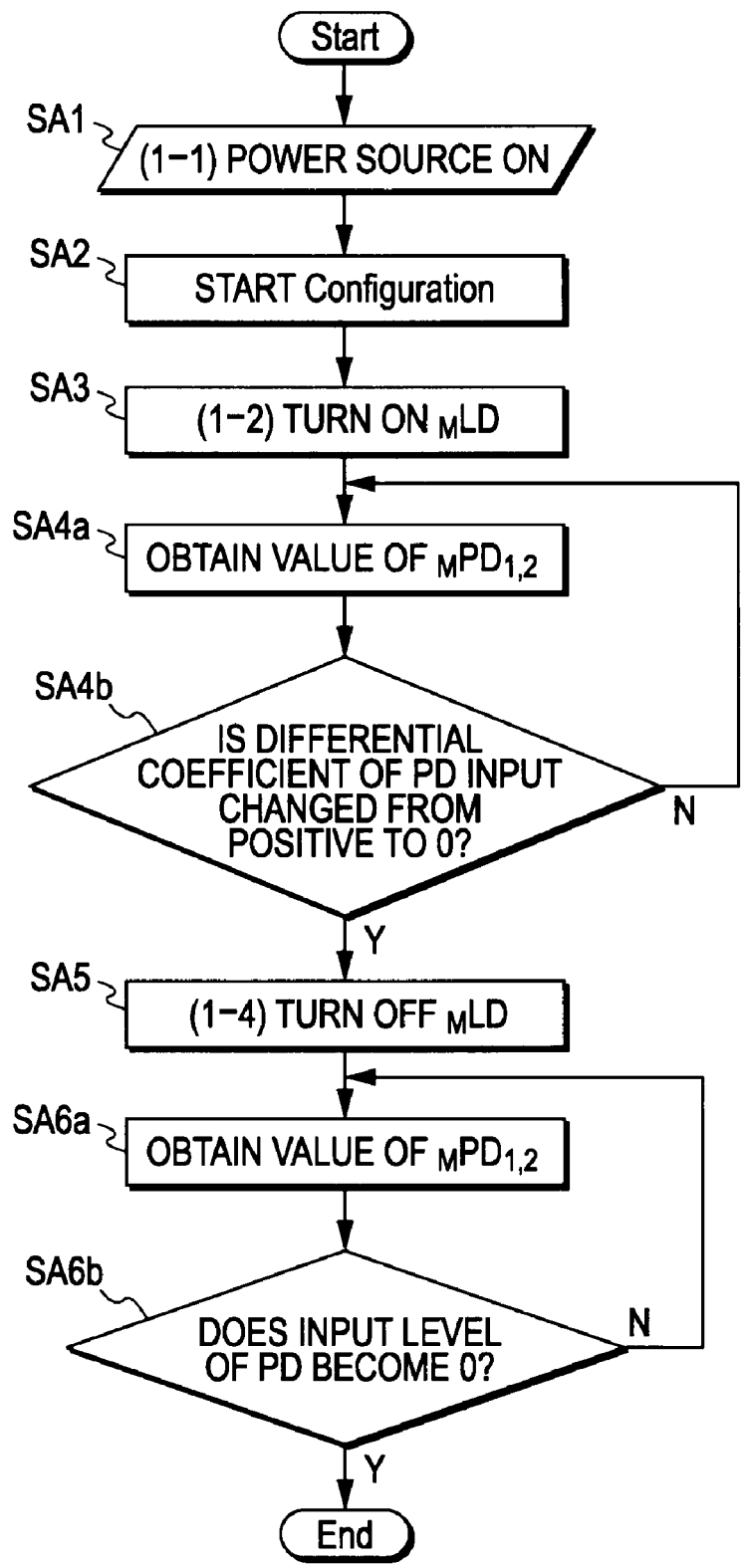

FIG. 22 is a flow chart showing a detail of the processing of the master substrate 3M when the power source is ON, and next, a description will be given of the detail of the processing by the master substrate 3M when the power source is ON. It should be noted that in FIG. 22, for the same processing described in the flow chart of FIG. 5, the same processing step number is assigned.

As described above, in the master substrate 3M, when the laser diode 30S of the slave substrate 3S is turned ON in step SB4 in FIG. 7 in response to the turning ON of the laser diode 30M of its own equipment in step SA3 in the flow chart of FIG. 5 (FIG. 22), the input level of the photo detector 31M of the master substrate 3M increases until the laser diodes 30S of all the slave substrates 3S are turned ON and becomes a constant value when the laser diodes 30S of all the slave substrates 3S are turned ON.

In view of the above, in step SA4a in FIG. 22, the master substrate 3M obtains the input value of the photo detector 31M, and in step SA4b, determines that the input value of the photo detector 31M becomes the constant value, for example, on the basis of whether or not the differential coefficient of the input value is changed from positive to 0 through the processing of the flow chart of FIG. 9.

Then, when the differential coefficient of the input value of the photo detector 31M is changed from positive to 0, the master substrate 3M determines that the existence of all the slave substrates 3S connected to the optical waveguide 2A is checked, and in step SA5 in FIG. 5 (FIG. 22), the laser diode 30M of its own equipment is turned OFF.

Also, in the master substrate 3M, in response to the turning OFF of the laser diode 30M of its own equipment, in step SB6 in FIG. 7, when the laser diode 30S of the slave substrate 3S is turned OFF, the input level of the photo detector 31M of the master substrate 3M decreases until the laser diodes 30S of all the slave substrates 3S are turned OFF and becomes "0" when the laser diodes 30S of all the slave substrates 3S are turned OFF.

In view of the above, in step SA6a in FIG. 22, the master substrate 3M obtains the input value of the photo detector 31M, and in step SA6b, determines whether or not the input value of the photo detector 31M becomes 0, for example, through the processing of the flow chart of FIG. 15.

Then, when the input value of the photo detector 31M becomes 0, the master substrate 3M determines that the processing when the power source is ON is completed in all the slave substrates 3S, and the processing when the power source is ON is ended.

Figure 23:
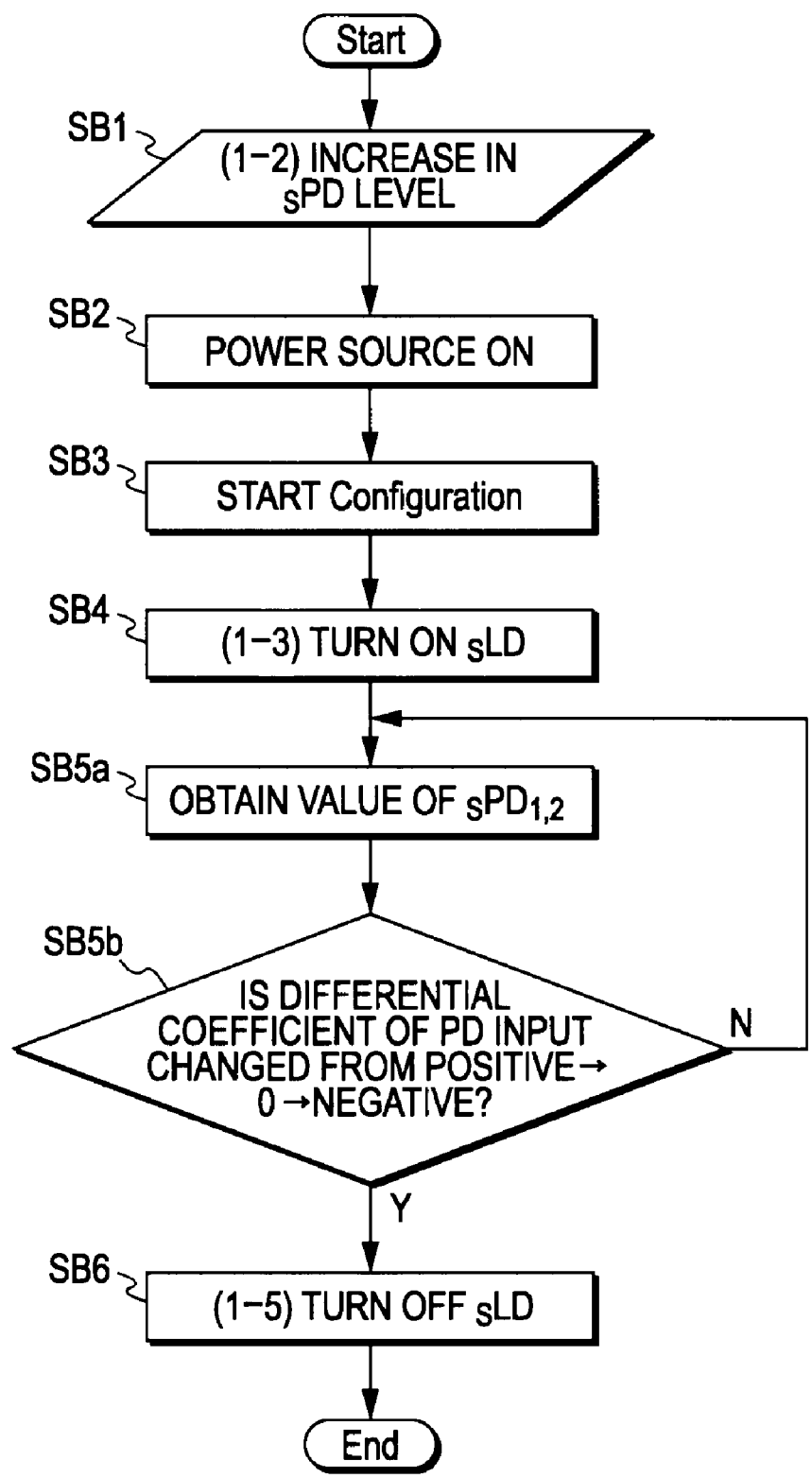

FIG. 23 is a flow chart showing a detail of the processing of the slave substrate 3S when the power source is ON, and next, a description will be given of the detail of the processing when the power source is ON in the slave substrate 3S. It should be noted that in FIG. 23, for the same processing described in the flow chart of FIG. 7, the same processing step number is assigned.

As described above, in the slave substrate 3S, in response to the turning ON of the laser diode 30M of the master substrate 3M in step SA3 in FIG. 5 (FIG. 22), when the laser diode 30S is turned ON in step SB4 in FIG. 7 (FIG. 23), the input level of the photo detector 31S increases until the laser diodes 30S of all the slave substrates 3S are turned ON and becomes a constant value when the laser diodes 30S of all the slave substrates 3S are turned ON.

Then, the master substrate 3M checks about the existence of all the slave substrates 3S, and when the laser diode 30M is turned OFF, in step SA5, the input level of the photo detector 31S of the respective slave substrates 3S decreases from the constant value.

In view of the above, in step SB5a in FIG. 23, the slave substrate 3S obtains the input value of the photo detector 31S, and in step SB5b, determines that the input value of the photo detector 31S decreases from the constant value, for example, on the basis of whether or not the differential coefficient of the input value is changed from positive to 0 and thereafter changed from 0 to negative through the processing of the flow chart of FIG. 9.

Then, when the differential coefficient of the input value of the photo detector 31S is changed from positive to 0 and thereafter changed from 0 to negative, the slave substrate 3S determines that the master substrate 3M checked about the existence of all the slave substrates 3S, and in step SB6 in FIG. 7 (FIG. 23), the laser diode 30S of its own equipment is turned OFF.

2. Processing for the Master Substrate to Decide the Arrangement and the Number of the Slave Substrates Next, in order for the master substrate 3M to decide the arrangement and the number of the slave substrates 3S, an outline of the processings executed in the master substrate 3M and the slave substrate 3S will be described.

Figure 24:
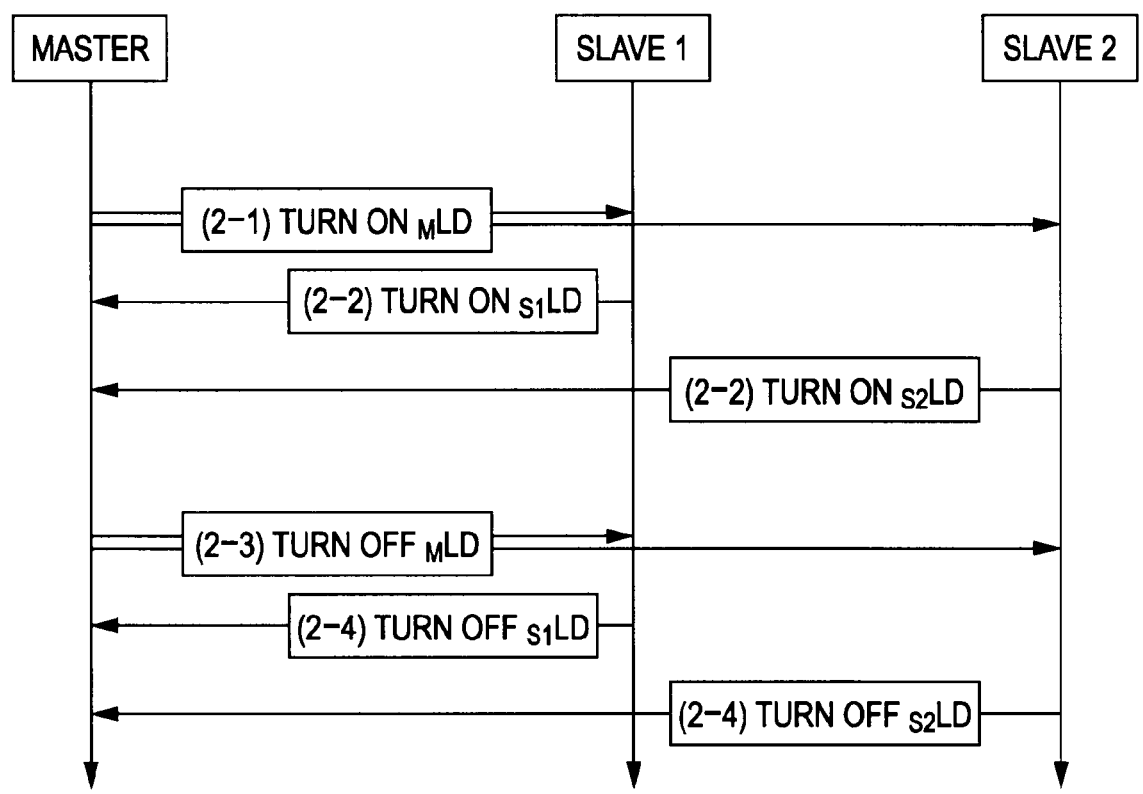
FIG. 24 is a timing chart showing a processing of deciding the arrangement and the number of slave substrates 3S.
Figure 25:
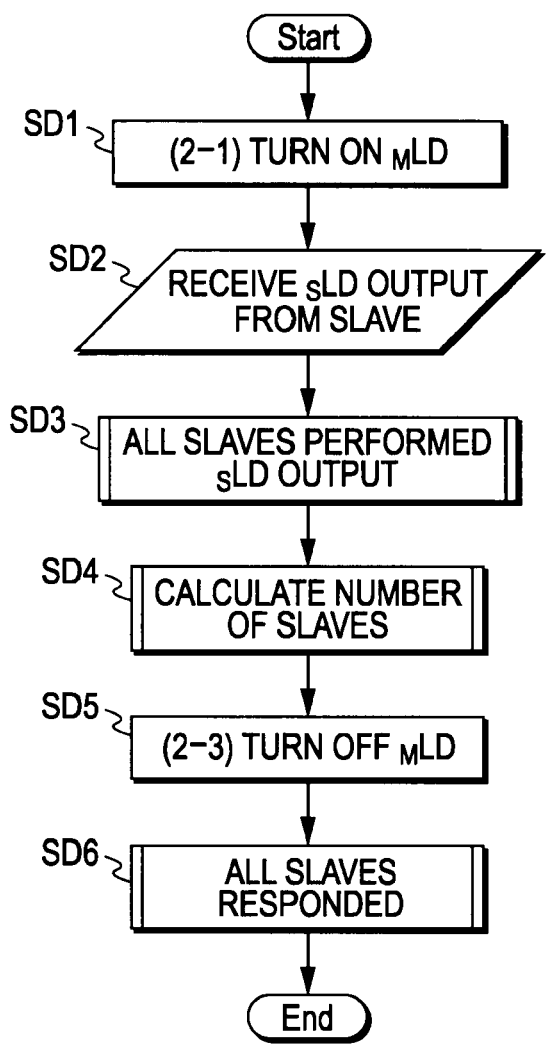
FIG. 25 is a flow chart showing a processing of the master substrate 3M when the arrangement and the number of slave substrates 3S are decided.
Figure 26:
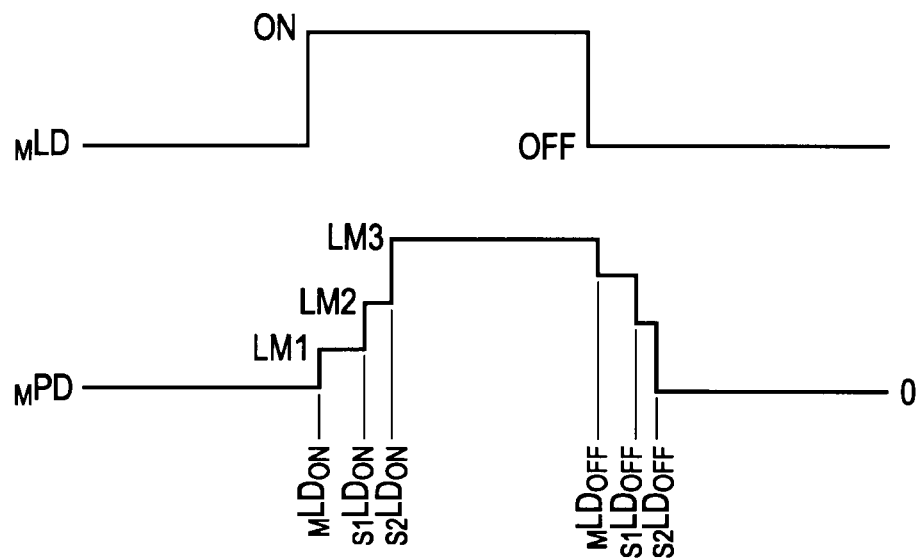
FIG. 26 is a time chart showing the level changes in the laser diode output and the photo detector input in the master substrate 3M when the arrangement and the number of slave substrates 3S are decided.
Figure 27:
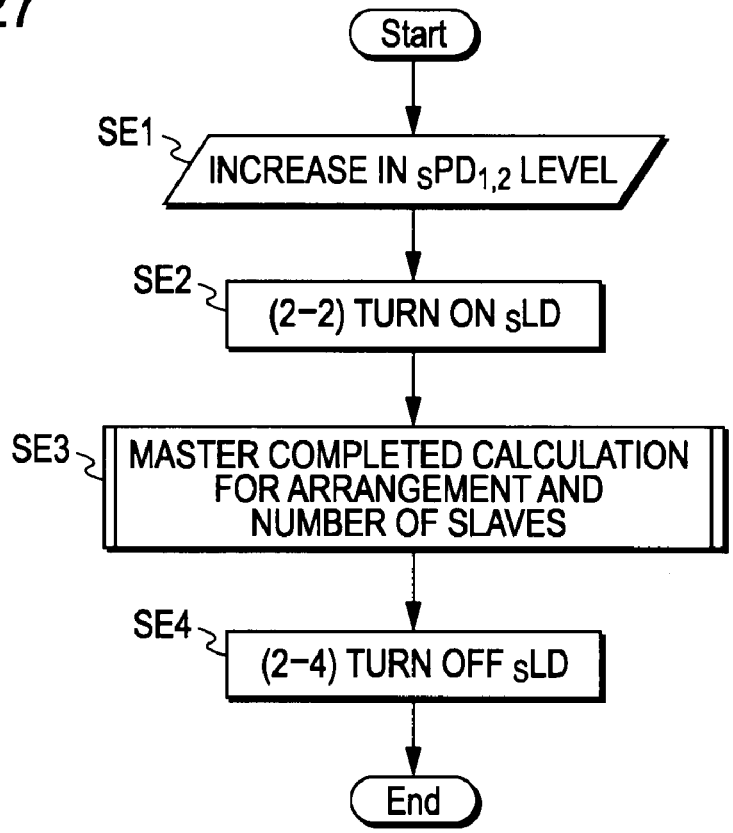
FIG. 27 is a flow chart showing a processing of the slave substrate 3S when the arrangement and the number of slave substrates 3S are decided.
Figure 28:
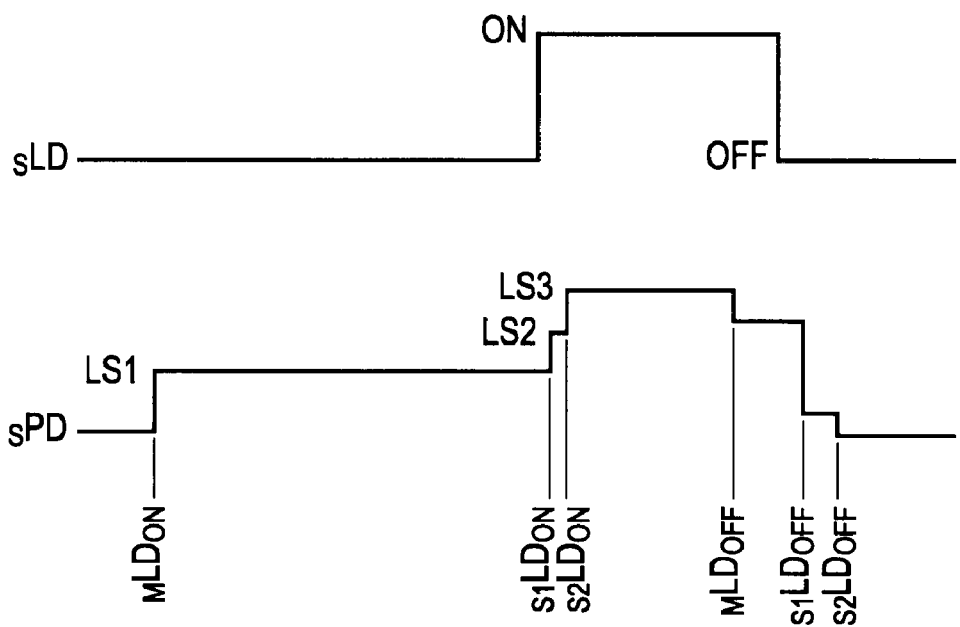
FIG. 28 is a time chart showing the level changes in the laser diode output and the photo detector input in the slave substrate 3S when the arrangement and the number of slave substrates 3S are decided.

FIG. 24 is a timing chart showing a processing of deciding the arrangement and the number of slave substrates 3S, FIG. 25 is a flow chart showing a processing of the master substrate 3M when the arrangement and the number of slave substrates 3S are decided, and FIG. 26 is a time chart showing the level changes in the laser diode output and the photo detector input in the master substrate 3M when the arrangement and the number of slave substrates 3S are decided. Also, FIG. 27 is a flow chart showing a processing of the slave substrate 3S when the arrangement and the number of slave substrates 3S are decided, FIG. 28 is a time chart showing the level changes in the laser diode output and the photo detector input in the slave substrate 3S when the arrangement and the number of slave substrates 3S are decided.

(2-1) In step SD1 in FIG. 25, the master substrate 3M turns ON the laser diode 30M ($_M$LD) of its own equipment.

As described above, in the master substrate 3M, the light output from the laser diode 30M is transmitted through the optical waveguide 2A and input to the photo detector 31M ($_M$PD) of its own equipment. According to this, the input level of the photo detector 31M increases to the level LM1 of FIG. 26.

Also, as the laser diode 30M of the master substrate 3M is turned ON, the light output from the master substrate 3M is transmitted through the optical waveguide 2A and input to the photo detector 31S ($_S$PD) of the slave substrate 3S. According to this, in step SE1 in FIG. 27, in the respective slave substrates 3S connected to the optical waveguide 2A, the input level of the photo detector 31S increases to the level LS1 of FIG. 28.

(2-2) In step SE2 in FIG. 27, as the light output from the master substrate 3M is input the photo detector 31S, when the input level of the photo detector 31S increases to the predetermined value (LS1), the respective slave substrates 3S turn ON the laser diodes 30S of its own equipment.

In response to the turning ON of the laser diode 30M of the master substrate 3M, when the laser diodes 30S of the respective slave substrates 3S are turned ON, the lights output from the respective slave substrates 3S are transmitted though the optical waveguide 2A and input to the photo detector 31M of the master substrate 3M in step SD2 in FIG. 25.

As the lights output from the respective slave substrates are input to the photo detector 31M of the master substrate 3M, in the master substrate 3M, the input level of the photo detector 31M increases.

In FIG. 26 also, an example of a case where two sheets of the slave substrates 3S are connected is illustrated, and when the laser diode 30S ($_{S1}$LD) of the first slave substrate 3S is turned ON, in the master substrate 3M, the input level of the photo detector 31M increases to the level LM2. Furthermore, when the laser diode 30S ($_{S2}$LD) of the second slave substrate 3S is turned ON, the input level of the photo detector 31M increases to the level LM3.

As described above, in the master substrate 3M, when the laser diode 30S is turned ON in the slave substrate 3S in response to the turning ON of the laser diode 30M of its own equipment, the input level of the photo detector 31M of the master substrate 3M increases until the laser diodes 30S of all the slave substrates 3S are turned ON and becomes a constant value when the laser diodes 30S of all the slave substrates 3S are turned ON.

In view of the above, when the input value of the photo detector 31M becomes the constant value, in step SD3 in FIG. 25, the master substrate 3M checks that the output of the laser diode 30S is carried out in all the slave substrates 3S connected to the optical waveguide 2A. It should be noted that a detail of the processing for the master substrate 3M to check that the output of the laser diode 30S is carried out in the slave substrates 3S will be described below.

Also, in response to the turning ON of the laser diode 30M of the master substrate 3M, when the lights are output from the respective slave substrates 3S in the respective slave substrates 3S, the input level of the photo detector 31S increases.

For example, in the first slave substrate 3S, the light output when the laser diode 30S of its own equipment ($_{S1}$LD) is turned ON is input to the photo detector 31S of its own equipment. According to this, the input level of the photo detector 31S increases to the level LS2 of FIG. 28.

Also, in response to the turning ON of the laser diode 30M of the master substrate 3M, when the laser diode 30S of the second slave substrate 3S ($_{S2}$LD) is turned ON, in the first slave substrate 3S, the input level of the photo detector 31S increases to the level LS3. It should be noted that the second slave substrate side also has a similar operation.

When the master substrate 3M checks that the output of the laser diode 30S is carried out in all the slave substrates 3S connected to the optical waveguide 2A, in step SD4 in FIG. 25, the arrangement and the number of the slave substrates 3S are calculated. It should be noted that a detail of the processing for the master substrate 3M to calculate the arrangement and the number of the slave substrates 3S will be described below.

(2-3) When the master substrate 3M calculates the arrangement and the number of the slave substrates 3S connected to the optical waveguide 2A, in step SD5 in FIG. 25, the laser diode 30M of its own equipment is turned OFF.

As the laser diode 30M of the master substrate 3M is turned OFF, in the slave substrate 3S, the input level of the photo detector 31S decreases from the level LS3 of FIG. 28.

As described above, in the slave substrate 3S, in response to the turning ON of the laser diode 30M of the master substrate 3M, when the laser diode 30S is turned ON, the input level of the photo detector 31S increases until the laser diodes 30S of all the slave substrates 3S are turned ON and becomes a constant value when the laser diodes 30S of all the slave substrates 3S are turned ON.

Then, the master substrate 3M calculates the arrangement and the number of all the slave substrates 3S, and when the laser diode 30M is turned OFF, the input level of the photo detector 31S of the respective slave substrates 3S decreases from the constant value.

In view of the above, when the input value of the photo detector 31S decreases from the constant value, in step SE3 in FIG. 27, the slave substrate 3S determines that the master substrate 3M completes the calculation for the arrangement and the number of the slave substrates 3S. It should be noted that a detail of the processing for the slave substrate 3S to check that the calculation for the arrangement and the number of the slave substrate 3S is completed by the master substrate 3M will be described below.

(2-4) When the respective slave substrates 3S determine that the calculation for the arrangement and the number of all the slave substrates 3S is completed by the master substrate 3M, in step SE4 in FIG. 27, the laser diode 30S of its own equipment is turned OFF.

As the laser diodes 30S of the respective slave substrates 3S are turned OFF, in the master substrate 3M, the input level of the photo detector decreases.

As described above, in the master substrate 3M, when the laser diode 30S is turned OFF in the slave substrate 3S in response to the turning OFF of the laser diode 30M of its own equipment, the input level of the photo detector 31M of the master substrate 3M decreases until the laser diodes 30S of all the slave substrates 3S are turned OFF and becomes "0" when the laser diodes 30S of all the slave substrates 3S are turned OFF.

In view of the above, when the input value of the photo detector 31M becomes 0, in step SD6 in FIG. 25, the master substrate 3M determines that all the slave substrates 3S responded, and the processing of calculating the arrangement and the number of the slave substrate 3S is ended. It should be noted that a detail of the processing for the master substrate 3M to determine that the slave substrates 3S responded will be described below.

Figure 29:
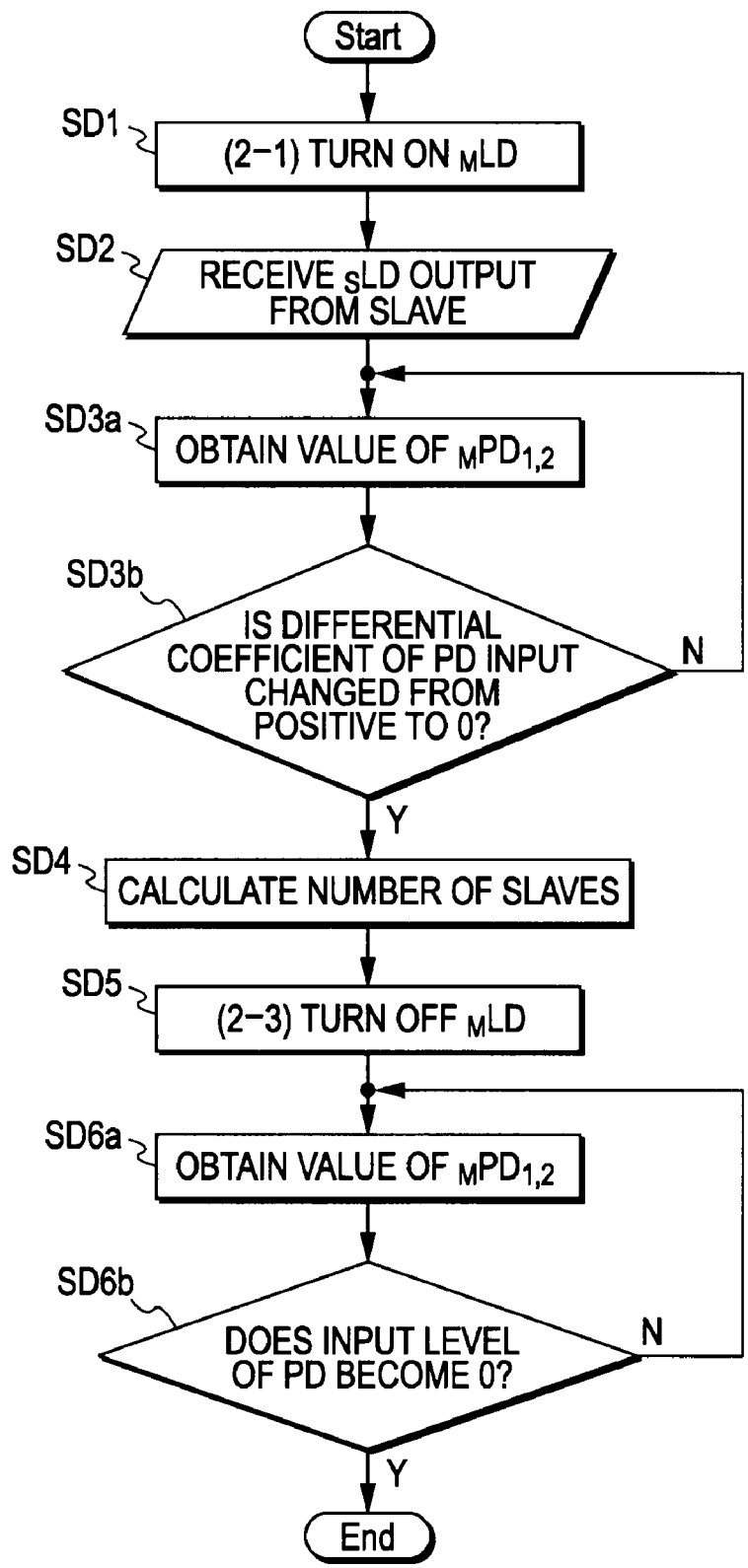
FIG. 29 is a flow chart showing a detail of the processing of the master substrate 3M when the arrangement and the number of slave substrates 3S are decided.

FIG. 29 is a flow chart showing a detail of the processing of the master substrate 3M when the arrangement and the number of slave substrates 3S are decided, and next, a description will be given of the detail of the processing by the master substrate 3M when the arrangement and the number of the slave substrates 3S are decided. It should be noted that in FIG. 29, for the same processing described in the flow chart of FIG. 25, the same processing step number is assigned.

As described above, in the master substrate 3M, when the laser diode 30S of the slave substrate 3S is turned ON in step SE2 in FIG. 27 in response to the turning ON of the laser diode 30M of its own equipment in step SD1 in the flow chart of FIG. 25 (FIG. 29), the input level of the photo detector 31M of the master substrate 3M increases until the laser diodes 30S of all the slave substrates 3S are turned ON and becomes a constant value when the laser diodes 30S of all the slave substrates 3S are turned ON.

In view of the above, in step SD3$a$ in FIG. 29, the master substrate 3M obtains the input value of the photo detector 31M, and in step SD3$b$, determines that the input value of the photo detector 31M becomes the constant value, for example, on the basis of whether or not the differential coefficient of the input value is changed from positive to 0 through the above-mentioned processing of the flow chart of FIG. 9.

Then, when the differential coefficient of the input value of the photo detector 31M is changed from positive to 0, the master substrate 3M determines that the output of the laser diode 30S is carried out in all the slave substrates 3S connected to the optical waveguide 2A is checked, and in step SD4 in FIG. 25 (FIG. 29), the arrangement and the number of the slave substrates 3S are calculated.

Also, in the master substrate 3M, in response to the turning OFF of the laser diode 30M of its own equipment, in step SE4 in FIG. 27, when the laser diode 30S of the slave substrate 3S is turned OFF, the input level of the photo detector 31M of the master substrate 3M decreases until the laser diodes 30S of all the slave substrates 3S are turned OFF and becomes "0" when the laser diodes 30S of all the slave substrates 3S are turned OFF.

In view of the above, in step SD6a in FIG. 29, the master substrate 3M obtains the input value of the photo detector 31M, and in step SD6b, determines whether or not the input value of the photo detector 31M becomes 0, for example, through the above-mentioned processing of the flow chart of FIG. 15.

Then, when the input value of the photo detector 31M becomes 0, the master substrate 3M determines that all the slave substrates 3S responded, and the processing of deciding the arrangement and the number of the slave substrate 3S is ended.

Figure 30:
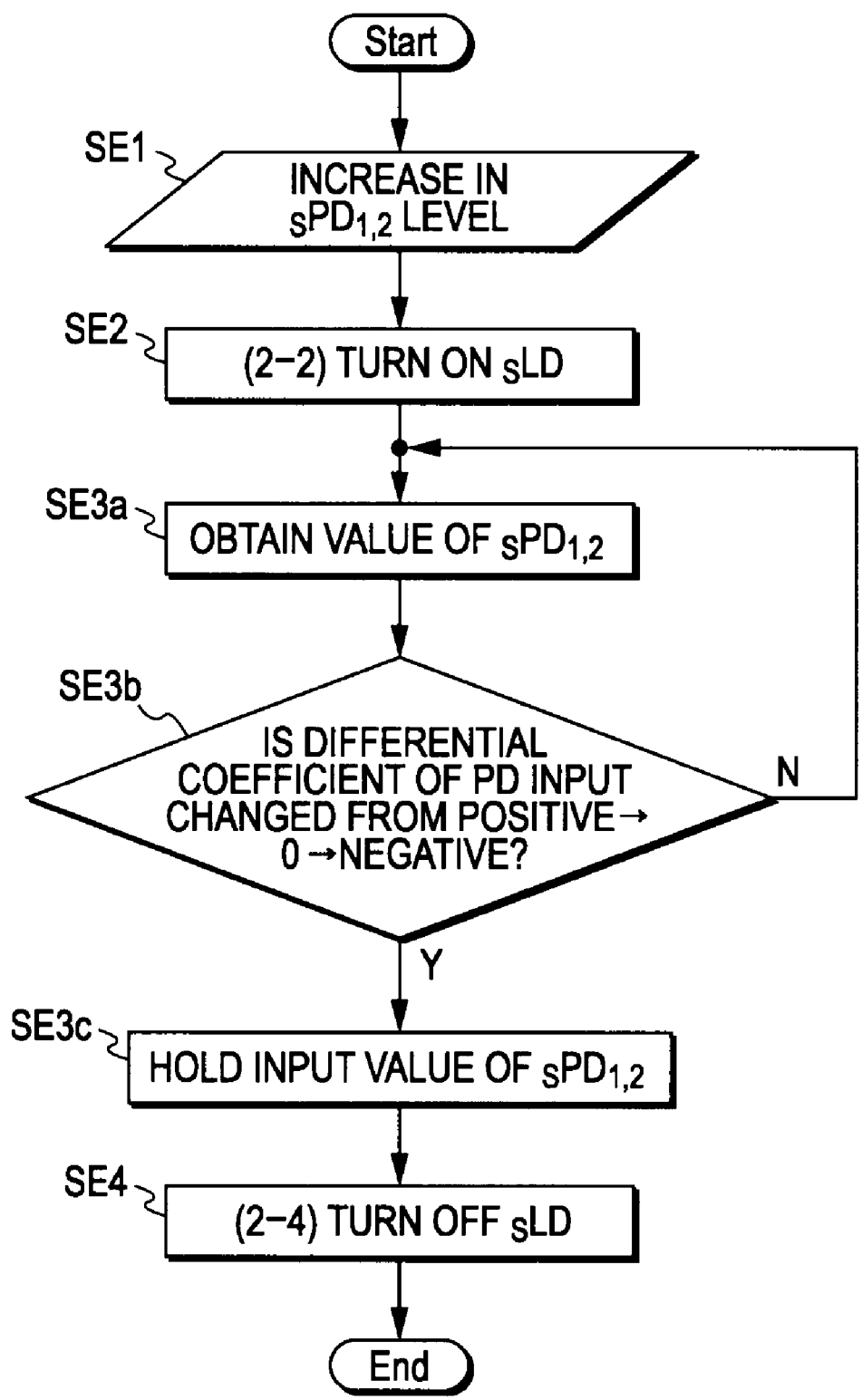
FIG. 30 is a flow chart showing a detail of the processing of the slave substrate 3S when the arrangement and the number of slave substrates 3S are decided.

FIG. 30 is a flow chart showing a detail of the processing of the slave substrate 3S when the arrangement and the number of slave substrates 3S are decided, and next, a description will be given of the detail of the processing by the slave substrate 3S when the arrangement and the number of the slave substrates 3S are decided. It should be noted that in FIG. 30, for the same processing described in the flow chart of FIG. 27, the same processing step number is assigned.

As described above, in the slave substrate 3S, in response to the turning ON of the laser diode 30M of the master substrate 3M in step SD1 in FIG. 25 (FIG. 29), when the laser diode 30S is turned ON in step SE2 in FIG. 27 (FIG. 30), the input level of the photo detector 31S increases until the laser diodes 30S of all the slave substrates 3S are turned ON and becomes a constant value when the laser diodes 30S of all the slave substrates 3S are turned ON.

Then, the master substrate 3M decides the arrangement and the number of all the slave substrates 3S, and in step SD5, when the laser diode 30M is turned OFF, the input level of the photo detector 31S of the respective slave substrates 3S decreases from the constant value.

In view of the above, in step SE3a in FIG. 30, the slave substrate 3S obtains the input value of the photo detector 31S, and in step SE3b, determines that the input value of the photo detector 31S decreases from the constant value, for example, on the basis of whether or not the differential coefficient of the input value is changed from positive to 0 and thereafter changed from 0 to negative through the above-mentioned processing of the flow chart of FIG. 9.

Then, when the differential coefficient of the input value of the photo detector 31S is changed from positive to 0 and thereafter changed from 0 to negative, the slave substrate 3S determines that the master substrate 3M decides the arrangement and the number of all the slave substrates 3S, for utilization for ID assignment which will be described below, in step SE3c in FIG. 30, after the input value of the photo detector 31S of its own equipment is held, in step SE4 in FIG. 27 (FIG. 30), the laser diode 30S of its own equipment is turned OFF.

Next, a PD input level table for calculating the arrangement and the number of all the slave substrates 3S will be described.

FIG. 31 is a graph showing a level of the light input to the photo detector 31M, and in FIG. 31, the horizontal axis represents a light reception angle θ (0° to 180°), and the vertical axis represents an input level.

In the master substrate 3M, the level distribution of the photo detector $31M_1$ is divided into N by an angle θ, and an input level corresponding to an angle $θ_i$ is defined as $PD_{1θi}$. Then, a vector PD1 having the input level $PD_{1θi}$ corresponding to the angle $θ_i$ with respect to all the divisions is defined by the following (3) expression.

$$PD1=(PD_{1θ1}, PD_{1θ2}, \ldots PD_{1θN}) \quad (3)$$

According to this, by regulating the arrangement of the slave substrates 3S by the angle θi, when the slave substrate 3S is arranged at any of all the arrangements where maximum S pieces of the slave substrates 3S can be arranged and the laser diode 30S is turned ON at the constant light amount, it is possible to previously calculate an input level table $tPD_1$ from the level of the light input to the photo detector 31M of the master substrate $3M_1$.

The S pieces of the slave substrates 3S can take 2N−1 pieces of arrangements in a range of 0 to 360°. That is, as 0 to 180° is divided into N, division into 2N is carried out on the circumference.

At this time, the arrangement information of the slave substrate 3S is replaced by an arrangement vector $W_m$ shown in the following (4) expression. To elaborate, an arrangement 0 to an arrangement 2N−1 are associated with element numbers of the vector.

$$W_m=(\text{isNode}(θ_0), \text{isNode}(θ_1), \ldots, \text{isNode}(θ_{2N-1})) \quad (4)$$

Where, m=0, 1, 2, ..., $2^{2N-1}-1$.

Furthermore, information indicating whether the slave substrate 3S (the master substrate 3M) is arranged or not is associated with a value 1 or 0. That is, $\text{isNode}(θ_i)=1$ represents that the slave substrate 3S (the master substrate 3M) exists at a position $θ_i$, and $\text{isNode}(θ_i)=0$ represents that the slave substrate 3S does not exist at the position $θ_i$. It should be noted that the arrangement 0 represents the master substrate 3M, and this element is regularly set as 1.

FIG. 32 is an explanatory diagram showing an arrangement example of the master substrate 3M and the slave substrate 3S. In FIG. 32, the arrangement 0 is a location where the master substrate 3M is arranged. Also, the arrangements 1, 2, 2N−1 are locations where the slave substrate 3S can be arranged.

For example, in FIG. 32, a state where the slave substrates 3S are arranged at the arrangements 1 and 2 and an arrangement k can be represented in the arrangement vector $W_m$ by the following (5) expression.

$$W_m=[1, 1, 1, 0, \ldots, 0, 1(\text{arrangement } k), 0, \ldots, 0] \quad (5)$$

Conversely, by investigating the element number whose value is equal to 1 among the arrangement vector $W_m$, it is understood that the slave substrate 3S is arranged at the position corresponding to the element.

Incidentally, as shown in the following (6) expression, by taking an inner product of the arrangement vector $W_m$ and a vector PD1, in a case where the slave substrate 3S is arranged at the position identified by the arrangement vector $W_m$, the input level input to the photo detector 31M of the master substrate $3M_1$ can be obtained.

$$tPD_{1wi}=W_m \cdot PD_1 \quad (6)$$

Combinations with regard to the locations where one sheet of the slave substrate 3S is arranged have 2N−1 locations, and independently the presence or absence of the arrangement exists, and therefore the combinations with regard to the locations where one sheet of the slave substrate 3S is arranged have $2^{2N-1}$ ways.

With respect to this vector W of all the combinations, by taking the inner product with $PD_1$ described above, it is possible to calculate the input level table $tPD_1$ shown in the following (7) expression.

[Expression 2]

$$\begin{pmatrix} tPD_{1,0} \\ tPD_{1,1} \\ \cdots \\ \cdots \\ \cdots \\ \cdots \\ PD_{1,2^{2N-1}-2} \\ PD_{1,2^{2N-1}-1} \end{pmatrix} = \begin{pmatrix} W_0 \\ W_1 \\ \cdots \\ \cdots \\ \cdots \\ W_{2^{2N-1}-1} \end{pmatrix} \cdot \begin{pmatrix} PD_{1,\theta_0} \\ PD_{1,\theta_1} \\ \cdots \\ \cdots \\ PD_{1,\theta_{2N-1}} \end{pmatrix} \quad (7)$$

$$= \begin{pmatrix} W_{0,0} & W_{0,1} & \cdots & \cdots & W_{0,2N-1} \\ W_{1,0} & W_{1,1} & \cdots & \cdots & W_{1,2N-1} \\ \cdots & \cdots & \cdots & \cdots & \cdots \\ \cdots & \cdots & \cdots & \cdots & \cdots \\ W_{2^{2N-1}-1,0} & W_{2^{2N-1}-1,1} & \cdots & \cdots & W_{2^{2N-1}-1,2N-1} \end{pmatrix} \begin{pmatrix} PD_{1,\theta_0} \\ PD_{1,\theta_1} \\ \cdots \\ \cdots \\ PD_{1,\theta_{2N-1}} \end{pmatrix}$$

Where, the input level table $tPD_1$ denotes a $2^{2N-1} \times 1$-dimensional vector, the arrangement vector $W_m$ denotes $2^{2N-1} \times 2N$-dimensional vector, and the vector $PD_1$ denotes $2N \times 1$-dimensional vector.

FIG. 33 is an explanatory diagram showing an example of a table in which the input level table $tPD_1$ in a photo detector $31M_1$ is associated with the arrangement vector $W_m$, and the master substrate 3M has a table in a relation between the input level table $tPD_1$ and the arrangement vector $W_m$ in the photo detector $31M_1$. A similar table is previously calculated with regard to the photo detector $31M_2$ too.

According to this, the master substrate 3M searches for the table on the basis of the input values of the photo detectors $31M_1$ and $31M_2$ of its own equipment, so that the arrangement vector W of the slave substrate 3S can be obtained.

It should be noted that in the above-mentioned example, the circumference direction of the optical waveguide 2A is divided into N at an equal interval, and while it is assumed that the slave substrates 3S may exist at 2N−1 pieces of positions, the input level table is created. It should be however that the equally spaced positions in the circumference direction do not necessarily need to be set as the positions where the slave substrates 3S may exist.

That is, even if the positions where the slave substrates 3S may exist are not equally spaced but may be irregular arrangements, from the relation between the positions of the slave substrates 3S and the light, as described above, it is possible to create the input level table. According to this, even if the positions where the slave substrates 3S may exist are irregular arrangements, from the level of the light input to the photo detector 31M of the master substrate 3M, it is possible to decide the number and the positions of the slave substrates 3S.

Figure 34:
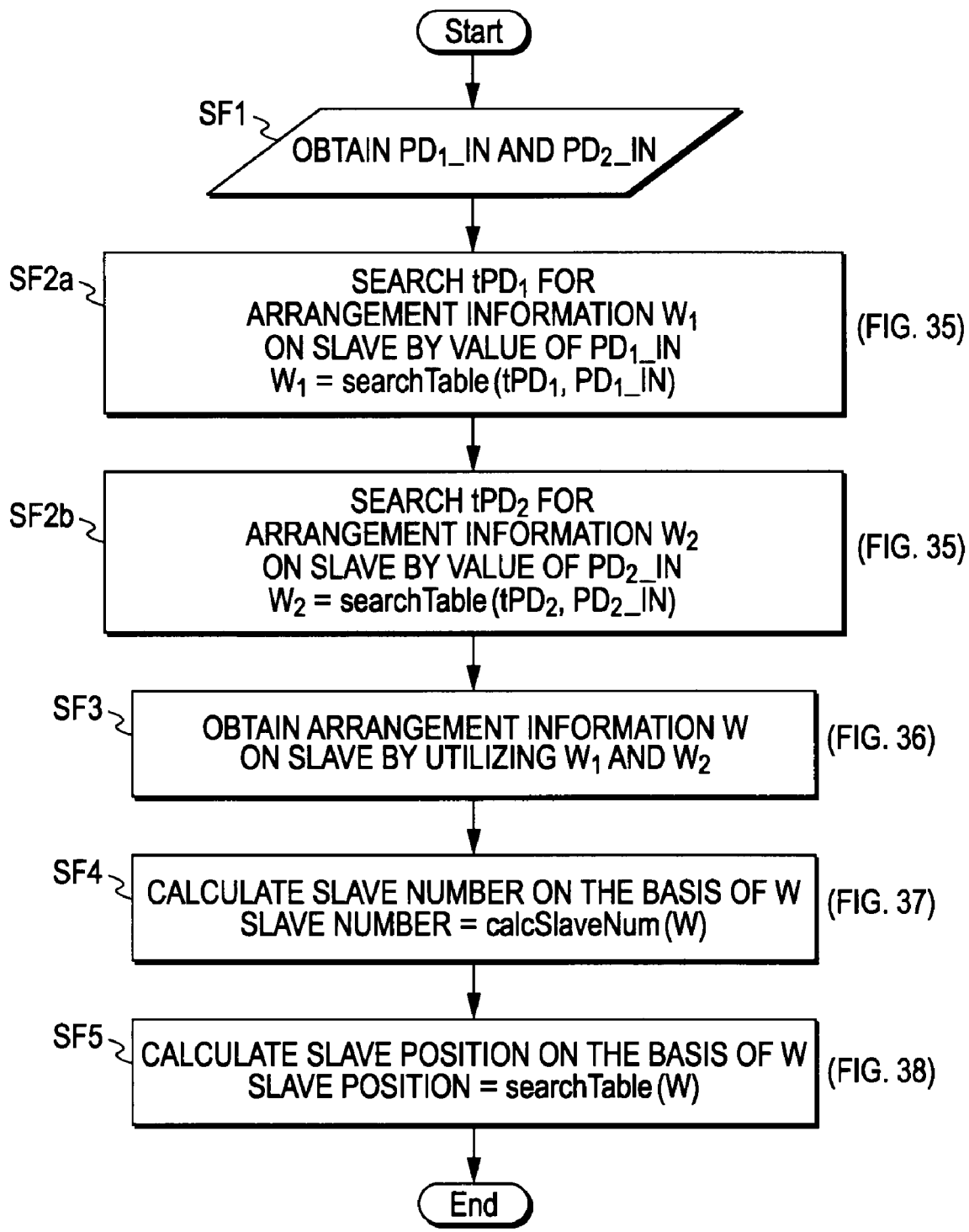
FIG. 34 is a flow chart showing an example of a processing of calculating the arrangement and the number of the slave substrates 3S by the master substrate 3M.

FIG. 34 is a flow chart showing an example of a processing of calculating the arrangement and the number of the slave substrates 3S by the master substrate 3M, and next, a description will be given of the detail of the processing of calculating the arrangement and the number of the slave substrates 3S in step SD4 in FIG. 25 (FIG. 29).

When the master substrate 3M determines that it is checked the output of the laser diode 30S is carried out in all the slave substrates 3S connected to the optical waveguide 2A in step SD3 (a, b) in FIG. 25 (FIG. 29), the PD input value $PD_1\_IN$ of the photo detector $31M_1$ and the PD input value $PD_2\_IN$ of the photo detector $31M_2$ are obtained in step SF1 in FIG. 34.

In step SF2a in FIG. 34, from the above-mentioned PD input level table $tPD_1$ corresponding to the arrangement vector $W_1$ which is the level of the light input to the photo detector $31M_1$ which changes in accordance with the arrangements of the slave substrates 3S and the arrangement information of the slave substrate 3S, on the basis of the PD input value $PD_1\_IN$ of the photo detector $31M_1$, the master substrate 3M searches for the arrangement vector W of the slave substrate $3S_1$.

Similarly, in step SF2b in FIG. 34, from the PD input level table $tPD_2$ corresponding to the arrangement vector $W_2$ which is the level of the light input to the photo detector $31M_2$ which changes in accordance with the arrangements of the slave substrates 3S and the arrangement information of the slave substrate 3S, on the basis of the PD input value $PD_2\_IN$ of the photo detector $31M_2$, the master substrate 3M searches for the arrangement vector W of the slave substrate $3S_2$.

The master substrate 3M obtains the arrangement vector W of the slave substrate 3S which is uniquely decided from the arrangement vector $W_1$ based on the input value of the photo detector $31M_1$ and the arrangement vector $W_2$ based on the input value of the photo detector $31M_2$ in step SF3 in FIG. 34.

The master substrate 3M calculates the number of the slave substrates 3S on the basis of the arrangement vector W of the slave substrate 3S in step SF4 in FIG. 34.

The master substrate 3M calculates the positions of the slave substrates 3S on the basis of the arrangement vector W of the slave substrate 3S in step SF5 in FIG. 34.

Figure 35:
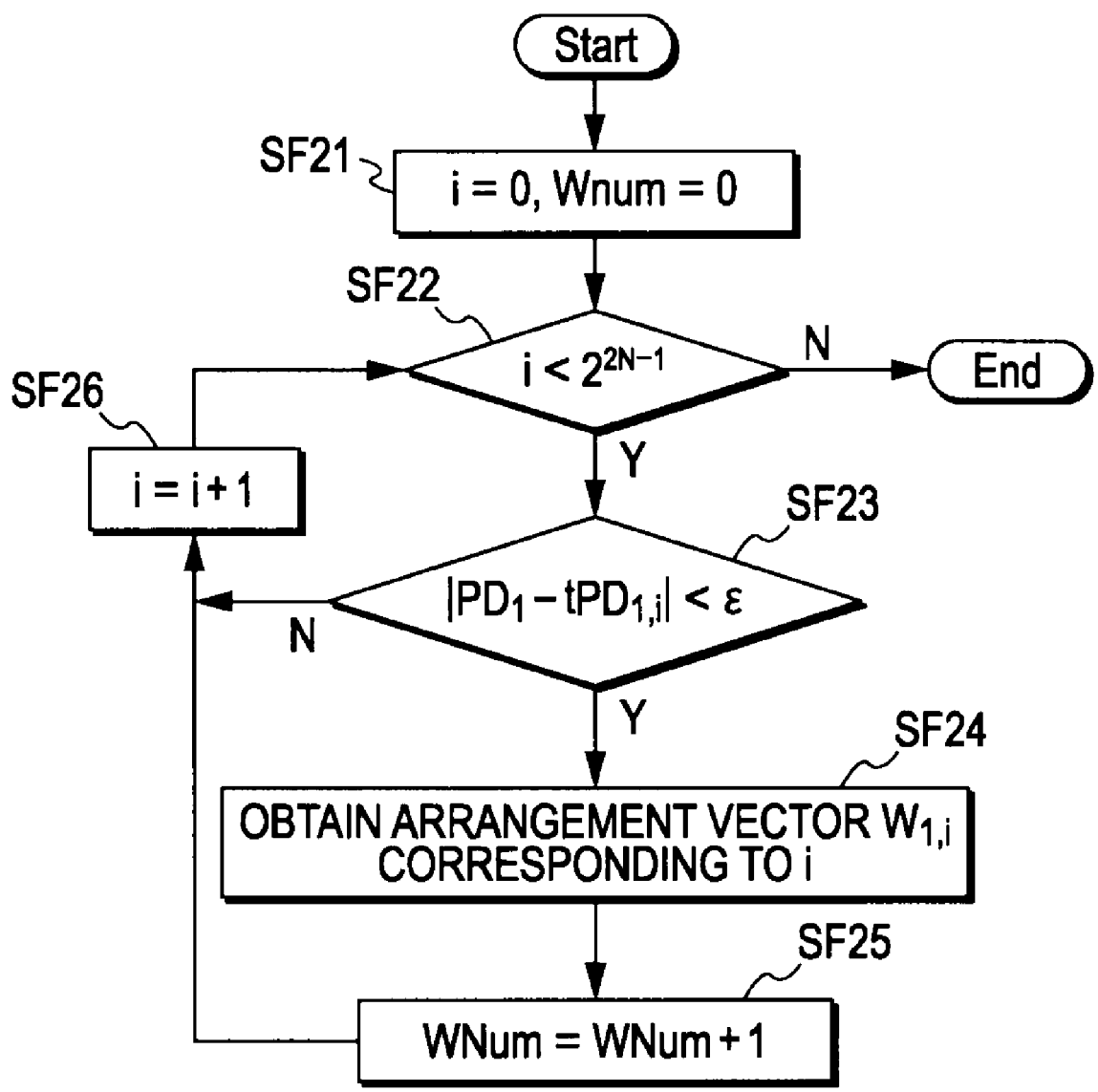
FIG. 35 is a flow chart showing an example of a processing of searching for a PD input level table.

FIG. 35 is a flow chart showing an example of a processing of searching for a PD input level table, and next, a description will be given of the detail of the processing of searching for the PD input level table in step SF2 (a, b) in FIG. 34.

As the number of the slave substrates 3S which can be connected to the optical waveguide 2A is 2N−1 pieces, the PD input level table $tPD_1$ has combinations of $2^{2N-1}$ ways in accordance with the positions where the slave substrates 3S can be arranged according to the present example.

For this reason, in steps SF21 to SF23 in FIG. 35, the master substrate 3M calculates a difference between the PD input value $PD_1\_IN$ of the photo detector $31M_1$ and the i-th PD input level table $tPD_{1,i}$ to search for the element closest to the PD input value $PD_1\_IN$ of the photo detector $31M_1$.

When it is determined that the i-th PD input level table $tPD_{1,i}$ is sufficiently close to the PD input value in step SF24 in FIG. 35, the master substrate 3M obtains the arrangement vector $W_{1,i}$ corresponding to the i-th PD input level table $tPD_{1,i}$ and similarly searches for the (i+1)-th element in steps SF25 and SF26 in FIG. 35.

Also, the master substrate 3M searches for the element closest to the PD input value $PD_2\_IN$ of the photo detector $31M_2$ with respect to all the PD input level tables $tPD_2$ and obtains the arrangement vector $W_{2,i}$ corresponding to the element closest to the input value.

Figure 36:
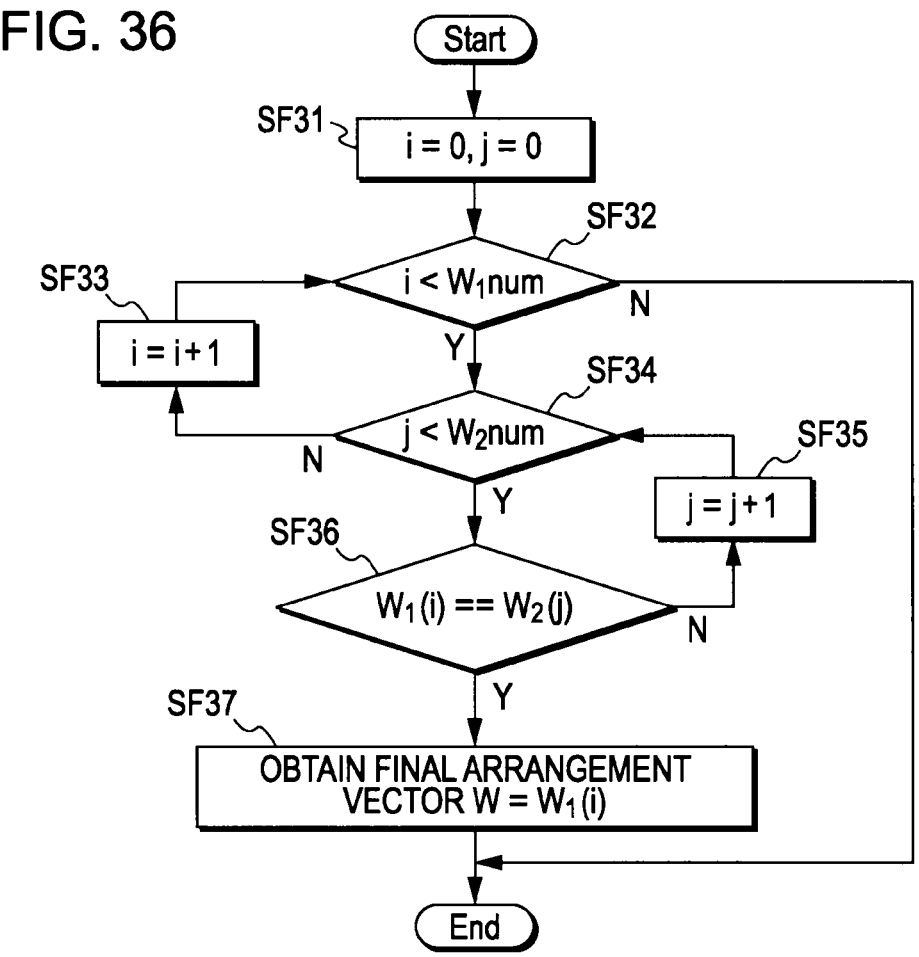
FIG. 36 is a flow chart showing an example of a processing of deciding an arrangement vector from a plurality of candidates.

FIG. 36 is a flow chart showing an example of a processing of deciding an arrangement vector from a plurality of candidates, and next, a description will be given of the detail of the processing of deciding the arrangement vector in step SF3 in FIG. 34.

The master substrate 3M sequentially compares i pieces of the arrangement vector $W_1$ obtained from the PD input value $PD_1\_IN$ of the photo detector $31M_1$ with j pieces of the arrangement vector $W_2$ obtained from the PD input value $PD_2\_IN$ of the photo detector $31M_2$ in steps SF31 to SF36 in FIG. 36 and sets one in which the arrangement vector $W_1$ is matched with the arrangement vector $W_2$ as the final arrangement vector W in step SF37.

Figure 37:
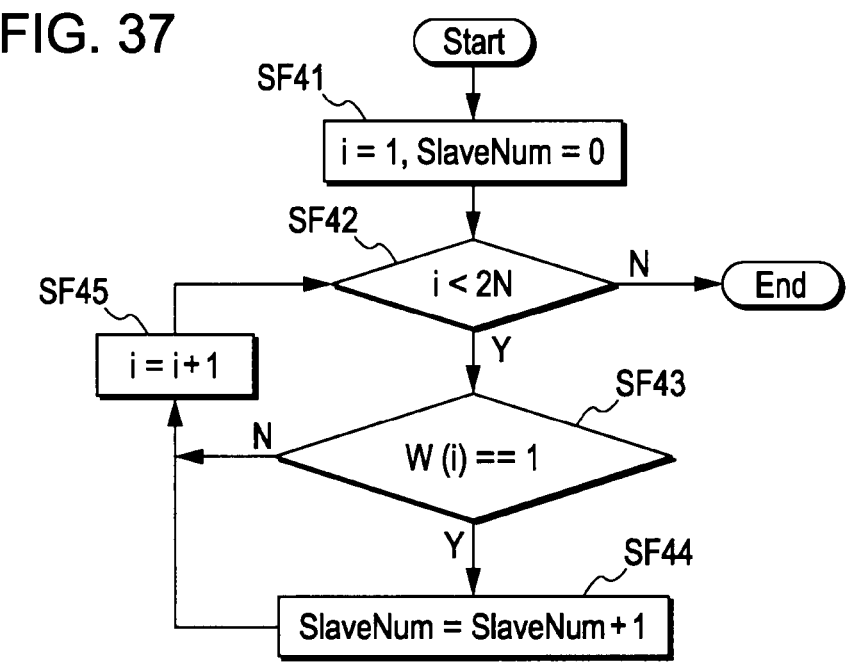
FIG. 37 is a flow chart showing an example of a processing of deciding the number of the slave substrates 3S.

FIG. 37 is a flow chart showing an example of a processing of deciding the number of the slave substrates 3S, and next, a description will be given of the detail of the processing of deciding the number of the slave substrates 3S in step SF4 in FIG. 34.

The master substrate 3M carries out the processing of searching for the number of elements whose value is 1 indicating the existence of the substrate in the decided arrangement vector W in step SF43 in FIG. 37 with respect to all the elements except for the master substrate in steps SF41, SF42, SF44, and SF45.

Figure 38:
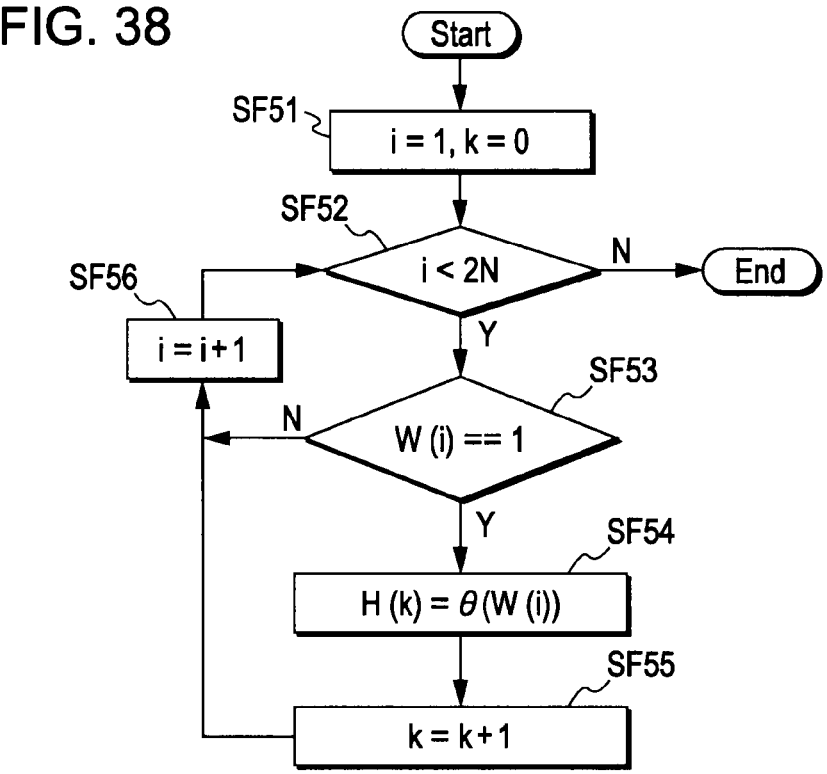
FIG. 38 is a flow chart showing an example of a processing of deciding the arrangement of the slave substrates 3S.

FIG. 38 is a flow chart showing an example of a processing of deciding the arrangement of the slave substrates 3S, and next, a description will be given of the detail of the processing of deciding the positions of the slave substrates 3S in step SF5 in FIG. 34.

The master substrate 3M carries out the processing of searching for the elements whose value is 1 indicating the existence of the substrate in the decided arrangement vector W in step SF53 in FIG. 38 and identifying the position where the slave substrate 3S exists at the angle θ corresponding to the element whose value is 1 in step SF54 with respect to all the elements except for the master substrate in steps SF51, SF52, SF55, and SF56.

At this time, the processing by the master substrate 3M to calculate the positions and the number of the slave substrates 3S has the same controls for the turning ON and turning OFF of the LD as the processing when the power source is ON, and therefore, at the same time when the master substrate 3M finds out the unknown slave substrate 3S, the master substrate can carry out the processing of calculating the positions and the number of the slave substrates 3S.

3. Processing for Assigning an ID to the Slave Substrate 3S by the Master Substrate 3M Next, an outline of processings executed by the master substrate 3M and the slave substrate 3S for the master substrate 3M to assign an ID to the slave substrate 3S will be described.

Figure 39:
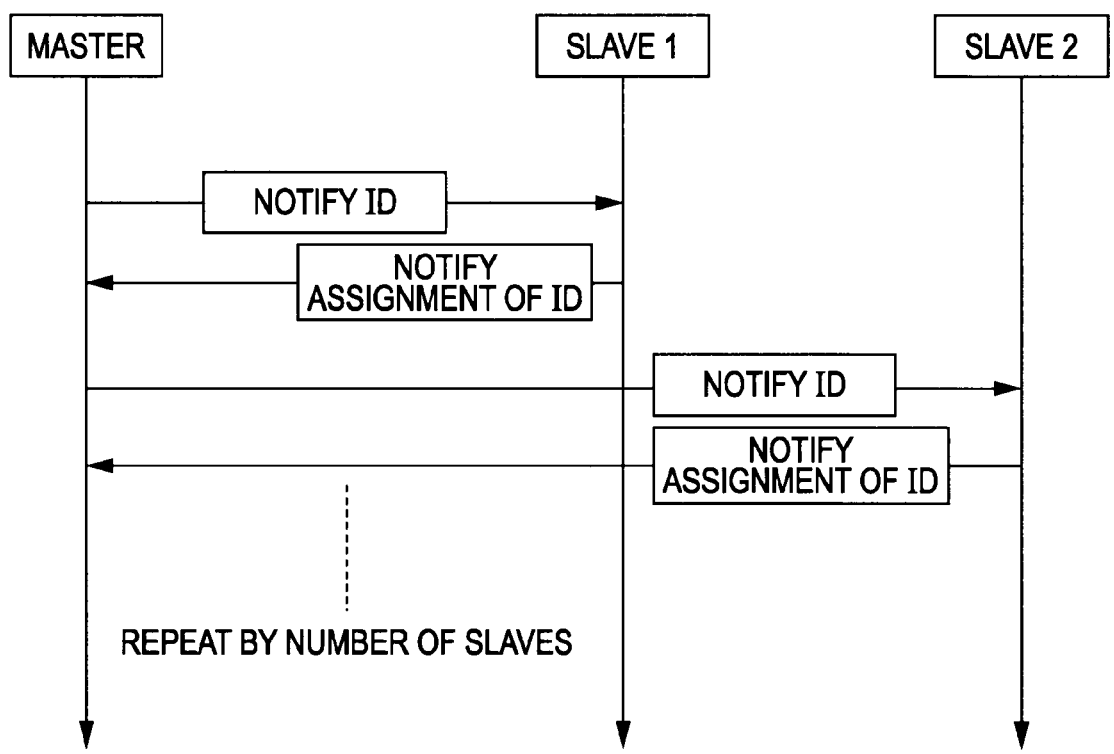
FIG. 39 is a timing chart showing a processing of assigning an ID to the slave substrate 3S.
Figure 40:
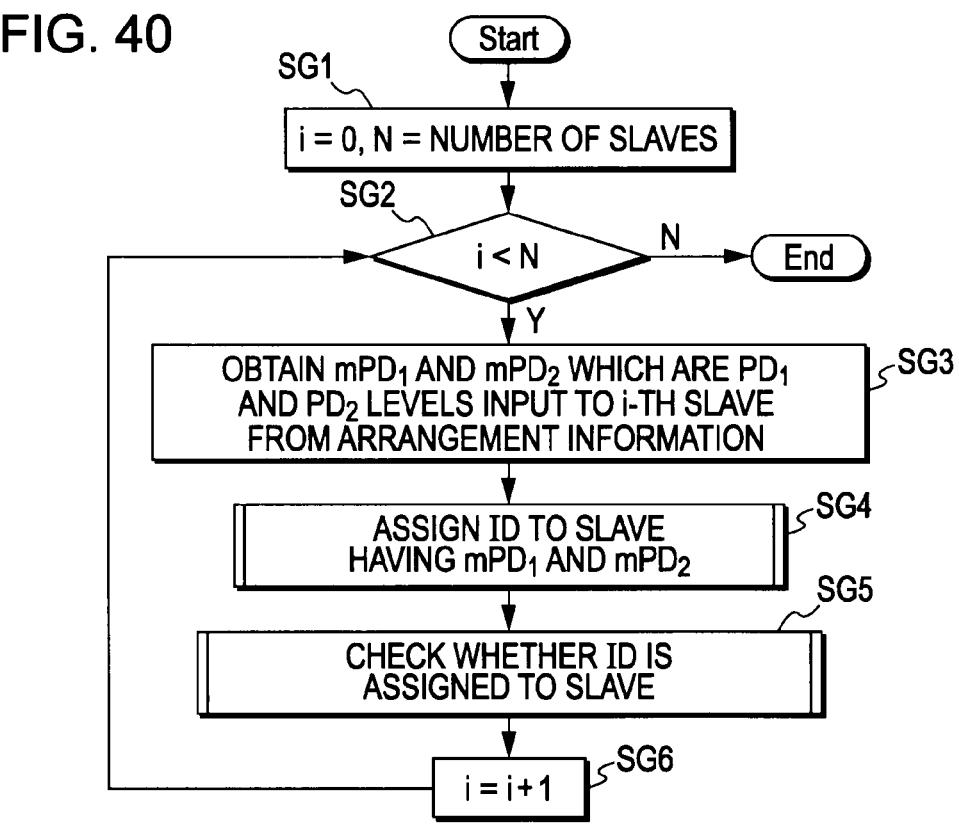
FIG. 40 is a flow chart showing a processing of the master substrate 3M when the ID is assigned to the slave substrate 3S.
Figure 41:
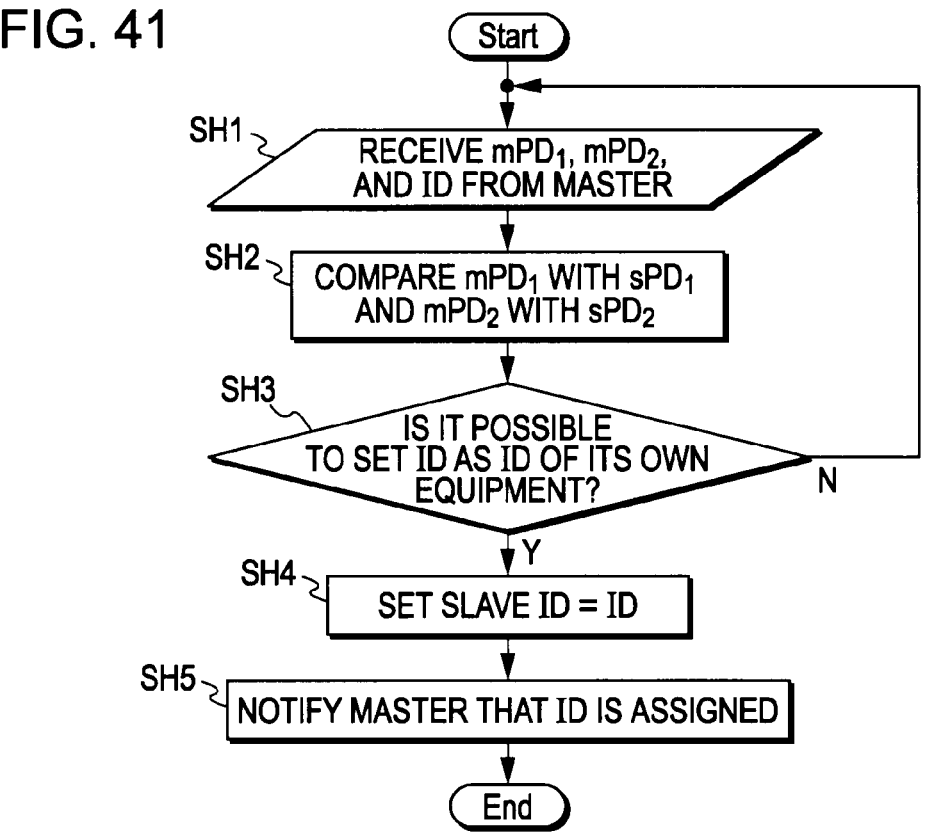
FIG. 41 is a flow chart showing a processing of the slave substrate 3S when the ID is assigned to the slave substrate 3S.

FIG. 39 is a timing chart showing a processing of assigning an ID to the slave substrate 3S, FIG. 40 is a flow chart showing a processing of the master substrate 3M when the ID is assigned to the slave substrate 3S, and FIG. 41 is a flow chart showing a processing of the slave substrate 3S when the ID is assigned to the slave substrate 3S.

The master substrate 3M carries out an ID assigning processing sequentially with respect to all the slave substrates 3S whose position is decided in steps SG1 and SG2 in FIG. 40.

Once the positions and the number of the slave substrates 3S connected to the optical waveguide 2A are decided, while the power source is ON as described above or through the processing of deciding the positions and the number or the like, when the master substrate 3M and all the slave substrates 3S turn ON the laser diode, the master substrate 3M can obtain the levels of the lights input to the photo detector $31S_1$ and the photo detector $31S_2$ of the respective slave substrates 3S.

That is, in step SG3 in FIG. 40, from the positions of all the slave substrates 3S, with respect to the slave substrate 3S at the i-th arrangement, the master substrate 3M obtains arrangement information of the master substrate 3M and other slave substrate 3S (arrangement vector), and then, by utilizing the above-mentioned input level tables $tPD_1$ and $tPD_2$, from the arrangement information, the input level $mPD_1$ of the light input to the i-th photo detector 31S of the slave substrate $3S_1$ and the input level $mPD_2$ of the light input to the photo detector $31S_2$ are obtained.

In step SG4 in FIG. 40, the master substrate 3M outputs the PD input levels $mPD_1$ and $mPD_2$ and the ID information obtained with respect to the slave substrate 3S at the i-th arrangement from the laser diode 30M to assign the ID to the slave substrate 3S in which the PD input levels of the photo detectors $31S_1$ and $31S_2$ are $mPD_1$ and $mPD_2$.

In step SH1 in FIG. 41, all the slave substrates 3S connected to the optical waveguide 2A receive the PD input levels $mPD_1$ and $mPD_2$ and the ID from the master substrate 3M.

In step SH2 in FIG. 41, in the processing of deciding the positions and the number of the slave substrates 3S, the slave substrate 3S compares an actual input value $sPD_1$ of the photo detector $31S_1$ held in step SE3c in the flow chart of FIG. 30 with $mPD_1$ and also compares the actual input value $sPD_2$ of an photo detector $31S_2$ with $mPD_2$.

Then, when the input values of the photo detectors $31S_1$ and $31S_2$ held by its own equipment and the PD input levels $mPD_1$ and $mPD_2$ obtained from the master substrate 3M are matched, in step SH3 in FIG. 41, the slave substrates 3S determines that the ID is assigned to its own equipment and this ID is held in step SH4 in FIG. 41, and in a case where the PD input values are not matched, the ID is discarded.

When the slave substrate 3S is assigned with the ID as the PD input values are matched, in step SH5 in FIG. 41, the information indicating that the ID is assigned is output by the laser diode 30S to notify the master substrate 3M.

When the information indicating that the ID is assigned is received from the slave substrate 3S, in step SG5 in FIG. 40, the master substrate 3M checks that the i-th slave substrate 3S is assigned with the ID, if the (i+1)-th slave substrate 3S exists, the ID assignment is carried out through a similar processing in steps SG6 and in step SG2, and if the next slave substrates 3S to which the ID should be assigned does not exist, the ID assignment with respect to all the slave substrates 3S is ended.

Figure 42:
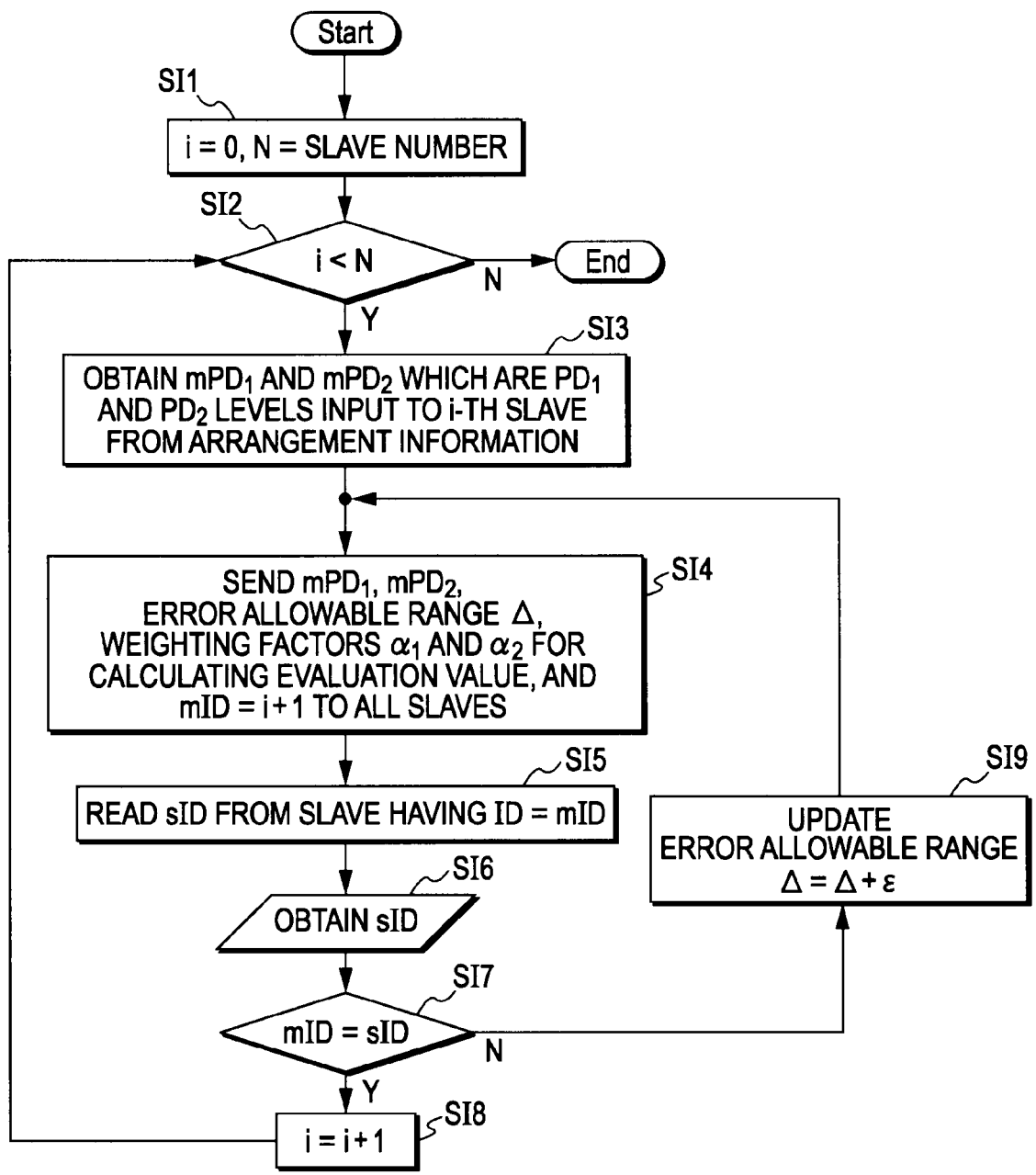
FIG. 42 is a flow chart showing a processing of the master substrate 3M when the ID is assigned to the slave substrate 3S while taking into account a measurement error.
Figure 43:
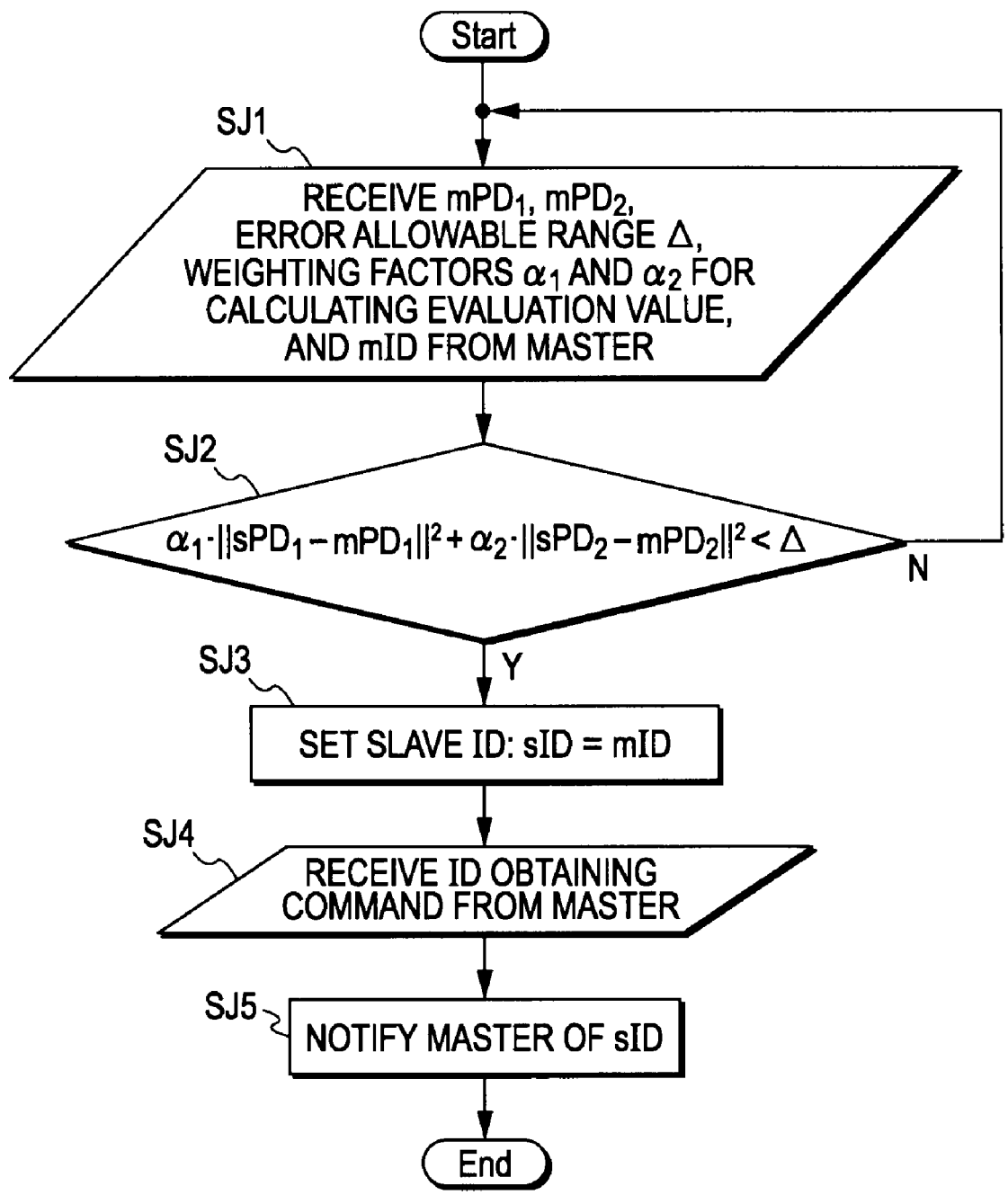
FIG. 43 is a flow chart showing a processing of the slave substrate 3S when the ID is assigned to the slave substrate 3S while taking into account a measurement error.

FIG. 42 is a flow chart showing a processing of the master substrate 3M when the ID is assigned to the slave substrate 3S while taking into account a measurement error, and FIG. 43 is a flow chart showing a processing of the slave substrate 3S when the ID is assigned to the slave substrate 3S while taking into account a measurement error.

Incidentally, in the respective slave substrates 3S, the PD level distribution of based on the input level tables $tPD_1$ and $tPD_2$ held by the master substrate 3M and the input values actually obtained by the photo detectors $31S_1$ and $31S_2$ may be considered to have an error in some cases. For this reason, for each of the respective photo directors, by adding a weight of an evaluation value in accordance with the magnitude of the error, the accuracy of the ID assignment is improved.

That is, in steps SI1 and SI2 in FIG. 42, as the master substrate 3M carries out the processing of sequentially assigning the ID with respect to all the slave substrates 3S whose position is decided, in step SI3, by utilizing the above-mentioned input level tables $tPD_1$ and $tPD_2$, from the arrangement information, the input level $mPD_1$ of the light input to the i-th photo detector 31S of the slave substrate $3S_1$ and the input level $mPD_2$ of the light input to the photo detector $31S_2$ are obtained.

In step SI4 in FIG. 42, the master substrate 3M outputs the PD input levels $mPD_1$ and $mPD_2$ obtained with respect to the slave substrate 3S at the i-th arrangement, an error allowable range Δ for the PD input level, a weighting factor $α_1$ for calculating the evaluation value corresponding to the photo detector $31S_1$, a weighting factor $α_2$ for calculating the evaluation value corresponding to the photo detector $31S_2$, and ID information mID from the laser diode 30M to send these pieces of information to all the slave substrates 3S.

In step SJ1 in FIG. 43, all the slave substrates 3S connected to the optical waveguide 2A receive the PD input levels $mPD_1$ and $mPD_2$, the error allowable range Δ for the PD input level, the weighting factors $α_1$ and $α_2$ for calculating the evaluation values and the mID from the master substrate 3M.

In step SJ2 in FIG. 43, the slave substrate 3S determines whether the actual input values $sPD_1$ and $sPD_2$ of the photo detector $31S_1$ and $31S_2$ held in the processing of deciding the positions and the number of the slave substrates 3S are within the error allowable range Δ with respect to the PD input levels $mPD_1$ and $mPD_2$ from the master substrate 3M.

Herein, a comparison is made in such a manner that an addition value of a value obtained by multiplying a difference between the actual input values $sPD_1$ and $mPD_1$ of the photo detector $31S_1$ by the weighting factor $α_1$ and a value obtained by multiplying a difference between the actual input values $sPD_2$ and $mPD_2$ of the photo detector $31S_2$ by the weighting factor $α_2$ is smaller than the error allowable range Δ.

When the actual input values $sPD_1$ and $sPD_2$ of the photo detector $31S_1$ and $31S_2$ are within the error allowable range Δ with respect to the PD input levels $mPD_1$ and $mPD_2$ from the master substrate 3M, in step SJ3 in FIG. 43, the slave substrate 3S sets the mID from the master substrate 3M as the sID as the ID of its own equipment.

The master substrate 3M sends an obtaining command for reading out sID from the slave substrate 3S whose ID is mID in step SI5 in FIG. 42.

In step SJ4 in FIG. 43, when the slave substrate 3S receives the ID obtaining command from the master substrate 3M, in step SJ5, the held sID information is output from the laser diode 30S to send the sID to the master substrate 3M.

In step SI6 in FIG. 42, the master substrate 3M obtains the sID from the slave substrate 3S to be compared with the mID in step SI7.

When the sID matching with the mID can be obtained from the slave substrate 3S, the master substrate 3M checks that the ID is assigned to the relevant slave substrate 3S, and in SI8 and step SI2 in FIG. 42, if the (i+1)-th slave substrate 3S exists, the ID assignment is carried out through a similar processing, and if the next slave substrates 3S to which the ID should be assigned does not exist, the ID assignment with respect to all the slave substrates 3S is ended.

In contrast to this, in a case where the sID matching with the mID cannot be obtained from the slave substrate 3S, in FIG. 42 in step SI9, the master substrate 3M updates the error allowable range Δ to set the allowable range with respect to the error to be larger and carries out the ID assignment in a similar processing.

Figure 44:
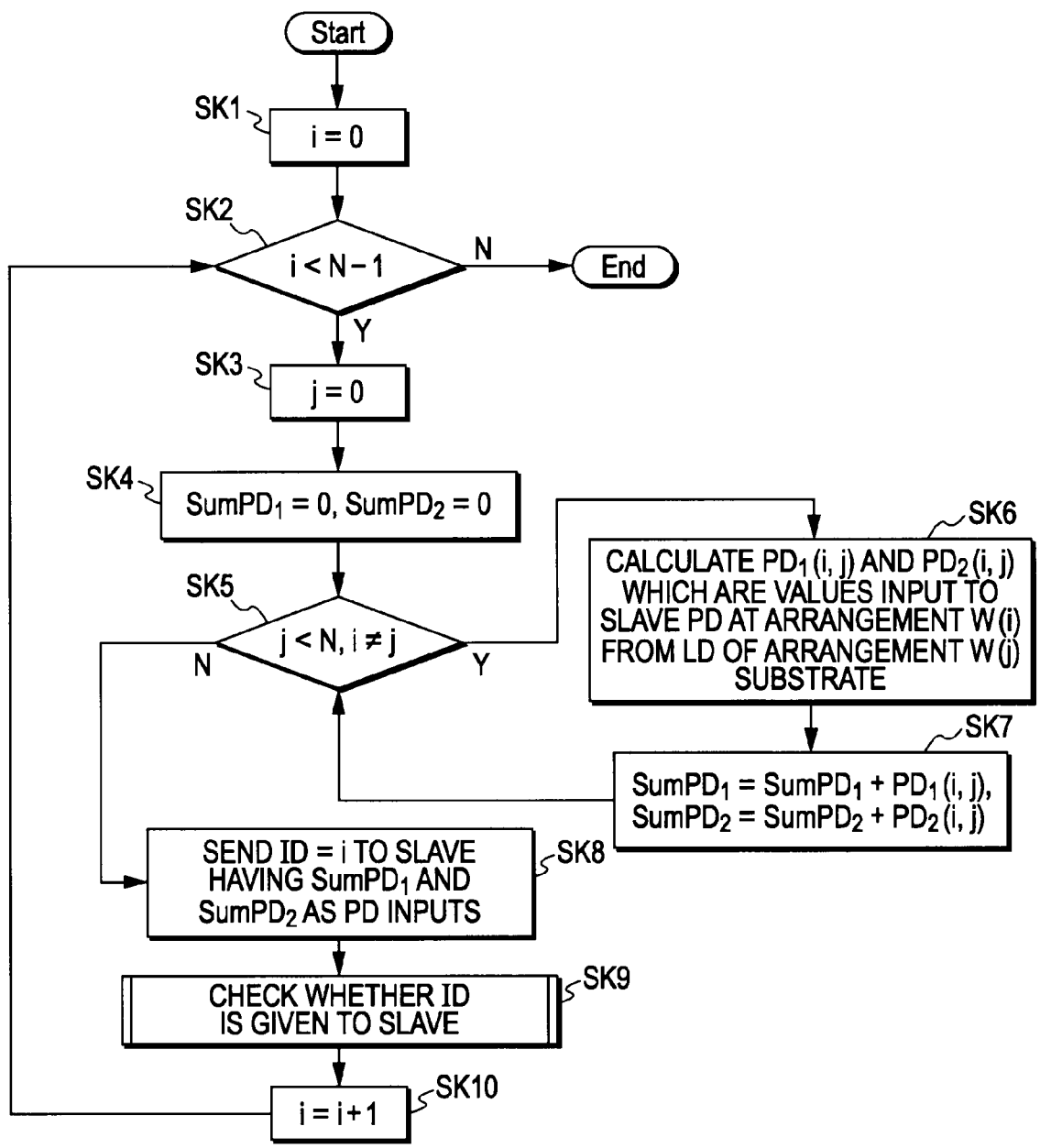
FIG. 44 is a flow chart showing a detail of the processing of the master substrate 3M when the ID is assigned to the slave substrate 3S whose arrangement is uniquely decided.
Figure 45:
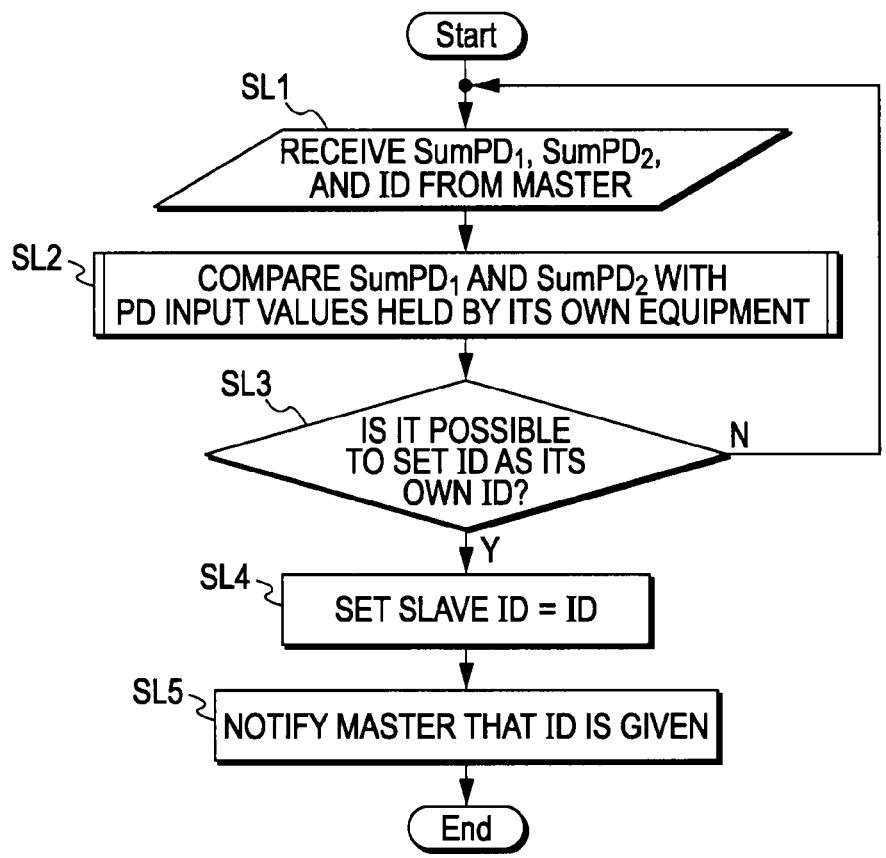
FIG. 45 is a flow chart showing a detail of the processing of the slave substrate 3S when the ID is assigned to the slave substrate 3S whose arrangement is uniquely decided.

FIG. 44 is a flow chart showing a detail of the processing of the master substrate 3M when the ID is assigned to the slave substrate 3S whose arrangement is uniquely decided, and FIG. 45 is a flow chart showing a detail of the processing of the slave substrate 3S when the ID is assigned to the slave substrate 3S whose arrangement is uniquely decided. Next, in the above-mentioned flow chart of FIG. 34, the detail of the processing for assigning the ID to the slave substrate 3S in a case where the arrangement of the slave substrate 3S is uniquely decided will be described.

The master substrate 3M starts the ID assignment processing with respect to the slave substrate 3S at the arrangement i in step SK1 in FIG. 44. At this time, when the number of nodes including the master substrate 3M is set as N pieces, in step SK2 in FIG. 44, the master substrate 3M sequentially assigns the IDs with respect to the slave substrates 3S by the number except for its own equipment from i=0 to i=N−1.

The master substrate 3M obtains at which level the light output from the laser diode 30S of the other slave substrate 3S to the photo detectors $31S_1$ and $31S_2$ of the slave substrate 3S at the arrangement i in step SK3 to SK7 in FIG. 44.

That is, in step SK6 in FIG. 44, the master substrate 3M calculates a PD input value $PD_1(i,j)$ in a case where the light output from the laser diode 30S of the slave substrate 3S at the arrangement j other than the arrangement i is input to the photo detector 31S of the slave substrate $3S_1$ at the arrangement i and a PD input value $PD_2(i,j)$ in a case where the light is input to the photo detector $31S_2$ and adds the calculated PD input values in step SK7.

Then, the total sum of the PD input values obtained by sequentially adding the PD input value $PD_1(i,j)$ in the photo detector 31S of the slave substrate $3S_1$ at the arrangement with respect to the LD output of all the slave substrates 3S other than the arrangement i becomes a PD input value $SumPD_1$ input to the photo detector 31S of the slave substrate $3S_1$ at the arrangement i.

Similarly, the total sum of the PD input values obtained by sequentially adding the PD input value $PD_2(i,j)$ in the photo detector 31S of the slave substrate $3S_2$ at the arrangement i becomes a PD input value $SumPD_2$ input to the photo detector $31S_2$.

In step SK8 in FIG. 44, the master substrate 3M sends the PD input values $SumPD_1$ and $SumPD_2$ obtained with respect to the slave substrate 3S at the arrangement i and the ID information to all the slave substrates 3S by way of light from the laser diode 30M and assigns the ID to the slave substrate 3S having $SumPD_1$ and $SumPD_2$ as the PD input values.

All the slave substrates 3S connected to the optical waveguide 2A receive in step SL1 in FIG. 45 the PD input levels $SumPD_1$ and $SumPD_2$ and the ID from the master substrate 3M.

In step SL2 in FIG. 45, the slave substrate 3S compares the actual input value $sPD_1$ of the photo detector $31S_1$ held in the processing of deciding the positions and the number of the slave substrates 3S with the $SumPD_1$ and also compares the actual input value $sPD_2$ of the photo detector $31S_2$ with the $SumPD_2$.

Then, when the input values of the photo detectors $31S_1$ and $31S_2$ held by its own equipment and the PD input levels $SumPD_1$ and $SumPD_2$ obtained from the master substrate 3M are matched, in step SL3 in FIG. 45, the slave substrate 3S determines that the ID is assigned to its own equipment and this ID is held in step SL4 in FIG. 45, and in a case where the PD input values are not matched, the ID is discarded.

When the slave substrate 3S is assigned with the ID as the PD input values are matched, in step SL5 in FIG. 45, the information indicating that the ID is assigned is output by the laser diode 30S to notify the master substrate 3M.

When the information indicating that the ID is assigned is received from the slave substrate 3S, in step SK9 in FIG. 44, the master substrate 3M checks that the ID is assigned to the slave substrate 3S at the arrangement i, and in step SK10 and in step SK2, if the (i+1)-th slave substrate 3S exists, the ID assignment is carried out through a similar processing, and if the next slave substrates 3S to which the ID should be assigned does not exist, the ID assignment with respect to all the slave substrates 3S is ended.

It should be noted that in the present example too, as in the above-mentioned processing in FIGS. 42 and 43, by adding the weight for the evaluation value in accordance with the magnitude for each of the photo detectors, the accuracy of the ID assignment can be improved.

Figure 46A:
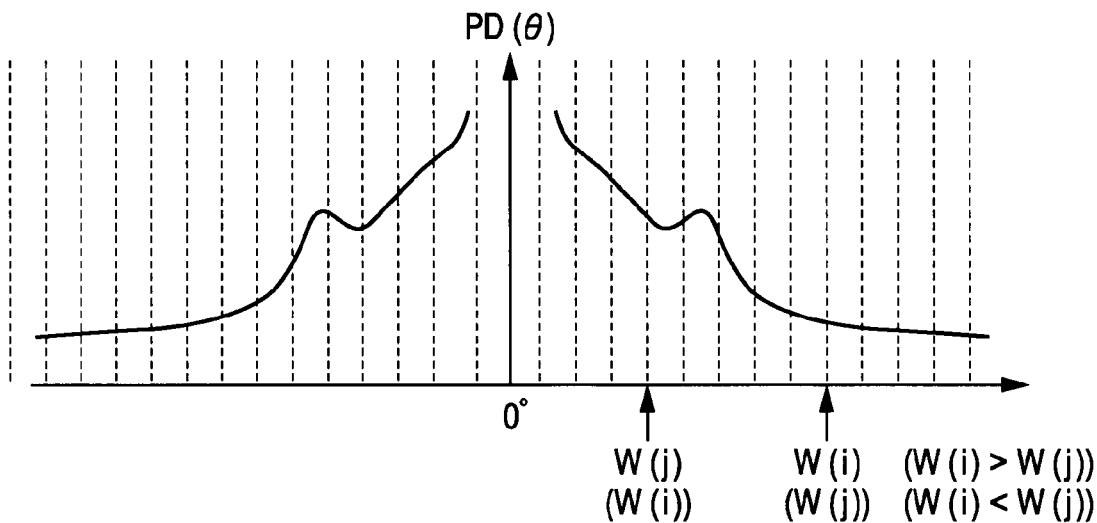
FIG. 46A is a graph showing a distribution of PD input levels.
Figure 46B:
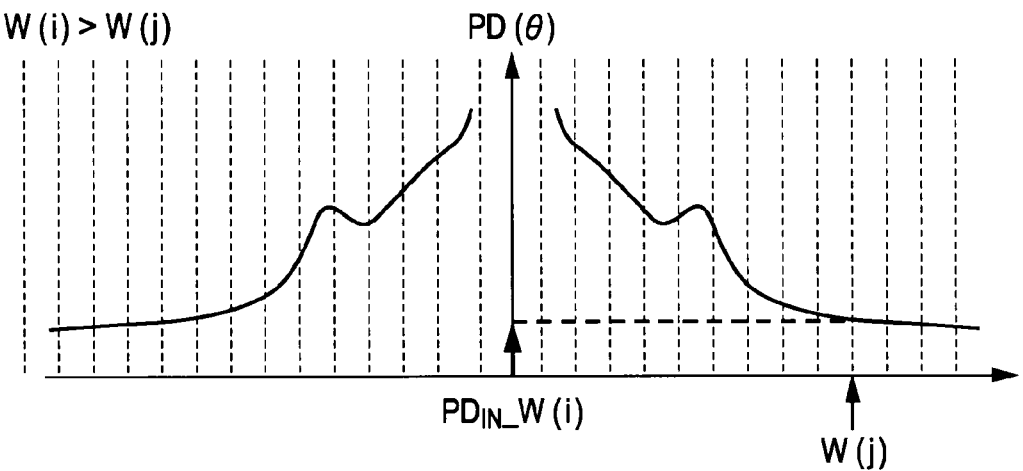
FIG. 46B is a graph showing the distribution of the PD input levels.
Figure 46C:
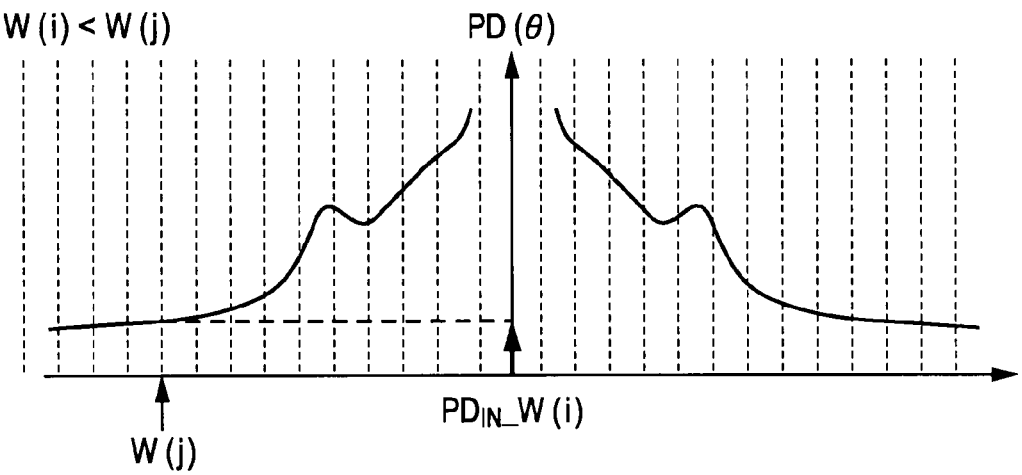
FIG. 46C is a graph showing the distribution of the PD input levels.

FIGS. 46A, 46AB and 46C show a distribution of the PD input levels, in which FIG. 46A is a graph representing a distribution seen from the master substrate 3M, and FIGS. 46B and 46C are graphs representing a distribution seen from the slave substrate 3S at an arrangement W(i). Also, FIGS. 47A and 47B are explanation diagrams showing an arrangement example of the slave substrates 3S in an arrangement W(i) and in an arrangement W(j) with respect to the master substrate 3M.

Next, the detail of the processing of calculating the level of the light input to the slave substrate 3S by the master substrate 3M will be described. At this time, it is set that the slave substrate 3S at the arrangement W(i) is at a position at an angle θi with respect to the master substrate 3M, and the slave substrate 3S at an arrangement W(j) is at a position at an angle θj with respect to the master substrate 3M.

In FIG. 46A, the level distribution of the light input to the photo detector 31M of the master substrate 3M is represented from the slave substrate 3S arranged at the angle θ in a case where the position at 180° where the optical waveguide 2A is put in-between with respect to the master substrate 3M, that is, the front face of the master substrate 3M is set as 0°, and the master substrate 3M has the information on the distribution of the PD input levels shown in FIG. 46A as the table shown in FIG. 33.

Figure 47A:
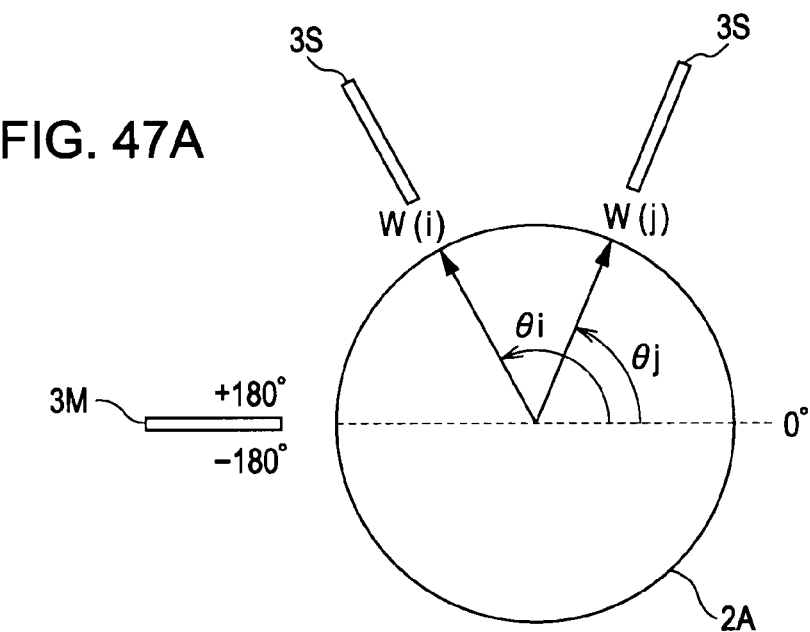
FIG. 47A is an explanation diagram showing an arrangement example of the slave substrates 3S in an arrangement W(i) and in an arrangement W(j) with respect to the master substrate 3M.
Figure 47B:
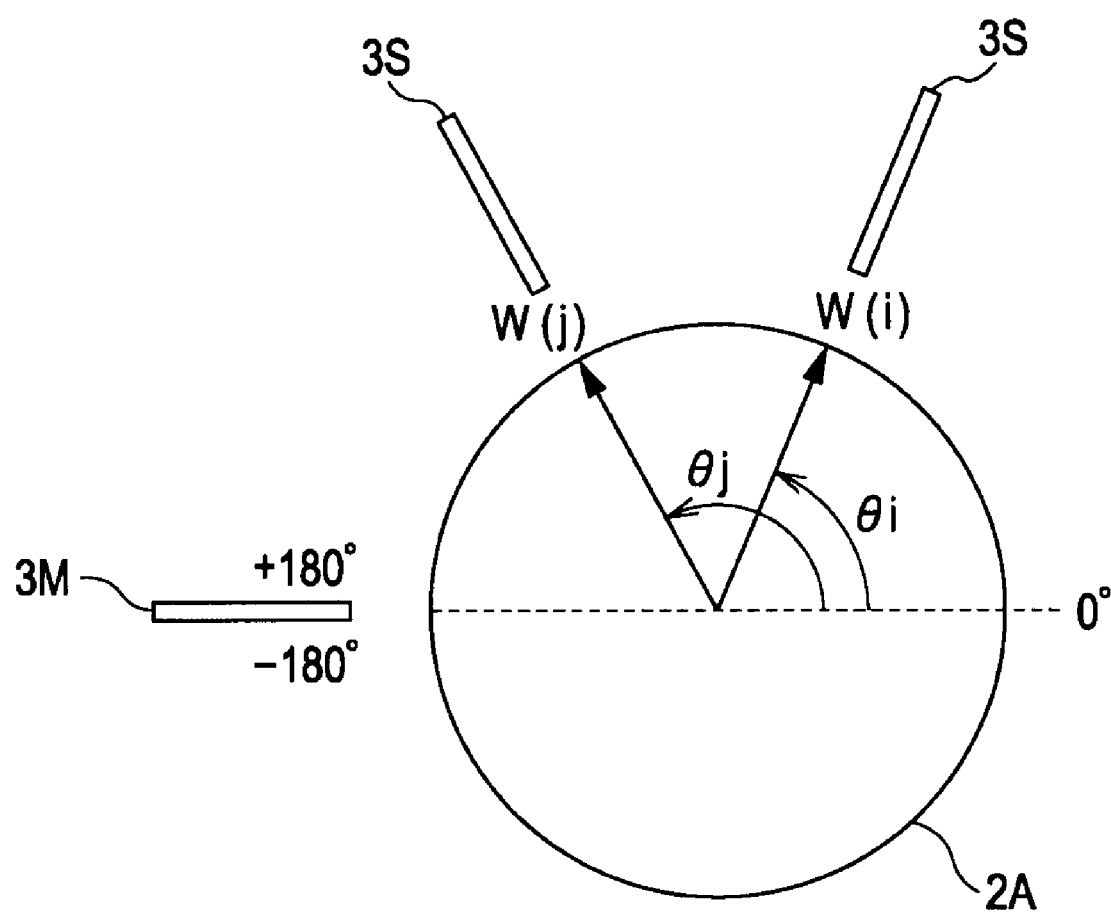
FIG. 47B is an explanation diagram showing an arrangement example of the slave substrates 3S at the arrangement W(i) and at the arrangement W(j) with respect to the master substrate 3M.

In contrast to this, when the level of the like input from the slave substrate 3S at the arrangement W(j) to the slave substrate 3S at the arrangement W(i) is considered, as shown in FIG. 47A, in the case of θi>θj, the slave substrate 3S at the arrangement W(j) is at a position of θi−θj with respect to the slave substrate 3S at the arrangement W(i).

For this reason, when the slave substrate 3S at the arrangement W(i) is considered to be arranged at the position of ±180°, the slave substrate 3S at the arrangement W(j) is at a position of 180°−(θi−θj). According to this, the PD input values $PD_1(i,j)$ and $PD_2(i,j)$ of the light input to the photo detectors $31S_1$ and $31S_2$ of and the slave substrate 3S at the arrangement W(i) from the laser diode 30S of the slave substrate 3S at the arrangement W(j) become an arrow denoted by $PD_{IN\_}W(i)$ in FIG. 46B.

On the other hand, as shown in FIG. 47B, in the case of θi<θj, the slave substrate 3S at the arrangement W(j) is at a position of θj−θi with respect to the slave substrate 3S at the arrangement W(i).

For this reason, when the slave substrate 3S at the arrangement W(i) is considered to be arranged at the position of ±180°, the slave substrate 3S at the arrangement W(j) is at a position of −180°+(θj−θi). According to this, the PD input values $PD_1(i,j)$ and $PD_2(i,j)$ of the light input to the photo detectors $31S_1$ and $31S_2$ of and the slave substrate 3S at the arrangement W(i) from the laser diode 30S of the slave substrate 3S at the arrangement W(j) become an arrow denoted by $PD_{IN\_}W(i)$ in FIG. 46C.

In view of the above, when the angles of the slave substrates 3S existing at the arrangement W(i) and the arrangement W(j) with respect to the master substrate 3M are respectively set as θi and θj, at the time of θi<θj, a function F shown in the following (8) expression is introduced, and at the time of θi>θj, a function F shown in the following (9) expression is introduced.

$$F(\theta i, \theta j) = -180 + (\theta j - \theta i) \quad (8)$$

$$F(\theta i, \theta j) = 180 - (\theta i - \theta j) \quad (9)$$

At this time, the LD output of the slave substrate 3S at the arrangement W(j) is input to the slave substrate 3S at the arrangement W(i) by way of values of the (10) expression and the (11) expression described below.

$$\text{Level} = PD(\theta i, j) \quad (10)$$

$$\theta i, j = F(W(i), W(j)) \quad (11)$$

Figure 48:
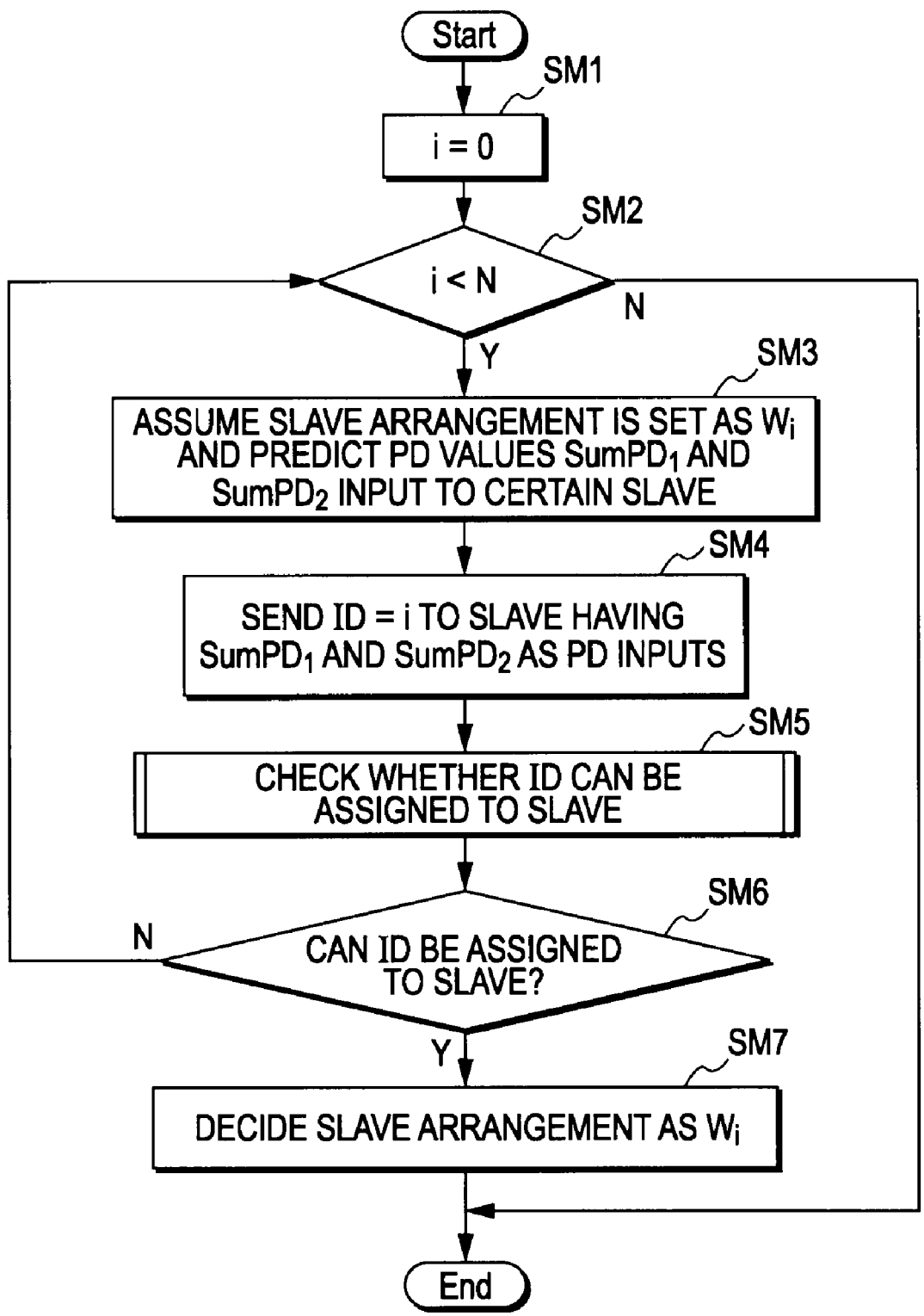
FIG. 48 is a flow chart showing a detail of the processing of the master substrate 3M when the ID is assigned to the slave substrate 3S whose arrangement is not uniquely decided.

FIG. 48 is a flow chart showing a detail of the processing of the master substrate 3M when the ID is assigned to the slave substrate 3S whose arrangement is not uniquely decided, and next, a description will be given of the detail of the processing of assigning the ID to the slave substrate 3S in a case where the arrangement of the slave substrate 3S cannot not be decided in the above-mentioned flow chart of FIG. 34. It should be noted that the processing on the slave substrate 3S is the same as the flow chart of FIG. 45.

As described above, with the provision of two pieces of photo detectors, by inclining one with respect to the other, the symmetric property of the light attenuation is broken. It should be however that as shown in FIG. 2B, in a range between 0° and ±180°, the positions where the PD input levels are equal to each other exist. For this reason, in the PD input level table, elements having the same PD input level and different arrangement vectors.

In the following description, it is supposed that the arrangement candidates $W_i$ for the slave substrate 3S have N pieces. In the arrangement candidates $W_i$ (i=0, 1, ..., N) for the slave substrate 3S, as shown in the following (12) expression, two pieces of information on the slave positions confirmed in all the candidates (within the solid line) and unconfirmed slave positions (within the two-dot chain line) are included.

[Expression 3]

$$W_0 = \begin{pmatrix} (1 & ,1 & ,1 & ,0 & ,0 & ,0 & ,0 & ,1) \\ (1 & ,0 & ,1 & ,0 & ,1 & ,0 & ,0 & ,1) \end{pmatrix} \quad (12)$$

$$W_1 =$$

At this time, it is presumed that the slave substrate 3S exists at the position whose value is 1 indicating the existence of the substrate with respect to the respective arrangement candidates $W_i$ for the slave substrate 3S.

Then, the PD input level input to the slave substrate 3S arranged at a certain position where the slave substrate 3S is presumed to exist is predicted. For example, according to the present example, the PD input level of the slave substrate 3S at the position corresponding to the 0-th element is predicted, and if the ID can be assigned, the arrangement of the slave substrate 3S is confirmed. On the other hand, if the ID cannot be assigned, the PD input level of the slave substrate 3S at the position corresponding to the next element is predicted, and the ID assignment is carried out. This processing is repeatedly carried out until the ID can be assigned.

That is, the master substrate 3M starts the ID assignment processing with respect to the certain slave substrate 3S of the arrangement candidate $W_i$ in step SM1 in FIG. 48. At this time, when the number of the arrangement candidates for the slave substrate 3S is set as N, in step SM2 in FIG. 48, with respect to the arrangement candidates from i=0 to i=N, the ID assignment processing is carried out until the ID can be assigned.

In step SM3 in FIG. 48, the master substrate 3M predicts the PD input values $SumPD_1$ and $SumPD_2$ of the light input from the laser diode 30S of the other slave substrate 3S to the photo detector 31S of the certain slave substrate 3S of the arrangement candidate $W_i$ the photo detectors $31S_1$ and $31S_2$ of and the slave substrate 3S through the processing in step SK3 to SK7 in the above-mentioned flow chart of FIG. 44.

In step SM4 in FIG. 48, the master substrate 3M sends the PD input values $SumPD_1$ and $SumPD_2$ obtained with respect to the certain slave substrate 3S of the arrangement candidate $W_i$ and the ID information to all the slave substrates 3S by way of the light from the laser diode 30M and assigns the ID to the slave substrate 3S having $SumPD_1$ and $SumPD_2$ as the PD input value.

All the slave substrates 3S connected to the optical waveguide 2A receive the PD input levels $SumPD_1$ and $SumPD_2$ and the ID from the master substrate 3M in step SL1 in FIG. 45.

In step SL2 in FIG. 45, the slave substrate 3S compares the actual input value $sPD_1$ of the photo detector $31S_1$ held in the processing of deciding the positions and the number of the slave substrates 3S with the $SumPD_1$ and also compares the actual input value $sPD_2$ of the photo detector $31S_2$ with the $SumPD_2$.

Then, when the input values of the photo detectors $31S_1$ and $31S_2$ held by its own equipment and the PD input levels $SumPD_1$ and $SumPD_2$ obtained from the master substrate 3M are matched, in step SL3 in FIG. 45, the slave substrate 3S determines that the ID is assigned to its own equipment and this ID is held in step SL4 in FIG. 45, and in a case where the PD input values are not matched, the ID is discarded.

When the slave substrate 3S is assigned with the ID as the PD input values are matched, in step SL5 in FIG. 45, the information indicating that the ID is assigned is output by the laser diode 30S to notify the master substrate 3M.

The master substrate 3M checks that the ID is assigned to the certain slave substrate 3S of the arrangement candidates $W_i$ on the basis of the presence or absence of the reception of the information indicating that the ID from the slave substrate 3S is assigned in step SM5 in FIG. 48, and when it is checked that the ID is assigned to the slave substrate 3S in step SM6 in FIG. 48, the arrangement of the slave substrate 3S is decided as the arrangement candidate $W_i$ in step SM7 in FIG. 48.

After the arrangement of the slave substrate 3S is decided, the master substrate 3M assigns the ID to all the slave substrates 3S through the above-mentioned processing of the flow chart of FIG. 44.

Also, in step SM6 in FIG. 48, in a case where it cannot be not checked that the ID cannot be assigned to the slave substrate 3S, the master substrate 3M returns to step SM2 in FIG. 48 and carries out the ID assignment processing with respect to a certain slave substrate 3S of the arrangement candidates $W_{i+1}$.

Figure 49A:
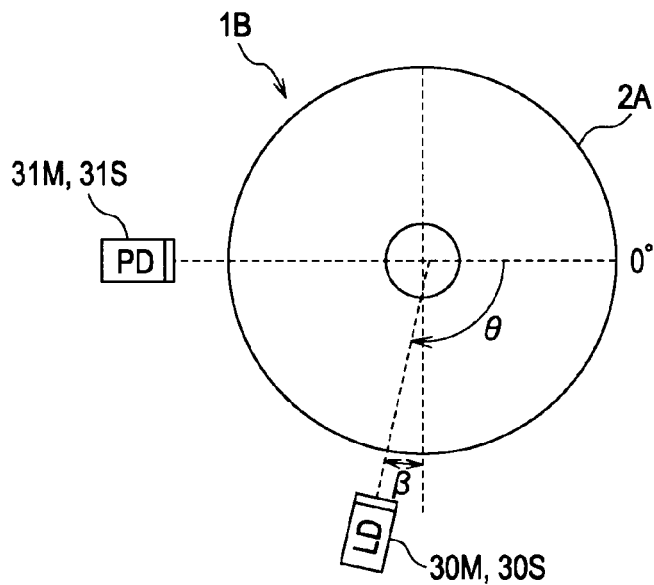
FIG. 49A is a schematic plan view showing an example of an arrangement of a light input output unit in a signal processing apparatus according to a second embodiment.
Figure 49B:
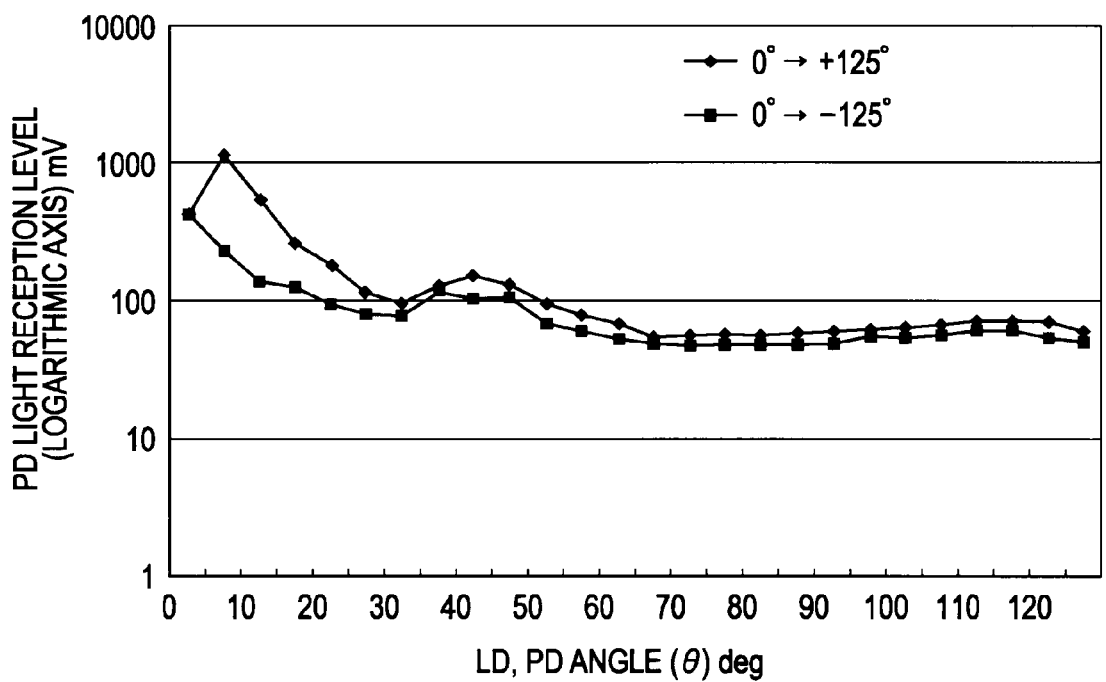
FIG. 49B is a graph showing a relation of input levels of a photo detector in the signal processing apparatus according to the second embodiment.

Configuration Example of a Signal Processing
Apparatus According to a Second Embodiment FIGS. 49A and 49B show an outline of a signal processing apparatus according to a second embodiment, in which FIG. 49A is a schematic plan view showing an arrangement of a light input output unit in the signal processing apparatus 1B according to the second embodiment, and FIG. 49B is a graph showing a relation of input levels of a photo detector when a laser diode is inclined.

As shown in FIG. 1A, the signal processing apparatus 1B according to the second embodiment is provided with the optical waveguide 2A through which the light is transmitted, and the master substrate 3M and the slave substrate 3S connected to the optical waveguide 2A.

The master substrate 3M and the slave substrate 3S are respectively provided with the laser diodes 30M and 30S and the photo detectors 31M and 31S, and in order to break the symmetric property of the light attenuation in the optical waveguide 2A, in the respective substrates, as shown in FIG. 49A, the laser diodes 30M and 30S are arranged to be inclined at a predetermined angle β in the surface direction with respect to the center of the optical waveguide 2A.

It should be noted that in the respective substrates, the photo detectors 31M and 31S is arranged towards the center of the optical waveguide 2A, and also, the laser diode is arranged one piece each for the respective substrates, and the photo detector is arranged one piece each for the respective substrates.

At this time, in the master substrate 3M and the slave substrate 3S connected to the optical waveguide 2A, the direction of the inclination of the laser diodes 30M and 30S is configured to be identical to the circumference direction.

In FIG. 49B, as shown in FIG. 49A, when the angle β of the laser diodes 30M and 30S is set as 5°, the change is illustrated in the PD input level when the angle θ of the laser diodes 30M and 30S is moved with respect to the photo detectors 31S and 31M. It should be noted that the measurement range is a range from 0° to ±125°.

As shown in FIG. 49B, as the laser diodes 30M and 30S have the inclination, it is understood that the difference in the PD input level is generated on the plus side and the minus side from 0°, and the symmetric property is broken.

Figure 50:
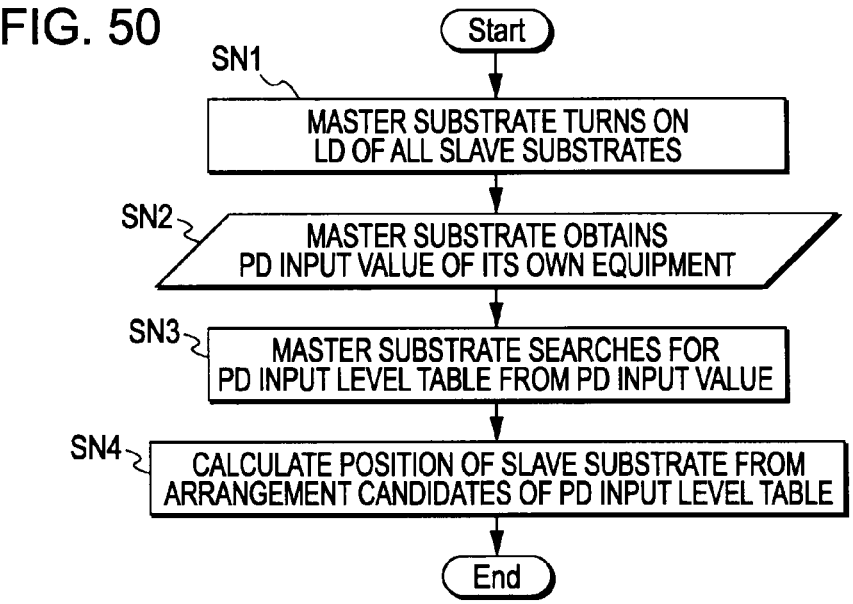
FIG. 50 is a flow chart showing another processing example of the master substrate 3M when the arrangement and the number of the slave substrates 3S are decided.

Operation Example of the Signal Processing
Apparatus According to the Second Embodiment FIG. 50 is a flow chart showing another processing example of the master substrate 3M when the arrangement and the number of the slave substrates 3S are decided, and next, a description will be given of a processing of deciding the arrangement and the number of the slave substrates 3S in a configuration in which the single laser diode is inclined in the respective substrates.

The master substrate 3M carries out a processing similar to step SD1 in the above-mentioned flow chart of FIG. 25, and in step SN1 in FIG. 50, the laser diodes 30S of all the slave substrates 3S connected to the optical waveguide 2A are turned ON.

When the master substrate 3M determines that the laser diodes 30S of all the slave substrates 3S are turned ON, for example, by detecting that the input value of the photo detector 31M of its own equipment saturates or the like, in step SN2 in FIG. 50, the PD input value input to the photo detector 31M of its own equipment is obtained.

Similarly as in the above-mentioned first embodiment, the master substrate 3M recognizes various characteristics related to the laser diode 30M of its own equipment and the laser diode 30S of the slave substrate 3S, for example, the wavelength, the light emission amount, and the attenuation characteristic. Also, the photo detector 31M of the master substrate 3M and the photo detector 31S of the respective slave substrates 3S are identical to each other.

Then, the master substrate 3M holds the level table of the PD input value in accordance with the arrangement of the slave substrate 3S. This PD input level table is created in a similar procedure to the PD input level table according to the above-mentioned first embodiment. It should be however that according to the second embodiment, the laser diode and the photo detectors are provided one piece each in the respective substrates, and in the master substrate 3M, the PD input level table created in accordance with the single input level of the photo detector 31M may be held.

The master substrate 3M searches the PD input level table from the input value of the photo detector 31M of its own equipment in step SN3 in FIG. 50.

In step SN4 in FIG. 50, the master substrate 3M obtains the arrangement candidates by searching the PD input level table by the PD input value from the slave substrate 3S and calculates the positions and the number of the slave substrates 3S. The processing for the master substrate 3M to obtain the arrangement candidates for the slave substrate 3S from the PD input level table and calculate the positions and the number of the slave substrates 3S is similar to the processing utilizing the PD input level table according to the above-mentioned first embodiment.

Figure 51:
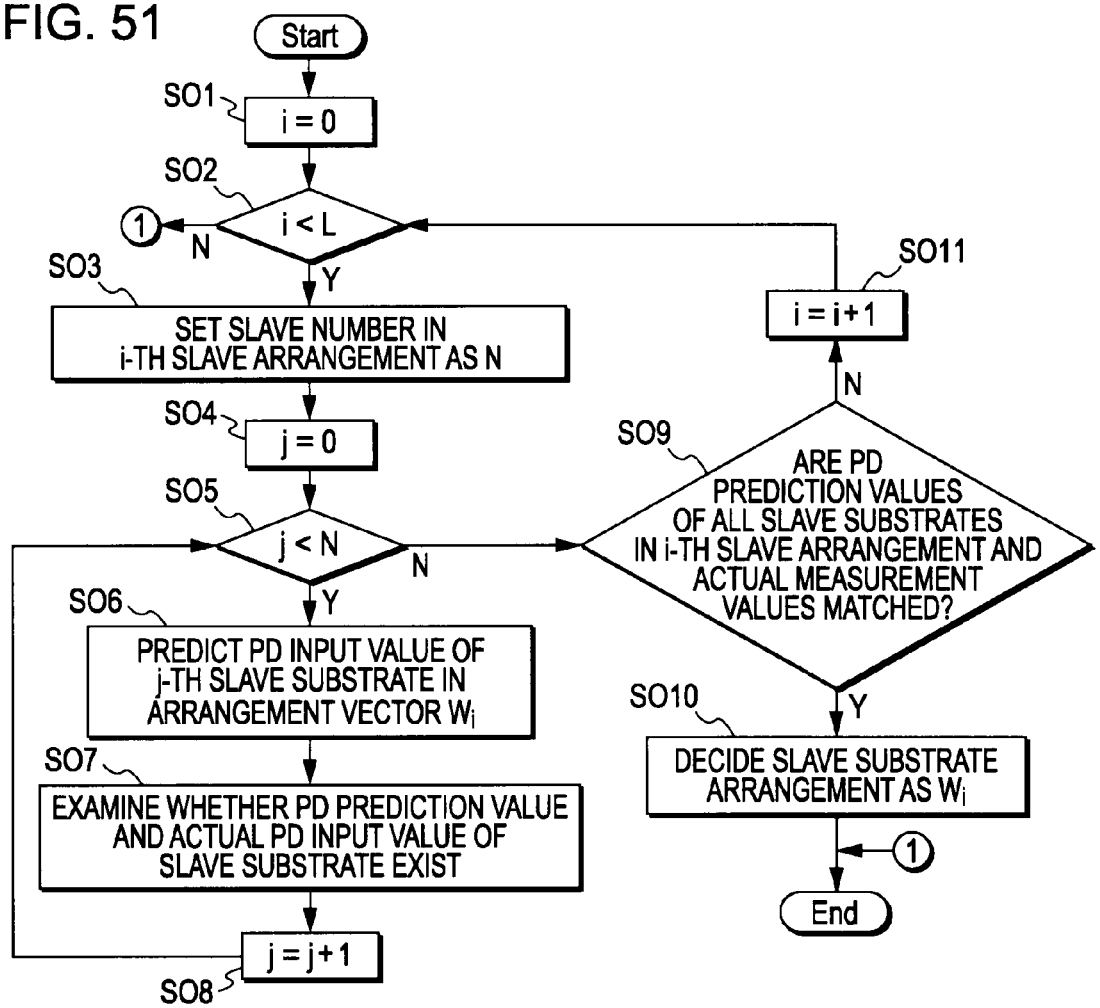
FIG. 51 is a flow chart showing a detail of another processing of the master substrate 3M when the ID is assigned to the slave substrate 3S whose arrangement is not uniquely decided.

FIG. 51 is a flow chart showing a detail of another processing of the master substrate 3M when the ID is assigned to the slave substrate 3S whose arrangement is not uniquely decided.

In the following description, L denotes the number of the arrangement candidates for the slave substrate 3S, and $W_i$ denotes an arrangement vector in the arrangement candidates for the i-th slave substrate 3S.

In steps SO1 and SO2 in FIG. 51, the master substrate 3M starts a processing of sequentially predicting the PD input value with respect to the slave substrate 3S of the arrangement vector $W_i$ and carries out the processing until the prediction value and the actual measurement value of the PD input value are matched with respect to the arrangement candidates from i=0 to i=L.

The master substrate 3M sets the number of the slave substrates 3S in the arrangement of the i-th slave substrate 3S identified by the arrangement vector $W_i$ as N in step SO3 in FIG. 51.

In steps SO4 to SO8 in FIG. 51, the master substrate 3M predicts the PD input value of the light input to the photo detector 31S of the j-th slave substrate 3S in the arrangement vector $W_i$ from the laser diode 30S of the other slave substrate 3S with respect to all the slave substrates 3S from j=0 to j=N through the processing in step SK3 to SK7 in the above-mentioned flow chart of FIG. 44.

The master substrate 3M sends the information on the PD input value obtained with respect to the j-th slave substrate 3S of the arrangement vector $W_i$ by way of the light from the laser diode 30M to all the slave substrates 3S in step SO7 in FIG. 51.

When all the slave substrates 3S connected to the optical waveguide 2A receive the information on the PD input value from the master substrate 3M, the comparison with made with the actual input value of the photo detector 31S held in the processing of deciding the positions and the number of the slave substrates 3S.

Then, when the input value of the photo detector 31S held by its own equipment is matched with the PD input value obtained from the master substrate 3M, the slave substrate 3S outputs the information indicating that the prediction value and the actual measurement value of the PD input value are matched by the laser diode 30S to notify the master substrate 3M.

In the arrangement of the i-th slave substrate 3S identified by the arrangement vector $W_i$, the master substrate 3M determines whether the prediction values and the actual measurement values of the PD input values of all the slave substrates 3S are matched in step SO9 in FIG. 51.

Then, in the arrangement vector $W_i$, when the prediction values and the actual measurement values of the PD input values of all the slave substrates 3S are matched, in step SO10 in FIG. 51, the arrangement of the slave substrate 3S is decided as the arrangement of the i-th slave substrate 3S identified by the arrangement vector $W_i$.

After the arrangement of the slave substrate 3S is decided, the master substrate 3M assigns the ID to all the slave substrates 3S through the above-mentioned processing of the flow chart of FIG. 44.

Also, in step SO11 in FIG. 51, in the arrangement vector $W_i$, in a case where the prediction values and the actual measurement values of the PD input values of all the slave substrates 3S are not matched, with respect to the slave substrate 3S the next arrangement vector $W_{i+1}$, the PD input value is sequentially predicted to carry out the processing of checking the match with the actual measurement value.

Figure 52:
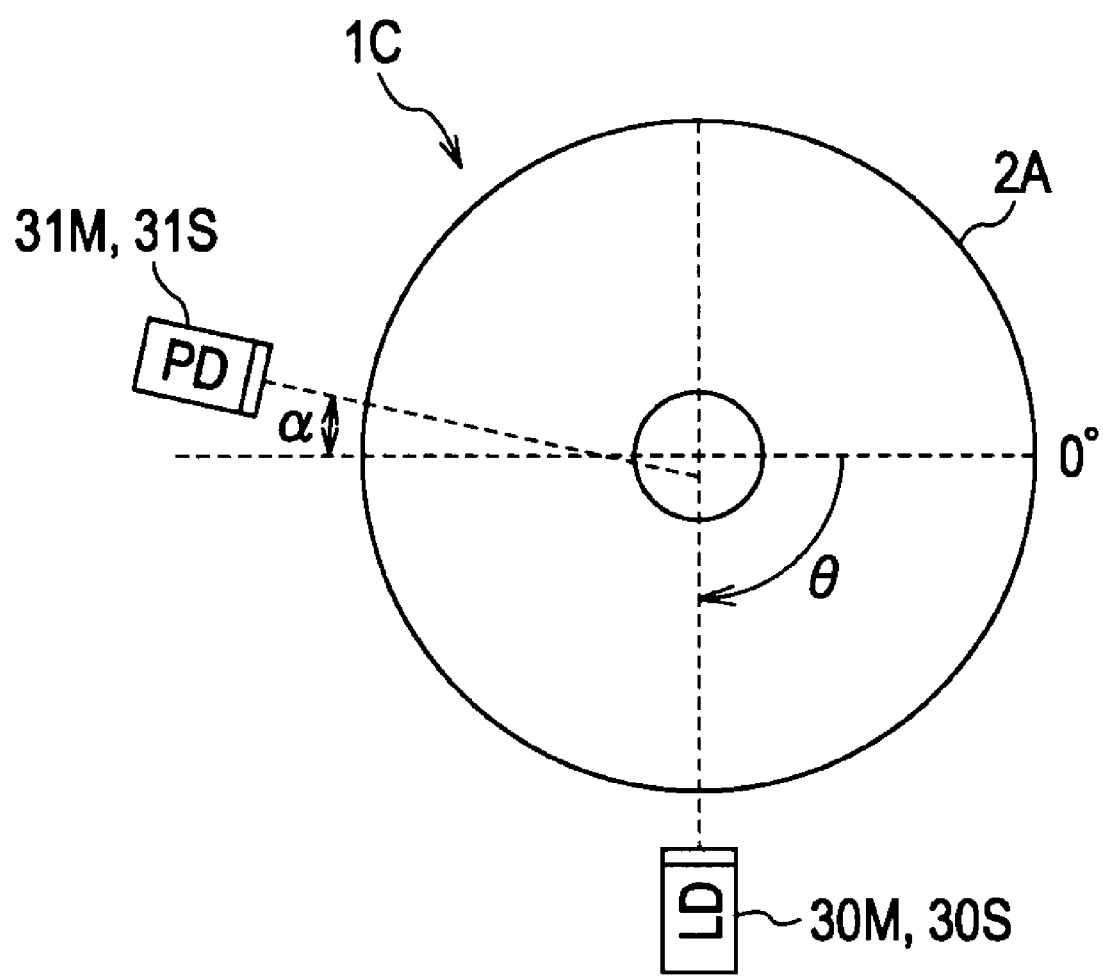
FIG. 52 is a configuration diagram showing an outline of a signal processing apparatus according to a third embodiment.

Configuration Example of a Signal Processing Apparatus According to a Third Embodiment FIG. 52 is a configuration diagram showing an outline of a signal processing apparatus according to a third embodiment.

A signal processing apparatus 1C according to the third embodiment is provided with the optical waveguide 2A through which the light is transmitted, and the master substrate 3M and the slave substrate 3S connected to the optical waveguide 2A.

The master substrate 3M and the slave substrate 3S are respectively provided with the laser diodes (LD) 30M and 30S and the photo detectors (PD) 31M and 31S, and in order to break the symmetric property of the light attenuation in the optical waveguide 2A, in the respective substrates, the photo detectors 31M and 31S are arranged to be inclined at the predetermined angle α in the surface direction with respect to the center of the optical waveguide 2A.

It should be noted that in the respective substrates, the laser diodes 30M and 30S are arranged towards the center of the optical waveguide 2A, and also, the laser diode is arranged one piece each to the respective substrates, and the photo detector is arranged one piece each to the respective substrates.

At this time, in the master substrate 3M and the slave substrate 3S connected to the optical waveguide 2A, the direction of the inclination of the photo detectors 31M and 31S is configured to be identical to the circumference direction.

Operation Example of the Signal Processing Apparatus According to the Third Embodiment Next, in a configuration in which one piece of the photo detector inclined with respect to the center of the optical waveguide 2A is provided in the respective substrates, the processing by the master substrate 3M to calculate the positions and the number of the slave substrates 3S will be described.

Figure 53:
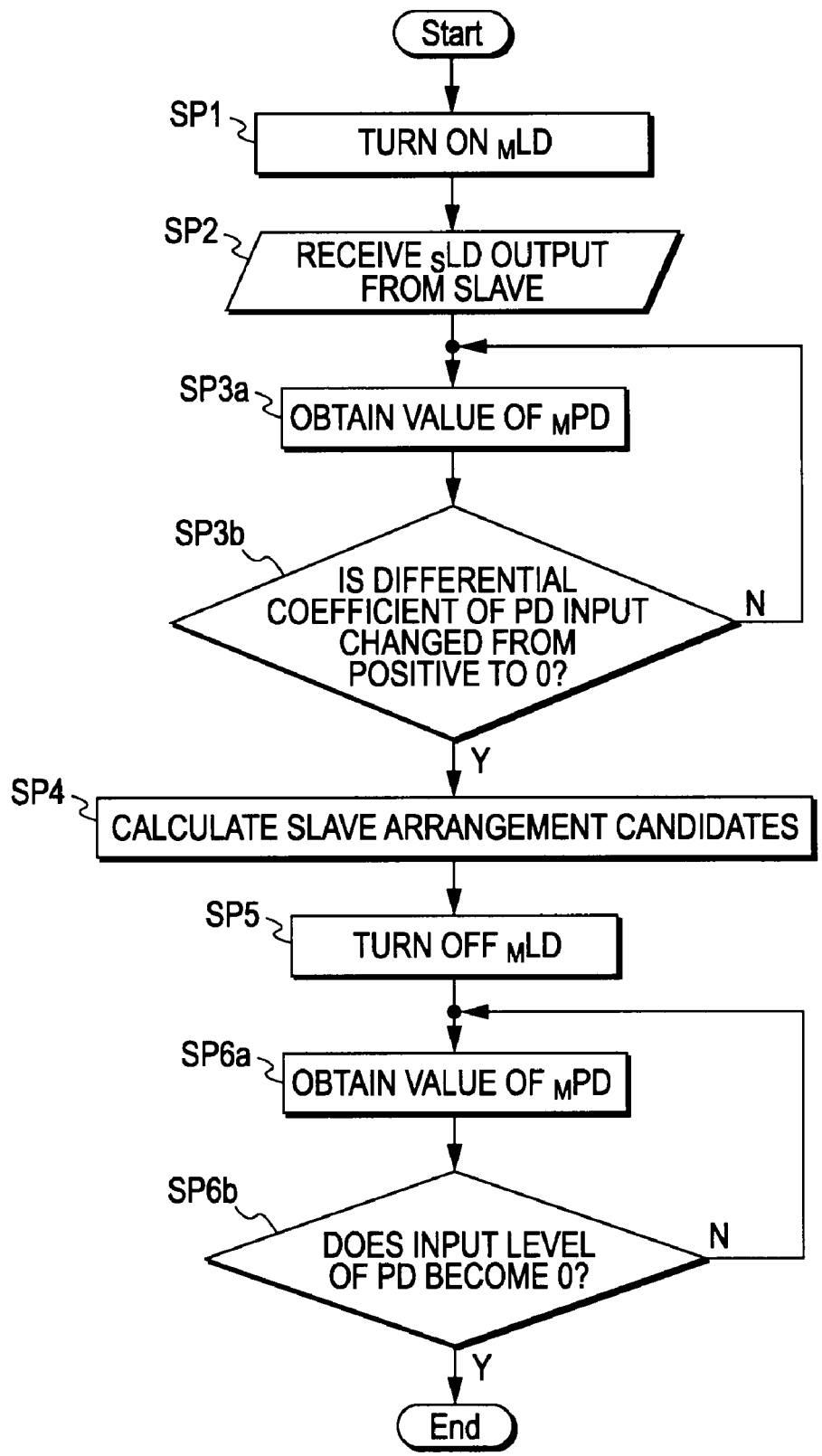
FIG. 53 is a flow chart showing another processing example of the master substrate 3M when the arrangement and the number of the slave substrates 3S are decided.
Figure 54:
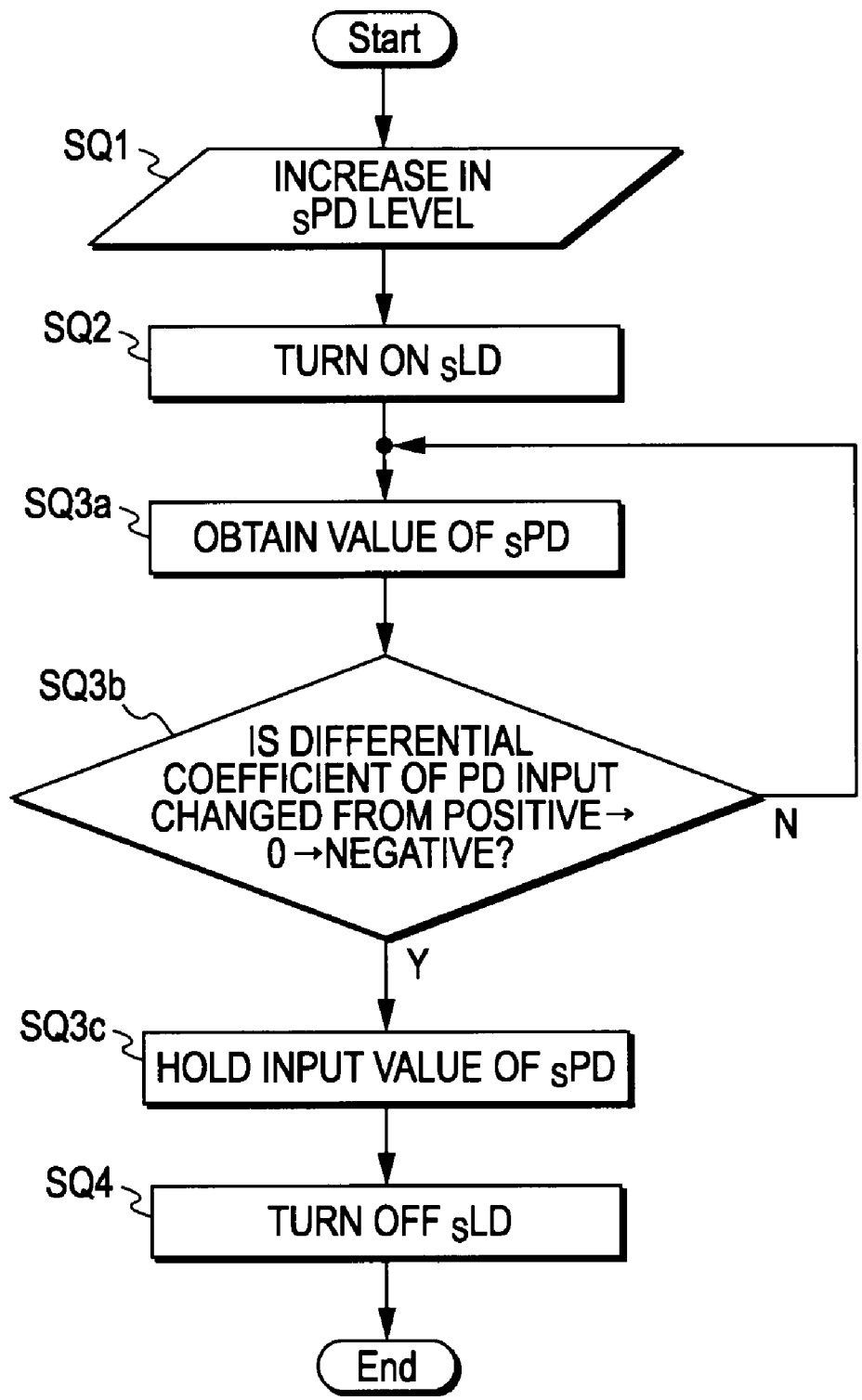
FIG. 54 is a flow chart showing another processing example of the slave substrate 3S when the arrangement and the number of the slave substrates 3S are decided.

FIG. 53 is a flow chart showing another processing example of the master substrate 3M when the arrangement and the number of the slave substrates 3S are decided, and FIG. 54 is a flow chart showing another processing example of the slave substrate 3S when the arrangement and the number of the slave substrates 3S are decided.

The master substrate 3M turns ON the laser diode 30M of its own equipment ($_M$LD) In step SP1 in FIG. 53. As the laser diode 30M of the master substrate 3M is turned ON, the light output from the master substrate 3M is transmitted through the optical waveguide 2A and received by the photo detector 31S of the slave substrate 3S($_S$PD). According to this, in step SQ1 in FIG. 54, in the respective slave substrates 3S connected to the optical waveguide 2A, the input level of the photo detector 31S increases.

In step SQ2 in FIG. 54, as the light output from the master substrate 3M is received by the photo detector 31S, when the input level of the photo detector 31S increases to the predetermined value, the respective slave substrates 3S turn ON the laser diodes 30S of its own equipment.

In response to the turning ON of the laser diode 30M of the master substrate 3M, when the laser diodes 30S of the respective slave substrates 3S are turned ON, the lights output from the respective slave substrates 3S are transmitted though the optical waveguide 2A and received by the photo detector 31M of the master substrate 3M in step SP2 in FIG. 53.

As the lights output from the respective slave substrate are received by the photo detector 31M of the master substrate 3M, in the master substrate 3M, the input level of the photo detector 31M increases.

According to this, in the master substrate 3M, when the laser diode 30S is turned ON in the slave substrate 3S in response to the turning ON of the laser diode 30M of its own equipment, the input level of the photo detector 31M of the master substrate 3M increases until the laser diodes 30S of all the slave substrates 3S are turned ON and becomes a constant value when the laser diodes 30S of all the slave substrates 3S are turned ON.

In view of the above, when the input value of the photo detector 31M becomes the constant value, the master substrate 3M checks that the output of the laser diode 30S is carried out in all the slave substrates 3S connected to the optical waveguide 2A.

That is, in step SP3$a$ in FIG. 53, the master substrate 3M obtains the input value of the photo detector 31M, and in step SP3$b$, determines that the input value of the photo detector 31M becomes the constant value, for example, on the basis of whether or not the differential coefficient of the input value is changed from positive to 0 through the above-mentioned processing of the flow chart of FIG. 9.

Then, when the differential coefficient of the input value of the photo detector 31M is changed from positive to 0, the master substrate 3M determines that it is checked the output of the laser diode 30S is carried out in all the slave substrates 3S connected to the optical waveguide 2A.

When it is checked that the output of the laser diode 30S is carried out in all the slave substrates 3S connected to the optical waveguide 2A, in step SP4 in FIG. 53, the master substrate 3M calculates the positions and the number of the slave substrates 3S to calculate the arrangement candidates for the slave substrate 3S.

When the arrangement candidates for the slave substrate 3S connected to the optical waveguide 2A are calculated, in step SP5 in FIG. 53, the master substrate 3M turns OFF the laser diode 30M of its own equipment.

In the slave substrate 3S, in response to the turning ON of the laser diode 30M of the master substrate 3M, when the lights are output from the respective slave substrates 3S the input level of the photo detector 31S increases until the laser diodes 30S of all the slave substrates 3S are turned ON and becomes a constant value when the laser diodes 30S of all the slave substrates 3S are turned ON.

Then, the master substrate 3M calculates the arrangement candidates for the slave substrate 3S, and in step SP5, when the laser diode 30M is turned OFF, the input level of the photo detector 31S of the respective slave substrates 3S decreases from the constant value.

In view of the above, when the input value of the photo detector 31S decreases from the constant value, the slave substrate 3S determines that the master substrate 3M completed the calculation of the arrangement candidates for the slave substrate 3S.

That is, in step SQ3$a$ in FIG. 54, the slave substrate 3S obtains the input value of the photo detector 31S, and in step SQ3$b$, determines that the input value of the photo detector 31S decreases from the constant value, for example, on the basis of whether or not the differential coefficient of the input value is changed from positive to 0 and thereafter changed from 0 to negative through the above-mentioned processing of the flow chart of FIG. 9.

Then, when the differential coefficient of the input value of the photo detector 31S is changed from positive to 0 and thereafter changed from 0 to negative, the slave substrate 3S determines that the master substrate 3M completed the calculation for the arrangement candidates for the slave substrate 3S, and for the utilization in the ID assignment, in step SQ3$c$ in FIG. 54, after holding the input value of the photo detector 31S of its own equipment, in step SQ4 in FIG. 54, the laser diode 30S of its own equipment is turned OFF.

As the laser diodes 30S of the respective slave substrates 3S are turned OFF, in the master substrate 3M, the input level of the photo detector decreases.

In the master substrate 3M, when the laser diode 30S is turned OFF in the slave substrate 3S in response to the turning OFF of the laser diode 30M of its own equipment, the input level of the photo detector 31M of the master substrate 3M decreases until the laser diodes 30S of all the slave substrates 3S are turned OFF and becomes "0" when the laser diodes 30S of all the slave substrates 3S are turned OFF.

In view of the above, when the input value of the photo detector 31M becomes 0, the master substrate 3M determines that all the slave substrates 3S responded.

That is, in step SP6$a$ in FIG. 53, the master substrate 3M obtains the input value of the photo detector 31M and determines whether or not the input value of the photo detector 31M becomes 0 in step SP6$b$, for example, through the above-mentioned processing of the flow chart of FIG. 15.

Then, when the input value of the photo detector 31M becomes 0, the master substrate 3M determines that all the slave substrates 3S responded, and the processing of deciding the arrangement candidates for the slave substrate 3S is ended.

Figure 55:
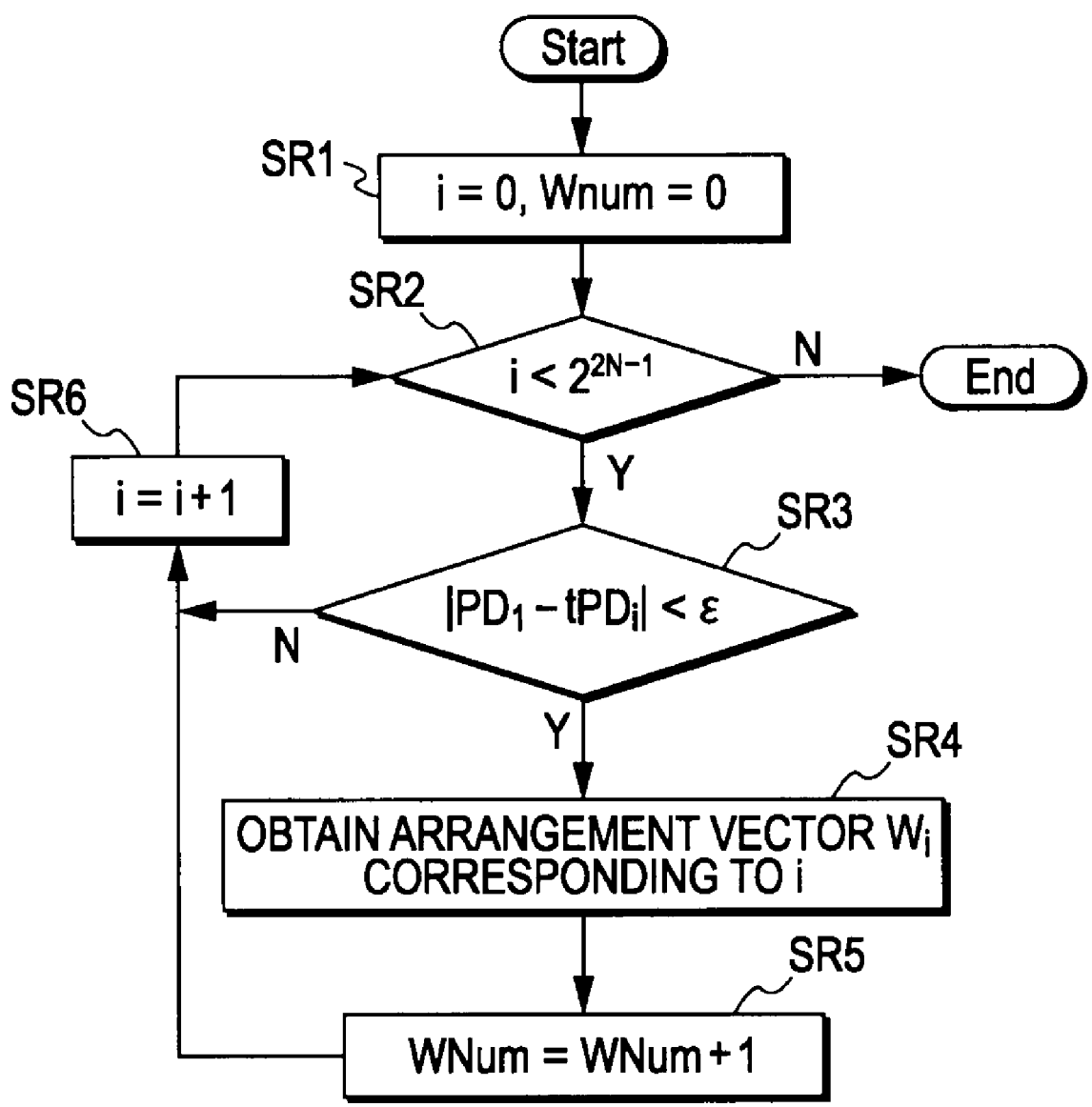
FIG. 55 is a flow chart showing an example of a processing of calculating arrangement candidates for the slave substrate 3S.

FIG. 55 is a flow chart showing an example of a processing of calculating arrangement candidates for the slave substrate 3S, and next, a description will be given of the detail of the processing of calculating the arrangement candidates for the slave substrate 3S in step SP4 in FIG. 53.

According to the present example, as the master substrate 3M is provided with one piece of the photo detector 31M, the master substrate 3M holds the PD input level table tPD in accordance with the input value of the single photo detector 31M.

In the PD input level table tPD calculated similarly as in the PD input level table of FIG. 33 described above, the number of the slave substrates 3S which can be connected to the optical waveguide 2A is 2N−1 pieces, and therefore according to the present example, $2^{2N-1}$ ways of combination exist.

For this reason, in steps SR1 to SR3 in FIG. 55, the master substrate 3M calculates a difference between the PD input value PD_$_{IN}$ of the photo detector 31M and the i-th PD input level table tPD$_i$ to search for an element closest to the PD input value PD_$_{IN}$ of the photo detector 31M.

When the master substrate 3M determines that the i-th PD input level table tPD$_i$ is sufficiently close to the PD input value in step SR4 in FIG. 55, the arrangement vector W$_i$ corresponding to the i-th PD input level table tPD$_i$ is obtained, and in steps SR5 and SR6 in FIG. 55, the search is similarly conducted with respect to the (i+1)-th element.

Next, in a configuration in which one piece of the photo detector inclined with respect to the center of the optical waveguide 2A is provided in the respective substrates, a processing for the master substrate 3M to decide the arrangement of the slave substrate 3S whose arrangement cannot be uniquely decided and assign the ID to the slave substrate 3S.

Figure 56:
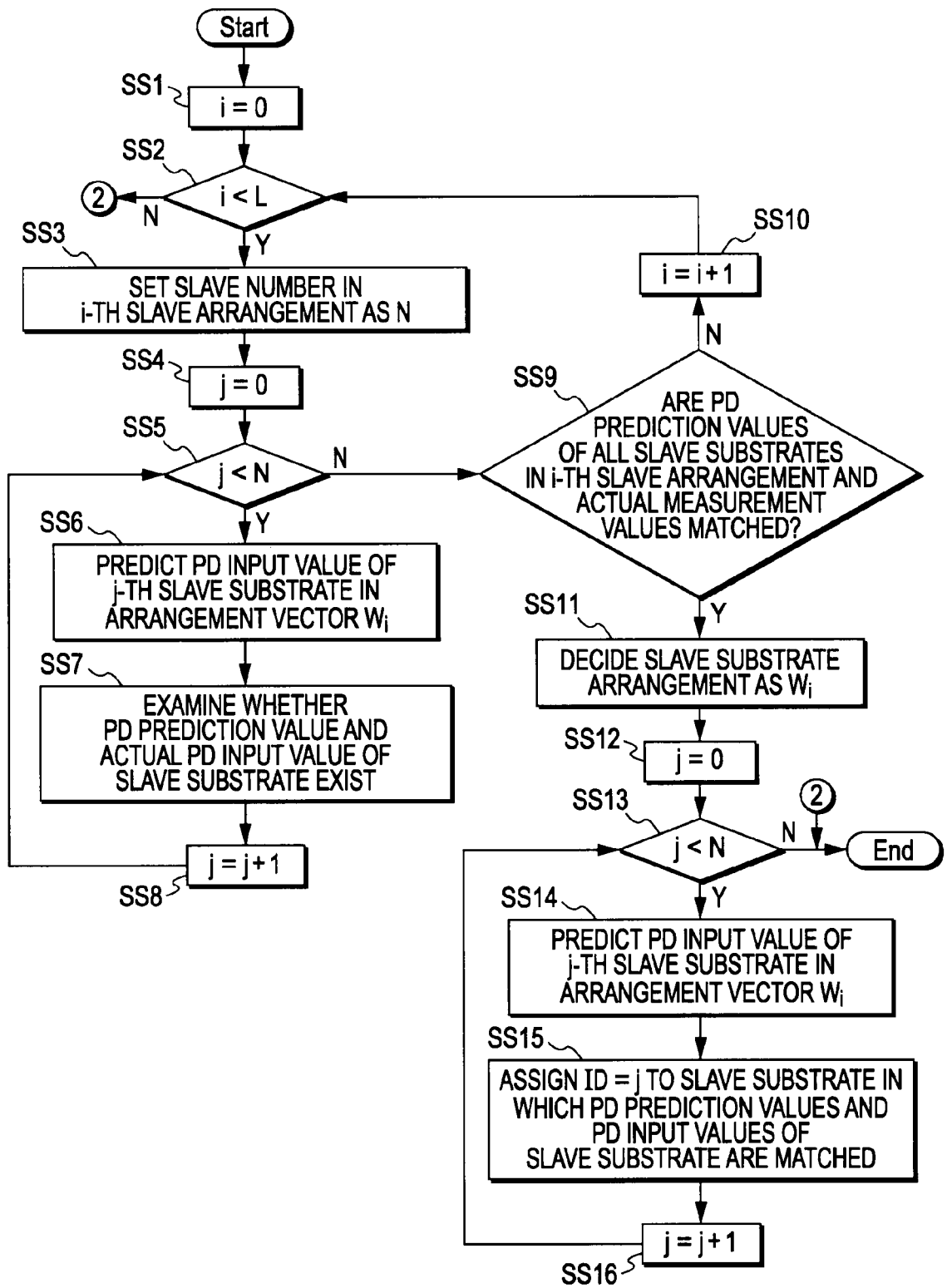
FIG. 56 is a flow chart showing a detail of another processing of the master substrate 3M when the ID is assigned to the slave substrate 3S whose arrangement is not uniquely decided.
Figure 57:
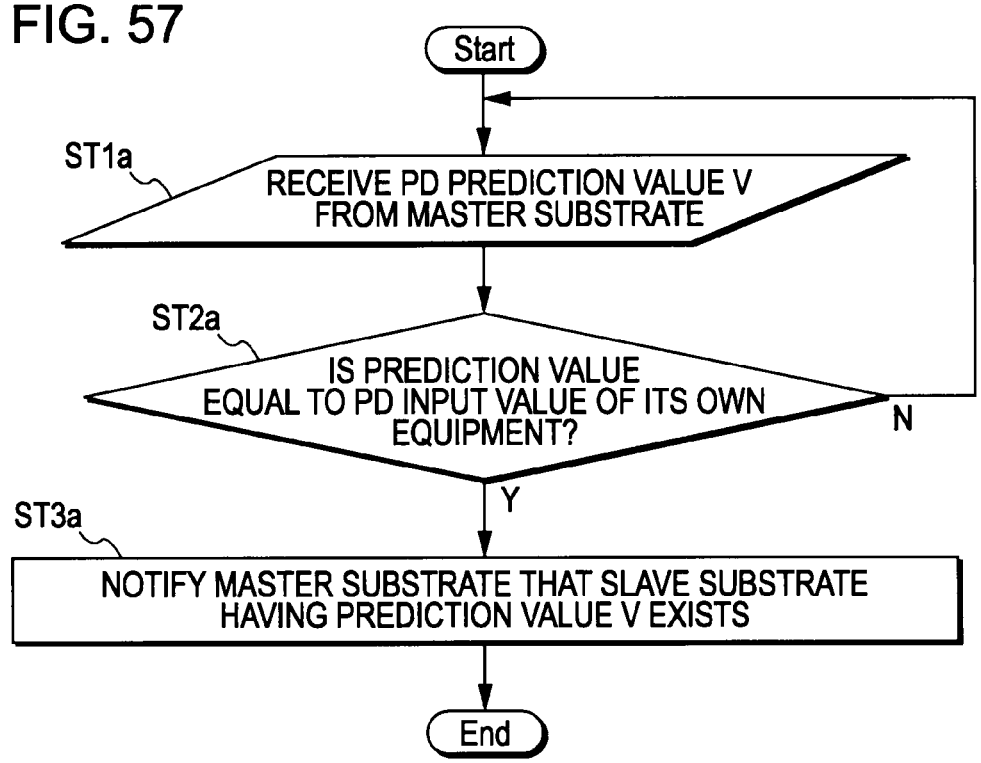
FIG. 57 is a flow chart showing a detail of another processing of the slave substrate 3S when the arrangement is decided for the slave substrate 3S whose arrangement is not uniquely decided.
Figure 58:
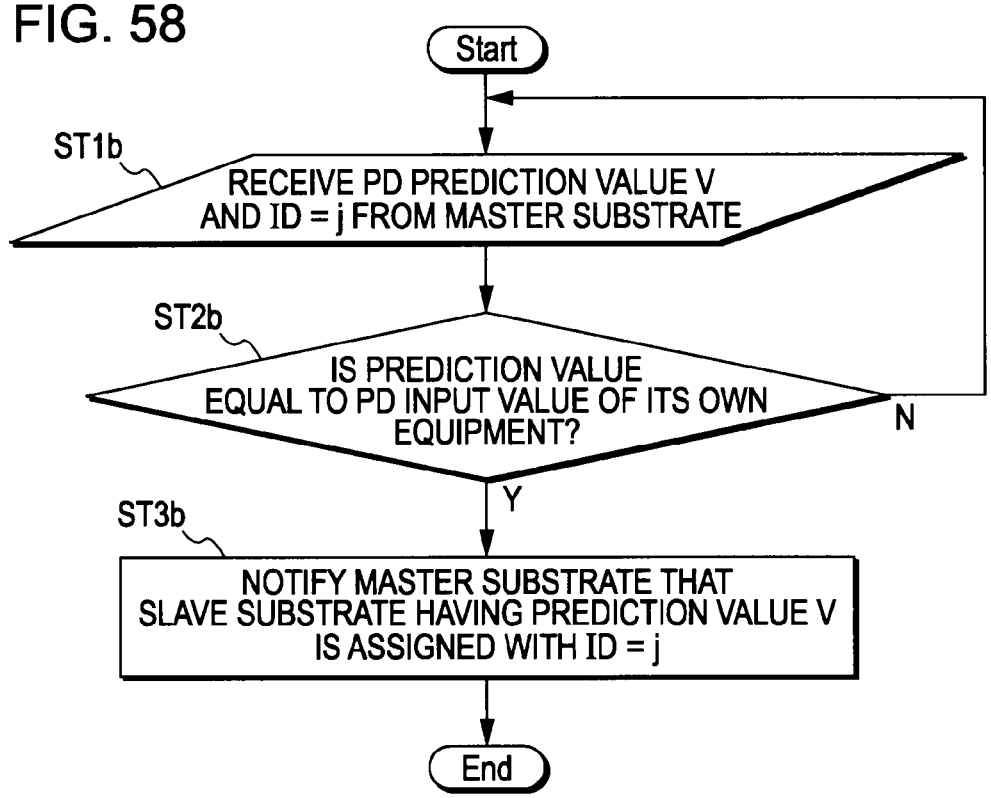
FIG. 58 is a flow chart showing a detail of another processing of the slave substrate 3S when the ID is assigned to the slave substrate 3S whose arrangement is not uniquely decided.

FIG. 56 is a flow chart showing a detail of another processing of the master substrate 3M when the ID is assigned to the slave substrate 3S whose arrangement is not uniquely decided, FIG. 57 is a flow chart showing a detail of another processing of the slave substrate 3S when the arrangement is decided for the slave substrate 3S whose arrangement is not uniquely decided, and FIG. 58 is a flow chart showing a detail of another processing of the slave substrate 3S when the ID is assigned to the slave substrate 3S whose arrangement is not uniquely decided.

In the following description, L denotes the number of the arrangement candidates for the slave substrate 3S, and W$_i$ denotes the arrangement vector in the arrangement candidates for the i-th slave substrate 3S.

In steps SS1 and SS2 in FIG. 56, the master substrate 3M starts a processing of sequentially predicting the PD input value with respect to the slave substrate 3S of the arrangement vector W$_i$ and carries out the processing until the prediction value and the actual measurement value of the PD input value are matched with respect to the arrangement candidates from i=0 to i=L.

The master substrate 3M sets the number of the slave substrates 3S in the arrangement of the i-th slave substrate 3S identified by the arrangement vector W$_i$ as N in step SS3 in FIG. 56.

In steps SS4 to SS8 in FIG. 56, the master substrate 3M predicts the PD input value of the light input to the photo detector 31S of the j-th slave substrate 3S in the arrangement vector W$_i$ from the laser diode 30S of the other slave substrate 3S with respect to all the slave substrates 3S from j=0 to j=N through the processing in step SK3 to SK7 in the above-mentioned flow chart of FIG. 44.

The master substrate 3M sends the information on the PD input value obtained with respect to the j-th slave substrate 3S in the arrangement vector W$_i$ to all the slave substrates 3S by way of the light from the laser diode 30M in step SS7 in FIG. 56.

In step ST1$a$ in FIG. 57, when all the slave substrates 3S connected to the optical waveguide 2A receive the PD prediction value V from the master substrate 3M, in step ST2$a$, the comparison is conducted with the actual input value of the photo detector 31S held in the processing of deciding the positions and the number of the slave substrates 3S.

Then, when the input value of the photo detector 31S held by its own equipment is matched with the PD input value obtained from the master substrate 3M, in step ST3$a$ in FIG. 57, the slave substrate 3S outputs the information indicating that the prediction value V of the PD input value and the actual measurement value are matched by the laser diode 30S to notify the master substrate 3M.

In the arrangement of the i-th slave substrate 3S identified by the arrangement vector W$_i$, the master substrate 3M determines whether the prediction values and the actual measurement values of the PD input values of all the slave substrates 3S are matched in step SS9 in FIG. 56.

In the arrangement vector W$_i$, in a case where the prediction values and the actual measurement values of the PD input values of all the slave substrates 3S are not matched, in step SS10 in FIG. 56, the master substrate 3M sequentially predicts the PD input value with respect to the slave substrate 3S of the next arrangement vector W$_{i+1}$ to carry out the processing of checking the match with the actual measurement value.

Also, in the arrangement vector W$_i$, when the prediction values and the actual measurement values of the PD input values of all the slave substrates 3S are matched, in step SS11 in FIG. 56, the master substrate 3M decides the arrangement of the slave substrate 3S as the arrangement of the i-th slave substrate 3S identified by the arrangement vector W$_i$.

When the arrangement of the slave substrate 3S is decided, in steps SS12 to SS16 in FIG. 56, the master substrate 3M predicts the PD input value of the light input to the photo detector 31S of the j-th slave substrate 3S in the arrangement vector W$_i$ from the laser diode 30S of the other slave substrate 3S with respect to all the slave substrates 3S from j=0 to j=N through the processing in step SK3 to SK7 in the above-mentioned flow chart of FIG. 44.

The master substrate 3M sends the PD input value obtained with respect to the j-th slave substrate 3S in the arrangement vector W$_i$ and the ID information to all the slave substrates 3S by way of the light from the laser diode 30M in step SS15 in FIG. 56.

When all the slave substrates 3S connected to the optical waveguide 2A receive the PD prediction value V and the ID information from the master substrate 3M in step ST1$b$ in FIG. 58, in step ST2$b$, the comparison is conducted with the actual input value of the photo detector 31S held in the processing of deciding the positions and the number of the slave substrates 3S.

Then, when the input value of the photo detector 31S held by its own equipment is matched with the PD input value obtained from the master substrate 3M, in step ST3$b$ in FIG. 57, the slave substrate 3S outputs the information indicating that the ID is assigned to the slave substrate 3S having the PD prediction value V by the laser diode 30S to notify the master substrate 3M.

Figure 59:
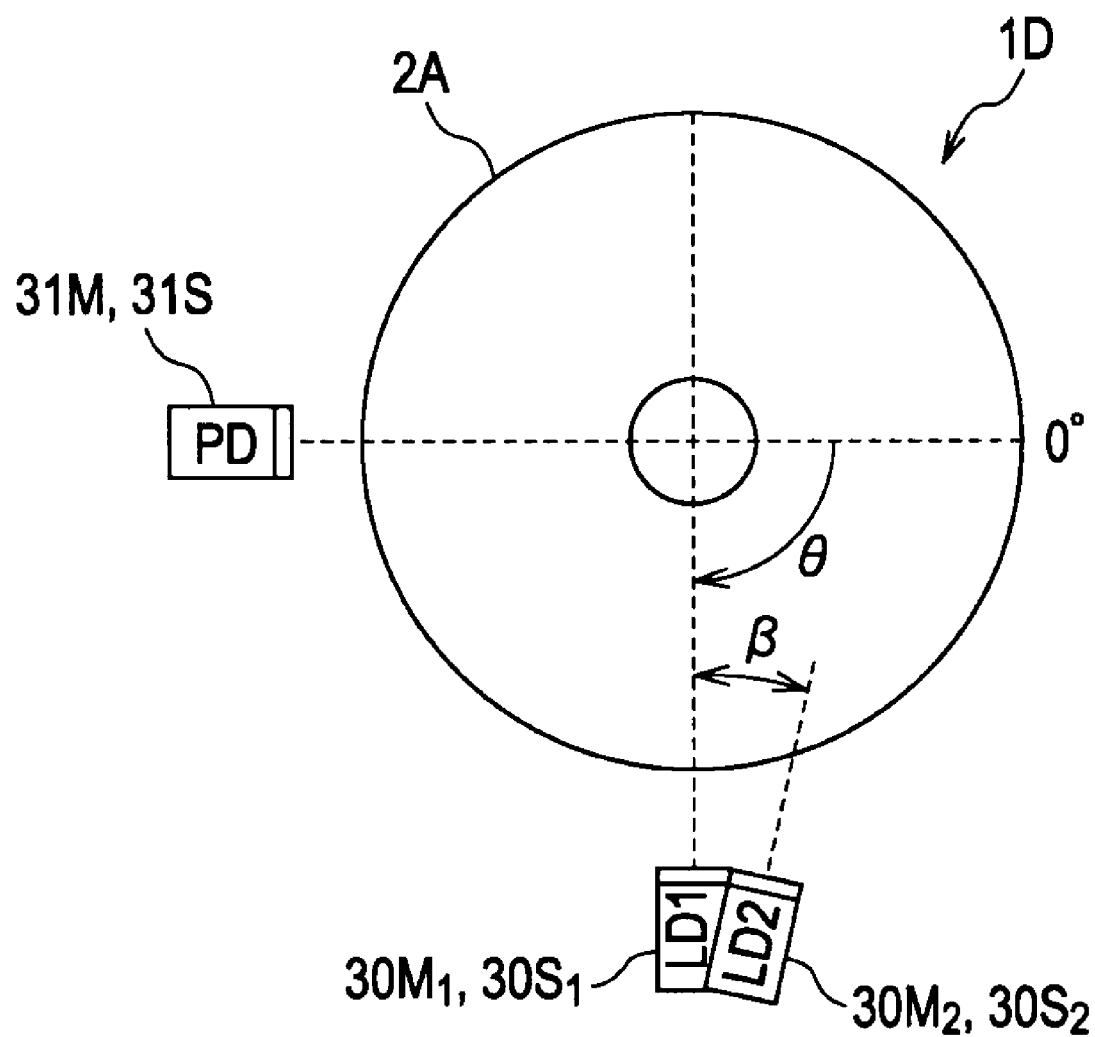
FIG. 59 is a configuration diagram showing an outline of a signal processing apparatus according to a fourth embodiment.

Configuration Example of a Signal Processing Apparatus According to a Fourth Embodiment FIG. 59 is a configuration diagram showing an outline of a signal processing apparatus according to a fourth embodiment.

A signal processing apparatus 1D according to the fourth embodiment is provided with the optical waveguide 2A through which the light is transmitted, and the master substrate 3M and the slave substrate 3S connected to the optical waveguide 2A.

The master substrate 3M and the slave substrate 3S are respectively provided with the laser diodes (LD) 30M and 30S and the photo detectors (PD) 31M and 31S, and in order to break the symmetric property of the light attenuation in the optical waveguide 2A, the master substrate 3M is provided with two pieces including a laser diode 30M$_1$ and a laser diode 30M$_2$.

As to the laser diode 30M$_1$ and the laser diode 30M$_2$, in order that a difference occurs in the PD input levels when the light is output at the constant light amount, the one laser diode 30M$_1$ is arranged to face the center of the optical waveguide 2A, and the other laser diode 30M$_2$ is arranged to be inclined at the predetermined angle β in the surface direction with respect to the other laser diode 30M$_1$.

Similarly, the slave substrate 3S is provided with two pieces including a laser diode 30S$_1$ and a laser diode 30S$_2$.

As to the laser diode 30S$_1$ and the laser diode 30S$_2$, in order that a difference occurs in the PD input levels when the light is output at the constant light amount, the one laser diode 30S$_1$ is arranged to face the center of the optical waveguide 2A, and the other laser diode 30S$_2$ is arranged to be inclined at the predetermined angle β with respect to the laser diode 30S$_1$.

It should be noted that in the respective substrates, the photo detectors 31M and 31S are arranged towards the center of the optical waveguide 2A, and also, the photo detector is arranged one piece each to the respective substrates.

At this time, in the master substrate 3M and the slave substrate 3S connected to the optical waveguide 2A, the direction of the inclination of the laser diodes 30M$_2$ and 30S$_2$ is configured to be identical to the circumference direction.

Operation Example of the Signal Processing Apparatus According to the Fourth Embodiment Next, in a configuration in which two pieces of the laser diode are provided to the respective substrates, the processing by the master substrate 3M to calculate the positions and the number of the slave substrates 3S will be described.

Figure 60:
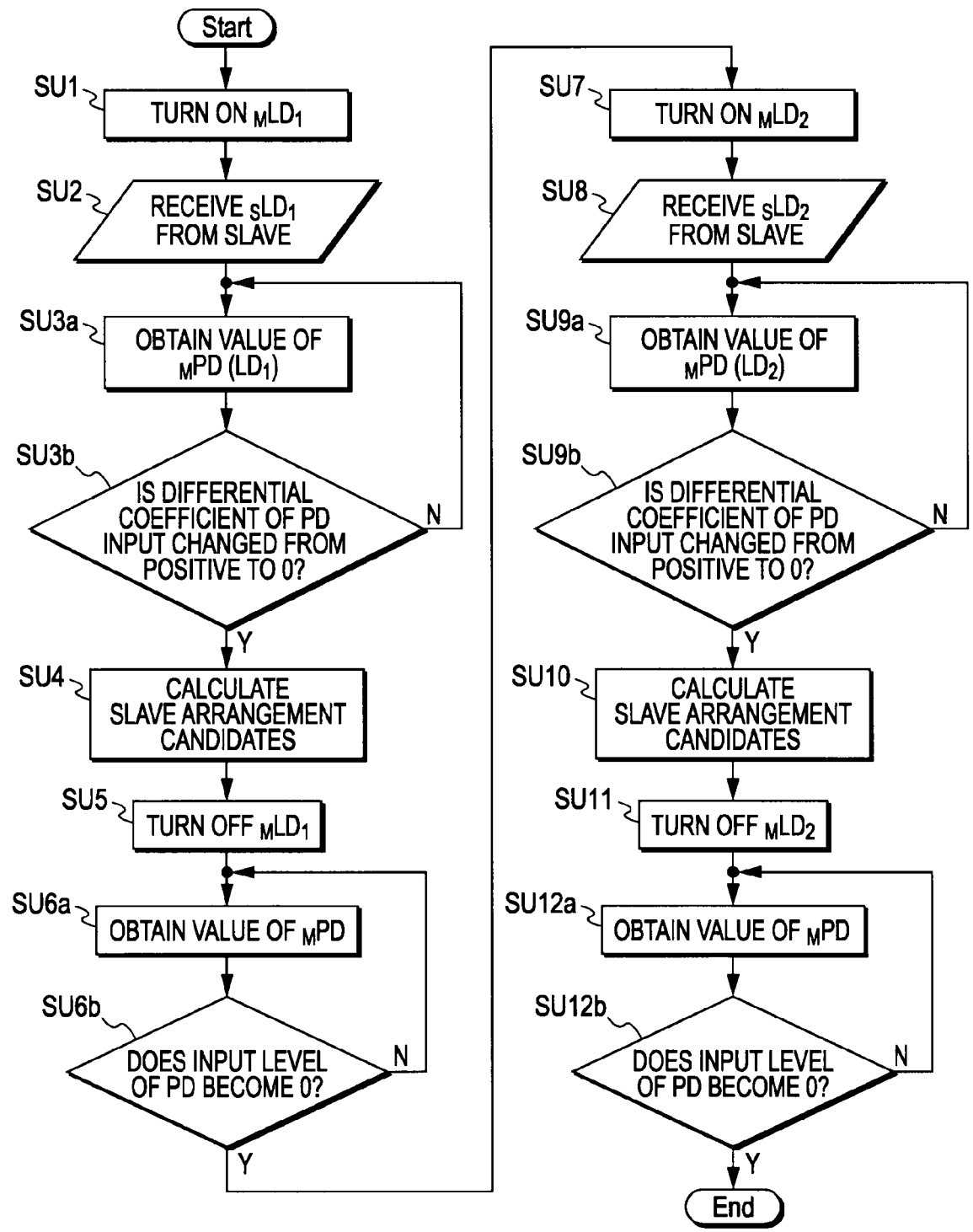
FIG. 60 is a flow chart showing another processing example of the master substrate 3M when the arrangement and the number of the slave substrates 3S are decided.
Figure 61:
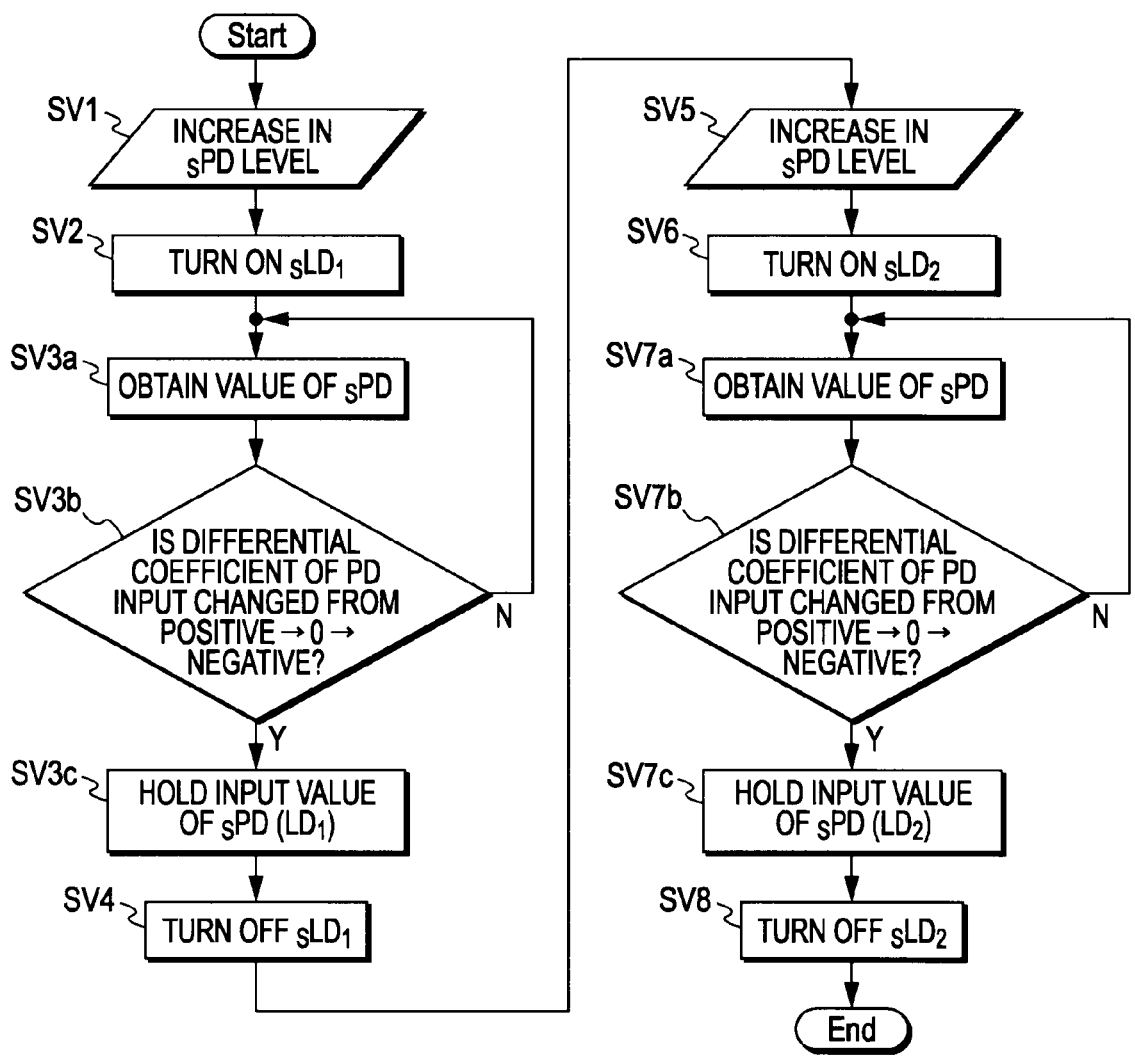
FIG. 61 is a flow chart showing another processing example of the slave substrate 3S when the arrangement and the number of the slave substrates 3S are decided.

FIG. 60 is a flow chart showing another processing example of the master substrate 3M when the arrangement and the number of the slave substrates 3S are decided, and FIG. 61 is a flow chart showing another processing example of the slave substrate 3S when the arrangement and the number of the slave substrates 3S are decided.

The master substrate 3M turns ON the laser diode 30M$_1$ ($_M$LD$_1$) of its own equipment in step SU1 in FIG. 60. As the laser diode 30M$_1$ of the master substrate 3M is turned ON, the light output from the master substrate 3M is transmitted through the optical waveguide 2A and received by the photo detector 31S ($_S$PD) of the slave substrate 3S. According to this, in step SV1 in FIG. 61, in the respective slave substrates 3S connected to the optical waveguide 2A, the input level of the photo detector 31S increases.

In step SV2 in FIG. 61, as the light output from the master substrate 3M is received by the photo detector 31S, when the input level of the photo detector 31S increases to the predetermined value, the respective slave substrates 3S turn ON the laser diode 30S$_1$ of its own equipment.

In response to the turning ON of the laser diode 30M$_1$ of the master substrate 3M, when the laser diodes 30S$_1$ of the respective slave substrates 3S is turned ON, the lights output from the respective slave substrates 3S are transmitted though the optical waveguide 2A and received by the photo detector 31M of the master substrate 3M in step SU2 in FIG. 60.

As the lights output from the respective slave substrate are received by the photo detector 31M of the master substrate 3M, in the master substrate 3M, the input level of the photo detector 31M increases.

According to this, in the master substrate 3M, in response to the turning ON of the laser diode 30M$_1$ of its own equipment, when the laser diode 30S$_1$ is turned ON in the slave substrate 3S, the input level of the photo detector 31M of the master substrate 3M increases until the laser diodes 30S$_1$ of all the slave substrates 3S is turned ON and becomes a constant value when the laser diodes 30S$_1$ of all the slave substrates 3S are turned ON.

In view of the above, when the input value of the photo detector 31M becomes the constant value, the master substrate 3M checks that the output of the laser diode 30S$_1$ is conducted in all the slave substrates 3S connected to the optical waveguide 2A.

That is, in step SU3a in FIG. 60, the master substrate 3M obtains the input value of the photo detector 31M, and in step SU3b, determines that the input value of the photo detector 31M becomes the constant value, for example, on the basis of whether or not the differential coefficient of the input value is changed from positive to 0 through the above-mentioned processing of the flow chart of FIG. 9.

Then, when the differential coefficient of the input value of the photo detector 31M is changed from positive to 0, the master substrate 3M determines that it is checked the output of the laser diode 30S$_1$ is conducted in all the slave substrates 3S connected to the optical waveguide 2A.

When it is checked that the output of the laser diode 30S$_1$ is conducted in all the slave substrates 3S connected to the optical waveguide 2A, in step SU4 in FIG. 60, the master substrate 3M calculates the positions and the number of the slave substrates 3S to calculate the arrangement candidates for the slave substrate 3S.

When the arrangement candidates for the slave substrate 3S connected to the optical waveguide 2A are calculated, in step SU5 in FIG. 60, the master substrate 3M turns OFF the laser diode 30M$_1$ of its own equipment.

In the slave substrate 3S, in response to the turning ON of the laser diode 30M$_1$ of the master substrate 3M, when the lights are output from the respective slave substrates 3S, the input level of the photo detector 31S increases until the laser diodes 30S$_1$ of all the slave substrates 3S are turned ON and becomes a constant value when the laser diodes 30S$_1$ of all the slave substrates 3S are turned ON.

Then, when the master substrate 3M calculates the arrangement candidates for the slave substrate 3S and turns OFF the laser diode 30M$_1$ in step SU5, the input level of the photo detector 31S of the respective slave substrates 3S decreases from the constant value.

In view of the above, when the input value of the photo detector 31S decreases from the constant value, the slave substrate 3S determines that the master substrate 3M completed the calculation of the arrangement candidates for the slave substrate 3S.

That is, in step SV3a in FIG. 61, the slave substrate 3S obtains the input value of the photo detector 31S, and in step SV3b, determines that the input value of the photo detector 31S decreases from the constant value, for example, on the basis of whether or not the differential coefficient of the input value is changed from positive to 0 and thereafter changed from 0 to negative through the above-mentioned processing of the flow chart of FIG. 9.

Then, when the differential coefficient of the input value of the photo detector 31S is changed from positive to 0 and thereafter changed from 0 to negative, the slave substrate 3S determines that the master substrate 3M completed the calculation for the arrangement candidates for the slave substrate 3S, and for the utilization in the ID assignment, in step SV3c in FIG. 61, after holding the input value of the photo detector 31S of its own equipment, in step SV4 in FIG. 61, the laser diode 30S$_1$ of its own equipment is turned OFF.

As the laser diodes 30S$_1$ of the respective slave substrates 3S are turned OFF, in the master substrate 3M, the input level of the photo detector decreases.

In the master substrate 3M, in response to the turning OFF of the laser diode 30M$_1$ of its own equipment, when the laser diode 30S$_1$ is turned OFF in the slave substrate 3S, the input level of the photo detector 31M of the master substrate 3M decreases until the laser diodes $30S_1$ of all the slave substrates 3S are turned OFF and becomes "0" when the laser diodes $30S_1$ of all the slave substrates 3S are turned OFF.

In view of the above, when the input value of the photo detector 31M becomes 0, the master substrate 3M determines that all the slave substrates 3S responded.

That is, in step SU6a in FIG. 60, the master substrate 3M obtains the input value of the photo detector 31M, and in step SU6b, determines whether or not the input value of the photo detector 31M becomes 0, for example, through the above-mentioned processing of the flow chart of FIG. 15.

Then, when the input value of the photo detector 31M becomes 0, the master substrate 3M determines that all the slave substrates 3S responded, and in order to carry out a similar processing while the other laser diode is turned ON, in step SU7 in FIG. 60, the laser diode $30M_2$ ($_MLD_2$) of its own equipment is turned ON.

As the laser diode $30M_2$ of the master substrate 3M is turned ON, the light output from the master substrate 3M is transmitted through the optical waveguide 2A and received by the photo detector 31S of the slave substrate 3S. According to this, in step SV5 in FIG. 61, in the respective slave substrates 3S connected to the optical waveguide 2A, the input level of the photo detector 31S increases.

In step SV6 in FIG. 61, as the light output from the master substrate 3M is received by the photo detector 31S, when the input level of the photo detector 31S increases to the predetermined value, the respective slave substrates 3S turn ON the laser diode $30S_2$ of its own equipment.

In response to the turning ON of the laser diode 30M of the master substrate $3M_2$, when the laser diodes 30S of the respective slave substrates $3S_2$ are turned ON, the lights output from the respective slave substrates 3S are transmitted though the optical waveguide 2A and received by the photo detector 31M of the master substrate 3M in step SU8 in FIG. 60.

As the lights output from the respective slave substrate are received by the photo detector 31M of the master substrate 3M, in the master substrate 3M, the input level of the photo detector 31M increases.

According to this, in the master substrate 3M, in response to the turning ON of the laser diode $30M_2$ of its own equipment, when the laser diode $30S_2$ is turned ON in the slave substrate 3S, the input level of the photo detector 31M of the master substrate 3M increases until the laser diodes $30S_2$ of all the slave substrates 3S are turned ON and becomes a constant value when the laser diodes $30S_2$ of all the slave substrates 3S are turned ON.

For this reason, in order to check that the output of the laser diode $30S_2$ is conducted in all the slave substrates 3S connected to the optical waveguide 2A, in step SU9a in FIG. 60, the master substrate 3M obtains the input value of the photo detector 31M, and in step SU9b, determines that the input value of the photo detector 31M becomes a constant value, for example, on the basis of whether or not the differential coefficient of the PD input value is changed from positive to 0.

Then, when the differential coefficient of the input value of the photo detector 31M is changed from positive to 0, the master substrate 3M determines that it is checked the output of the laser diode $30S_2$ is conducted in all the slave substrates 3S connected to the optical waveguide 2A.

When it is checked that the output of the laser diode $30S_2$ is conducted in all the slave substrates 3S connected to the optical waveguide 2A, in step SU10 in FIG. 60, the master substrate 3M calculates the positions and the number of the slave substrates 3S to calculate the arrangement candidates for the slave substrate 3S.

When the arrangement candidates for the slave substrate 3S connected to the optical waveguide 2A are calculated, in step SU11 in FIG. 60, the master substrate 3M turns OFF the laser diode $30M_2$ of its own equipment.

In the slave substrate 3S, in response to the turning ON of the laser diode $30M_2$ of the master substrate 3M, when the lights are output from the respective slave substrates 3S, the input level of the photo detector 31S increases until the laser diodes $30S_2$ of all the slave substrates 3S are turned ON and becomes a constant value when the laser diodes $30S_2$ of all the slave substrates 3S are turned ON.

Then, the master substrate 3M calculates the arrangement candidates for the slave substrate 3S, and in step SU11, when the laser diode $30M_2$ is turned OFF, the input level of the photo detector 31S of the respective slave substrates 3S decreases from the constant value.

For this reason, in order to check that the master substrate 3M completed the calculation for the arrangement candidates for the slave substrate 3S, in step SV7a in FIG. 61, the slave substrate 3S obtains the input value of the photo detector 31S, and in step SV7b, determines that the input value of the photo detector 31S decreases from the constant value, for example, on the basis of whether or not the differential coefficient of the PD input value is changed from positive to 0 and thereafter changed from 0 to negative through the above-mentioned processing of the flow chart of FIG. 9.

Then, when the differential coefficient of the input value of the photo detector 31S is changed from positive to 0 and thereafter changed from 0 to negative, the slave substrate 3S determines that the master substrate 3M completed the calculation for the arrangement candidates for the slave substrate 3S, and for the utilization in the ID assignment, in step SV7c in FIG. 61, after holding the input value of the photo detector 31S of its own equipment, in step SV8 in FIG. 61, the laser diode $30S_2$ of its own equipment is turned OFF.

As the laser diodes $30S_2$ of the respective slave substrates 3S are turned OFF, in the master substrate 3M, the input level of the photo detector decreases.

In the master substrate 3M, in response to the turning OFF of the laser diode $30M_2$ of its own equipment, when the laser diode $30S_2$ is turned OFF in the slave substrate 3S, the input level of the photo detector 31M of the master substrate 3M decreases until the laser diodes $30S_2$ of all the slave substrates 3S are turned OFF and becomes "0" when the laser diodes $30S_1$ of all the slave substrates 3S are turned OFF.

For this reason, in order to check that all the slave substrates 3S responded, in step SU12a in FIG. 60, the master substrate 3M obtains the input value of the photo detector 31M, and in step SU12b, determines whether or not the input value of the photo detector 31M becomes 0.

Then, when the input value of the photo detector 31M becomes 0, the master substrate 3M determines that all the slave substrates 3S responded, and the processing of deciding the arrangement candidates for the slave substrate 3S is ended.

Figure 62:
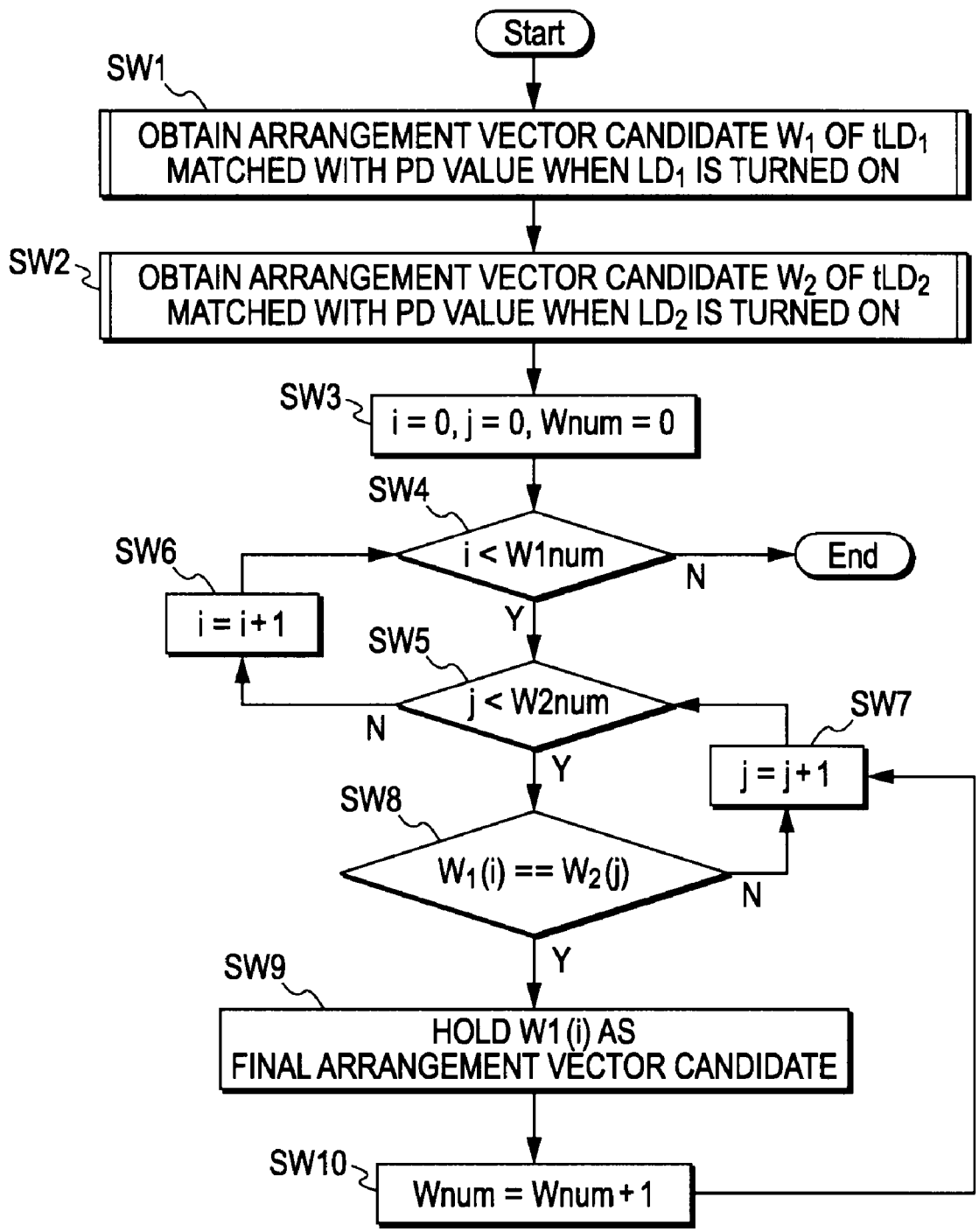
FIG. 62 is a flow chart showing an example of a processing of deciding an arrangement vector from a plurality of candidates.

FIG. 62 is a flow chart showing an example of a processing of deciding an arrangement vector from a plurality of candidates, and next, a description will be given of the detail of the processing of deciding the arrangement vector.

According to the present example, as the slave substrate 3S is provided with two pieces of the laser diodes $30S_1$ and $30S_2$, the master substrate 3M holds the PD input level tables $tLD_1$ and $tLD_2$ corresponding to the input values of the photo detector 31M by the respective outputs of the two pieces of the laser diodes $30S_1$ and $30S_2$.

At this time, the PD input level tables $tLD_1$ and $tLD_2$ are calculated similarly like the PD input level table of FIG. 33.

The master substrate 3M carries out a processing similar to the above-mentioned flow chart of FIG. 55, and in step SW1 in FIG. 62, searches for the PD input level table $tLD_1$ matched with the PD input value obtained when the laser diode $30S_1$ of the slave substrate 3S is turned ON to obtain the arrangement vector candidate $W_1$.

Similarly, in step SW2 in FIG. 62, the master substrate 3M searches for the PD input level table $tLD_2$ matched with the PD input value obtained when the laser diode $30S_2$ of the slave substrate 3S is turned ON to obtain the arrangement vector candidate $W_2$.

In steps SW3 to SW7 in FIG. 62, the master substrate 3M sequentially reads out i pieces of the arrangement vectors $W_1$ obtained from the PD input value obtained when the laser diode $30S_1$ of the slave substrate 3S is turned ON and i pieces of the arrangement vector $W_2$ obtained from the PD input value when the laser diode $30S_2$ of the slave substrate 3S is turned ON to sequentially conduct a comparison in step SW8 in FIG. 62.

Then, in step SW9 in FIG. 62, the master substrate 3M holds the arrangement vector $W_1(i)$ while setting one in which the respective elements are matched in the arrangement vector $W_1$ and the arrangement vector $W_2$ as the final candidate and searches for the next arrangement candidate in step SW10.

Next, in a configuration where two pieces of laser diodes are provided in the respective substrates, a description will be given of a processing in which the arrangement of the slave substrate 3S whose arrangement cannot be uniquely is decided and the master substrate 3M assigns the ID to the slave substrate 3S.

Figure 63:
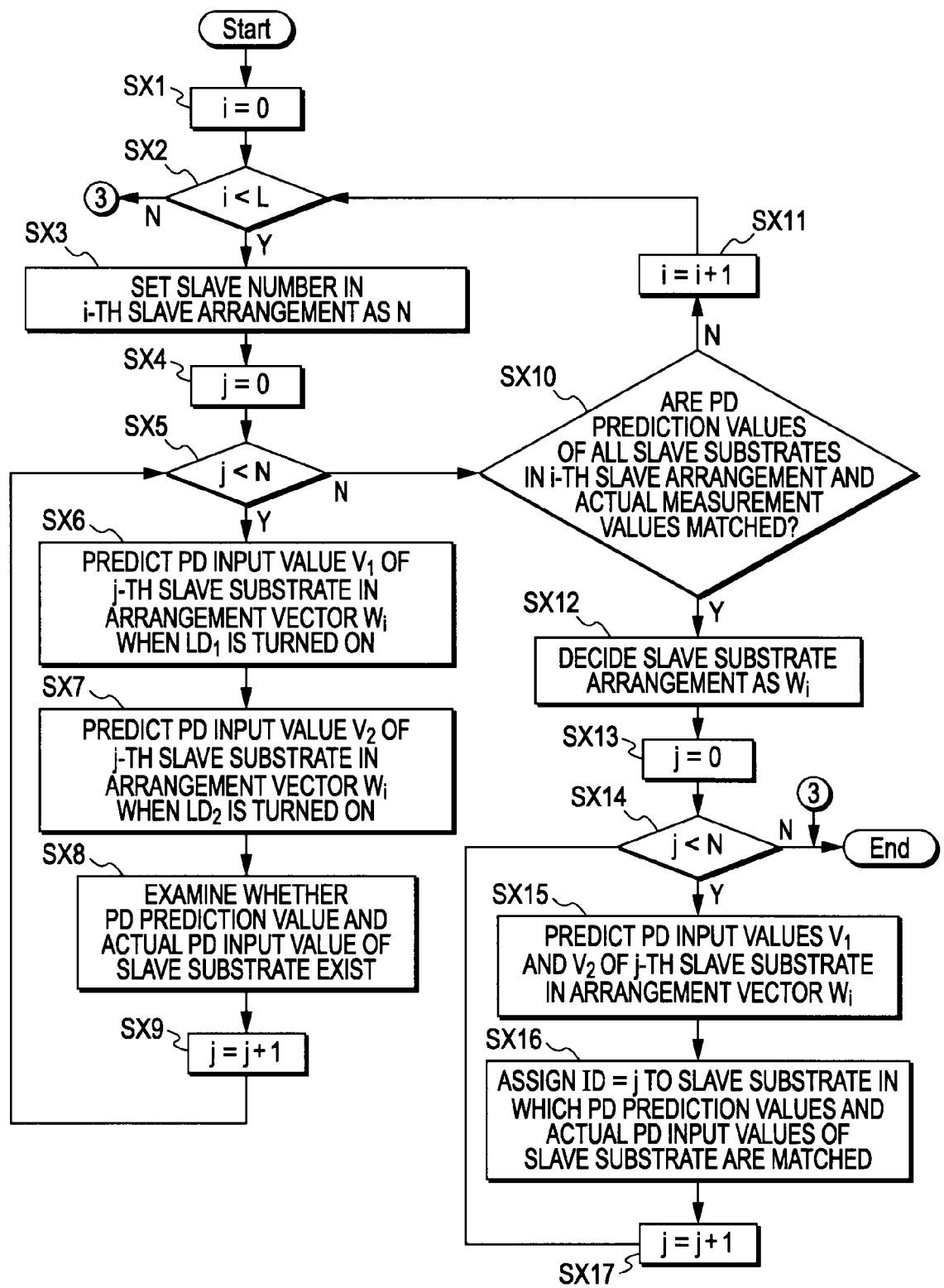
FIG. 63 is a flow chart showing a detail of another processing of the master substrate 3M when the ID is assigned to the slave substrate 3S whose arrangement is not uniquely decided.

FIG. 63 is a flow chart showing a detail of another processing of the master substrate 3M when the ID is assigned to the slave substrate 3S whose arrangement is not uniquely decided, FIG. 64 is a flow chart showing a detail of another processing of the slave substrate 3S when the arrangement is decided for the slave substrate 3S whose arrangement is not uniquely decided, and FIG. 65 is a flow chart showing a detail of another processing of the slave substrate 3S when the ID is assigned to the slave substrate 3S whose arrangement is not uniquely decided.

In the following description, L denotes the number of the arrangement candidates for the slave substrate 3S, and $W_i$ denotes the arrangement vector in the arrangement candidates for the i-th slave substrate 3S.

In steps SX1 and SX2 in FIG. 63, the master substrate 3M starts a processing of sequentially predicting the PD input value with respect to the slave substrate 3S of the arrangement vector $W_i$ and carries out the processing until the prediction value and the actual measurement value of the PD input value are matched with respect to the arrangement candidates from i=0 to i=L.

The master substrate 3M sets the number of the slave substrates 3S in the arrangement of the i-th slave substrate 3S identified by the arrangement vector $W_i$ as N in step SX3 in FIG. 63.

In steps SX4 to SX9 in FIG. 63, the master substrate 3M predicts the PD input value of the light input to the photo detector 31S of the j-th slave substrate 3S in the arrangement vector $W_i$ from the laser diode 30S of the other slave substrate 3S through the above-mentioned processing in step SK3 to SK7 of the flow chart of FIG. 44.

That is, in step SX6 in FIG. 63, the master substrate 3M predicts the PD input value of the light input to the photo detector 31S of the j-th slave substrate 3S in the arrangement vector $W_i$ from the laser diode $30S_1$ ($LD_1$) of the other slave substrate 3S with respect to all the slave substrates 3S from j=0 to j=N.

Also, in step SX7 in FIG. 63, the master substrate 3M predicts the PD input value of the light input to the photo detector 31S of the j-th slave substrate 3S in the arrangement vector $W_i$ from the laser diode $30S_2$ ($LD_2$) of the other slave substrate 3S with respect to all the slave substrates 3S from j=0 to j=N.

Then, the master substrate 3M sends the prediction values of the PD input value (PD prediction values) $V_1$ and $V_2$ obtained with respect to the j-th slave substrate 3S in the arrangement vector $W_i$ to all the slave substrates 3S by way of the light from the laser diode 30M in step SX8 in FIG. 63.

In step SY1a in FIG. 64, when all the slave substrates 3S connected to the optical waveguide 2A receive the prediction value $V_1$ of the PD input value when the $LD_1$ is turned ON and the prediction value $V_2$ of the PD input value when the $LD_2$ is turned ON from the master substrate 3M, in step SY2a, the comparison is conducted with the actual input value of the photo detector 31S held in the processing of deciding the positions and the number of the slave substrates 3S.

Then, when the input value of the photo detector 31S held by its own equipment is matched with the prediction value of the PD input value obtained from the master substrate 3M, in step SY3a in FIG. 64, the slave substrate 3S outputs the information indicating that the prediction values $V_1$ and $V_2$ of the PD input value and the actual measurement value are matched by the laser diode 30S to notify the master substrate 3M.

In the arrangement of the i-th slave substrate 3S identified by the arrangement vector Wi, the master substrate 3M determines whether the prediction values and the actual measurement values of the PD input values of all the slave substrates 3S are matched in step SX10 in FIG. 63.

In the arrangement vector $W_i$, in a case where the prediction values and the actual measurement values of the PD input values of all the slave substrates 3S are not matched, in step SX11 in FIG. 63, the master substrate 3M sequentially predicts the PD input value with respect to the slave substrate 3S of the next arrangement vector $W_{i+1}$ to carry out the processing of checking the match with the actual measurement value.

Also, in the arrangement vector $W_i$, when the prediction values and the actual measurement values of the PD input values of all the slave substrates 3S are matched, in step SX12 in FIG. 63, the master substrate 3M decides the arrangement of the slave substrate 3S as the arrangement of the i-th slave substrate 3S identified by the arrangement vector $W_i$.

When the arrangement of the slave substrate 3S is decided, in steps SX13 to SX17 in FIG. 63, the master substrate 3M predicts the PD input value of the light input to the photo detector 31S of the j-th slave substrate 3S in the arrangement vector $W_i$ from the laser diodes $30S_1$, $S_2$ of the other slave substrate 3S with respect to all the slave substrates 3S from j=0 to j=N.

The master substrate 3M sends the prediction values $V_1$ and $V_2$ of the PD input value obtained with respect to the j-th slave substrate 3S of the arrangement vector $W_i$ and the ID information to all the slave substrates 3S by way of the light from the laser diode 30M in step SX16 in FIG. 63.

In step SY1b in FIG. 65, when all the slave substrates 3S connected to the optical waveguide 2A receive the prediction values $V_1$ and $V_2$ of the PD input value and the ID information from the master substrate 3M, in step SY2b, the comparison is conducted with the actual input value of the photo detector 31S held in the processing of deciding the positions and the number of the slave substrates 3S.

Then, when the input value of the photo detector 31S held by its own equipment is matched with the prediction value of the PD input value obtained from the master substrate 3M, in step SY3b in FIG. 65, the slave substrate 3S outputs the information indicating that the slave substrate 3S having the PD prediction values $V_1$ and $V_2$ is assigned with the ID by the laser diode 30S to notify the master substrate 3M.

Modified Example of the Signal Processing Apparatus According to the Respective Embodiments According to the above-mentioned respective embodiments, in the configuration in which the laser diode and the photo detector are provided one piece each, both may be inclined at a predetermined angle in the plane direction with respect to the center of the optical waveguide. Also, as the configuration in which the laser diodes and the photo detectors are provided two pieces each, respectively one of these may be inclined at a predetermined angle in the plane direction with respect to the center of the optical waveguide.

It should be noted that in order to break the symmetric property of the light attenuation in the optical waveguide 2A, the light input to the optical waveguide from the laser diode, or, the light input from the optical waveguide to the photo detector may be inclined. For this reason, the laser diode or the photo detector itself is not inclined, but in the optical path of the laser diode or the photo detector, an optical member for inclining the light at a predetermined angle may be arranged.

INDUSTRIAL APPLICABILITY

The present invention is applied to a one to multiple, multiple to one, or multiple to multiple optical selector capable of dynamically switching the transmission path for the signal.

The invention claimed is:

1. A signal processing apparatus comprising:
an optical waveguide having a light input output surface formed on an outer circumference of an optical guide unit through which light is transmitted where the light input from an arbitrary position of the input output surface is output in an entire circumference direction at a level in accordance with a positional relation with the input location;
a master substrate arranged on an outer circumference of the optical waveguide and provided with a light output unit for converting an electric signal into light to be output and a light input unit for converting the input light into the electric signal; and
a single or a plurality of slave substrates arranged on any of a plurality of mounting locations at different positions along the outer circumference of the optical waveguide and provided with a light output unit for converting an electric signal into light to be output and a light input unit for converting the input light into the electric signal,
wherein the master substrate recognizes the mounted positions and the number of the slave substrates from a level of the light input to the light input unit of the master substrate and transmitted through the optical waveguide in accordance with the arrangement of the slave substrates while the light is output from the light output units of all the slave substrates arranged on the outer circumference of the optical waveguide.

2. The signal processing apparatus according to claim 1, wherein the master substrate holds an input level table in which the level of the light input to the light input unit of the master substrate in accordance with arrangement of the slave substrates is associated with arrangement information specifying the positions and the number of the slave substrates, and
searches for the input level table on the basis of an input value of the light input unit of the master substrate while the light is output from the light output units of all the slave substrates arranged on the outer circumference of the optical waveguide to obtain the arrangement information of the slave substrates.

3. The signal processing apparatus according to claim 2, wherein the slave substrate holds an input value of the light input unit of its own equipment while the light is output from the light output unit of another slave substrate, and
wherein when a plurality of arrangement information candidates are obtained from the input level table, the master substrate predicts an input value of the light input unit in the slave substrate whose position is specified by the respective arrangement information and selects the arrangement information in which the input value held by the slave substrate is matched with the prediction value calculated by the master substrate.

4. The signal processing apparatus according to claim 2, wherein the slave substrate holds an input value of the light input unit of its own equipment while the light is output from the light output unit of another slave substrate,
wherein the master substrate predicts an input value of the light input unit in the slave substrate whose position is specified by the respective arrangement information to be output from the light output unit together with identification information and sent to all the slave substrates arranged on the outer circumference of the optical waveguide, and
wherein when the input value corresponding to the prediction value received from the master substrate is held, the slave substrate sets the identification information received from the master substrate as the identification information assigned to its own equipment.

5. The signal processing apparatus according to claim 1, wherein while the master substrate and the slave substrate utilizes a change in which the input value of the light input unit becomes constant and a change in which the constant input value of the light input unit is decreased,
the master substrate carries out a processing of checking turning ON and turning OFF of the light output units of all the slave substrates arranged by an arbitrary number on the outer circumference of the optical waveguide, and the slave substrate carries out a processing of checking turning OFF of the light output unit of the master substrate.

6. The signal processing apparatus according to claim 5, wherein the master substrate carries out a processing of finding out the slave substrates and obtaining the input value of the light input unit of its own equipment while turning ON of the light output units of all the substrates arranged on the outer circumference of the optical waveguide is checked and a processing of checking whether the processing in the slave substrates is ended while turning OFF of the light output units of all the slave substrates is checked, and
wherein the slave substrate also carries out a processing of holding the input value of the light input unit of its own equipment and turning OFF the light output unit while turning OFF of the light output unit of the master substrate is checked.

7. The signal processing apparatus according to claim 6,
wherein while the master substrate and the slave substrate use any of a change from a positive value of a differential coefficient of the input value of the light input unit to 0, a change from a negative value to 0, or a change in which the differential coefficient becomes 0 and the input value becomes constant, and a change from a positive value of a differential coefficient of an integral value of the input value of the light input unit to 0, a change from a negative value to 0, or a change in which the integral value becomes constant, and a change in which the input value of the light input unit becomes 0, or a combination of a plurality of processings,
the master substrate carries out a processing of finding out the slave substrates and obtaining the input value of the light input unit of its own equipment and a processing of checking whether the processing in the slave substrates is ended, and the slave substrate also carries out a processing of holding the input value of the light input unit of its own equipment and turning OFF the light output unit.

8. The signal processing apparatus according to claim 7,
wherein the master substrate and the slave substrate include any of a differentiation circuit for calculating a differential value of the input of the light input unit, an integration circuit for calculating the integral value of the input value, and a differentiation integration circuit for calculating the integral value of the input value and calculating a differential value thereof.

9. A signal processing apparatus comprising:
an optical waveguide having a light input output surface formed on an outer circumference of an optical guide unit through which light is transmitted where the light input from an arbitrary position of the input output surface is output in an entire circumference direction at a level in accordance with a positional relation with the input location;
a master substrate arranged on an outer circumference of the optical waveguide and provided with a light output unit for converting an electric signal into light to be output and a light input unit for converting the input light into the electric signal; and
a single or a plurality of slave substrates arranged on any of a plurality of mounting locations at different positions along the outer circumference of the optical waveguide and provided with a light output unit for converting an electric signal into light to be output and a light input unit for converting the input light into the electric signal,
wherein in a case where the position and the number of the slave substrates arranged on the outer circumference of the optical waveguide are different, the master substrate and the slave substrate include the light input unit and the light output unit at an arrangement where a difference occurs between levels of lights input to the master substrate and the slave substrate, and
wherein the master substrate holds an input level table in which the level of the light input to the light input unit of the master substrate in accordance with arrangement of the slave substrates is associated with arrangement information specifying the positions and the number of the slave substrates, and
searches for the input level table on the basis of an input value of the light input unit of the master substrate while the light is output from the light output units of all the slave substrates arranged on the outer circumference of the optical waveguide to obtain the arrangement information of the slave substrates.

10. The signal processing apparatus according to claim 9,
wherein the master substrate and the slave substrate include the light input unit and the light output unit one piece each, and
wherein at least any one of the light input unit and the light output unit is arranged to be inclined in a surface direction with respect to a center of the optical waveguide.

11. The signal processing apparatus according to claim 9,
wherein the master substrate and the slave substrate include two pieces of the light input units and also one piece of light output unit, and
wherein one of the light input units is arranged to face a center of the optical waveguide, and the other light input unit is arranged to be inclined in a surface direction with respect to the center of the optical waveguide.

12. The signal processing apparatus according to claim 11,
wherein the input level table includes a first input level table in which the level of the light input to the one of the light input units of the master substrate is associated with the arrangement information on the slave substrate and a second input level table in which the level of the light input to the other light input unit of the master substrate is associated with the arrangement information on the slave substrate, and
wherein the master substrate obtains the arrangement information in which the arrangements of the slave substrates are matched, from first arrangement information on the slave substrate obtained by searching for the first input level table on the basis of the input value of the one of the light input units while the light is output from the light output units of all the slave substrates arranged on the outer circumference of the optical waveguide and second arrangement information on the slave substrates obtained by searching for the second input level table on the basis of the input value of the other light input unit.

13. The signal processing apparatus according to claim 9,
wherein the master substrate and the slave substrate include one piece of the light input unit and also two pieces of the light output units, and
wherein one of the light output units is arranged to face a center of the optical waveguide, and the other light output unit is arranged to be inclined in a surface direction with respect to the center of the optical waveguide.

14. The signal processing apparatus according to claim 13,
wherein the input level table includes a first input level table in which the level of the light output from the one of the light output units of the slave substrate to be input to the light input unit of the master substrate is associated with the arrangement information on the slave substrate and a second input level table in which the level of the light output from the other light output unit of the slave substrate to be input to the light input unit of the master substrate is associated with the arrangement information on the slave substrate, and
wherein the master substrate obtains the arrangement information in which the arrangements of the slave substrates are matched, from first arrangement information on the slave substrate obtained by searching for the first input level table on the basis of the input value of the light input unit while the light is output from the one of the light output units of all the slave substrates arranged on the outer circumference of the optical waveguide and second arrangement information on the slave substrate obtained by searching for the second input level table on the basis of the input value of the light input unit while the light is output from the other light output unit of the slave substrates.

15. The signal processing apparatus according to claim 9,
wherein the master substrate and the slave substrate include two pieces of the light input units and also two pieces of the light output units, and
one of the light input units and one of the light output units are arranged to face a center of the optical waveguide, and the other light input unit and the other light output unit are arranged to be inclined in a surface direction with respect to the center of the optical waveguide.

16. A signal processing apparatus comprising:
an optical waveguide having a light input output surface formed on an outer circumference of an optical guide unit through which light is transmitted where the light input from an arbitrary position of the input output surface is output in an entire circumference direction at a level in accordance with a positional relation with the input location;
a master substrate arranged on an outer circumference of the optical waveguide and provided with a light output unit for converting an electric signal into light to be output and a light input unit for converting the input light into the electric signal; and
a single or a plurality of slave substrates arranged on any of a plurality of mounting locations at different positions along the outer circumference of the optical waveguide and provided with a light output unit for converting an electric signal into light to be output and a light input unit for converting the input light into the electric signal,
wherein the master substrate holds an input level table in which the level of the light input to the light input unit of the master substrate in accordance with arrangement of the slave substrates is associated with arrangement information specifying the positions and the number of the slave substrates, and
searches for the input level table on the basis of an input value of the light input unit of the master substrate while the light is output from the light output units of all the slave substrates arranged on the outer circumference of the optical waveguide to obtain the arrangement information of the slave substrates,
wherein the slave substrate also holds an input value of the light input unit of its own equipment while the light is output from the light output unit of another slave substrate,
the master substrate predicts an input value of the light input unit in the slave substrate whose position is specified by the respective arrangement information to be output from the light output unit together with identification information and sent to all the slave substrates arranged on the outer circumference of the optical waveguide, and
wherein when the input value corresponding to the prediction value received from the master substrate is held, the slave substrate sets the identification information received from the master substrate as the identification information assigned to its own equipment.

* * * * *